United States Patent [19]

Serizawa et al.

[11] Patent Number: 5,550,573
[45] Date of Patent: Aug. 27, 1996

[54] IMAGE FORMING APPARATUS USING A PHOTOSENSITIVE DRUM AND HAVING LIGHT QUANTITY ADJUSTMENT

[75] Inventors: Yoji Serizawa, Yokohama; Yukihide Ushio, Tokyo, both of Japan

[73] Assignee: Canon Kabushiki Kaisha, Tokyo, Japan

[21] Appl. No.: 351,107

[22] Filed: Nov. 30, 1994

Related U.S. Application Data

[63] Continuation of Ser. No. 782,384, Oct. 24, 1991, abandoned.

[30] Foreign Application Priority Data

| Oct. 26, 1990 | [JP] | Japan | 2-289339 |
| Feb. 20, 1991 | [JP] | Japan | 3-045606 |
| Feb. 20, 1991 | [JP] | Japan | 3-045608 |
| Mar. 20, 1991 | [JP] | Japan | 3-080476 |

[51] Int. Cl.⁶ .................................................. G01D 9/42
[52] U.S. Cl. .................................. 347/246; 347/250
[58] Field of Search .............................. 347/133, 246, 347/248, 250, 255, 256

[56] References Cited

U.S. PATENT DOCUMENTS

| 4,190,867 | 2/1980 | Ohnishi | 358/285 |
| 4,270,131 | 5/1981 | Tompkins et al. | 346/108 |
| 4,613,877 | 9/1986 | Spencer et al. | 346/160 |
| 4,855,754 | 8/1989 | Tanaka et al. | 346/17 |
| 4,872,025 | 10/1989 | Sekiya et al. | 346/108 |
| 4,894,669 | 1/1990 | Sugiura et al. | 346/160 |
| 5,083,140 | 1/1992 | Peterson et al. | 346/108 X |
| 5,130,524 | 7/1992 | Egawa et al. | 346/108 X |
| 5,142,304 | 8/1992 | Sato et al. | 346/108 |

FOREIGN PATENT DOCUMENTS

| 3736334 | 5/1988 | Germany . |
| 3810894 | 10/1988 | Germany . |

OTHER PUBLICATIONS

Patent Abstracts of Japan, Kokai No. 63–108852, vol. 12, No. 351, Sep. 1988.

*Primary Examiner*—Peter S. Wong
*Assistant Examiner*—Randy W. Gibson
*Attorney, Agent, or Firm*—Fitzpatrick, Cella, Harper & Scinto

[57] ABSTRACT

An image forming apparatus for scanning a light beam modulated in accordance with image information using a rotational polygon mirror comprises a light beam generator for generating the light beam, an adjuster for adjusting the light quantity of the light beam generated by the light beam generator, a driver for driving the rotational polygon mirror in rotation, and a detector for detecting whether the rotational number of the rotational polygon mirror reaches a predetermined rotation number within a predetermined time. The light quantity adjuster starts the light quantity adjustment after the start of driving of the rotational polygon mirror with the driver, and before the rotation number of the rotational polygon mirror reaches the predetermined rotation number.

47 Claims, 37 Drawing Sheets

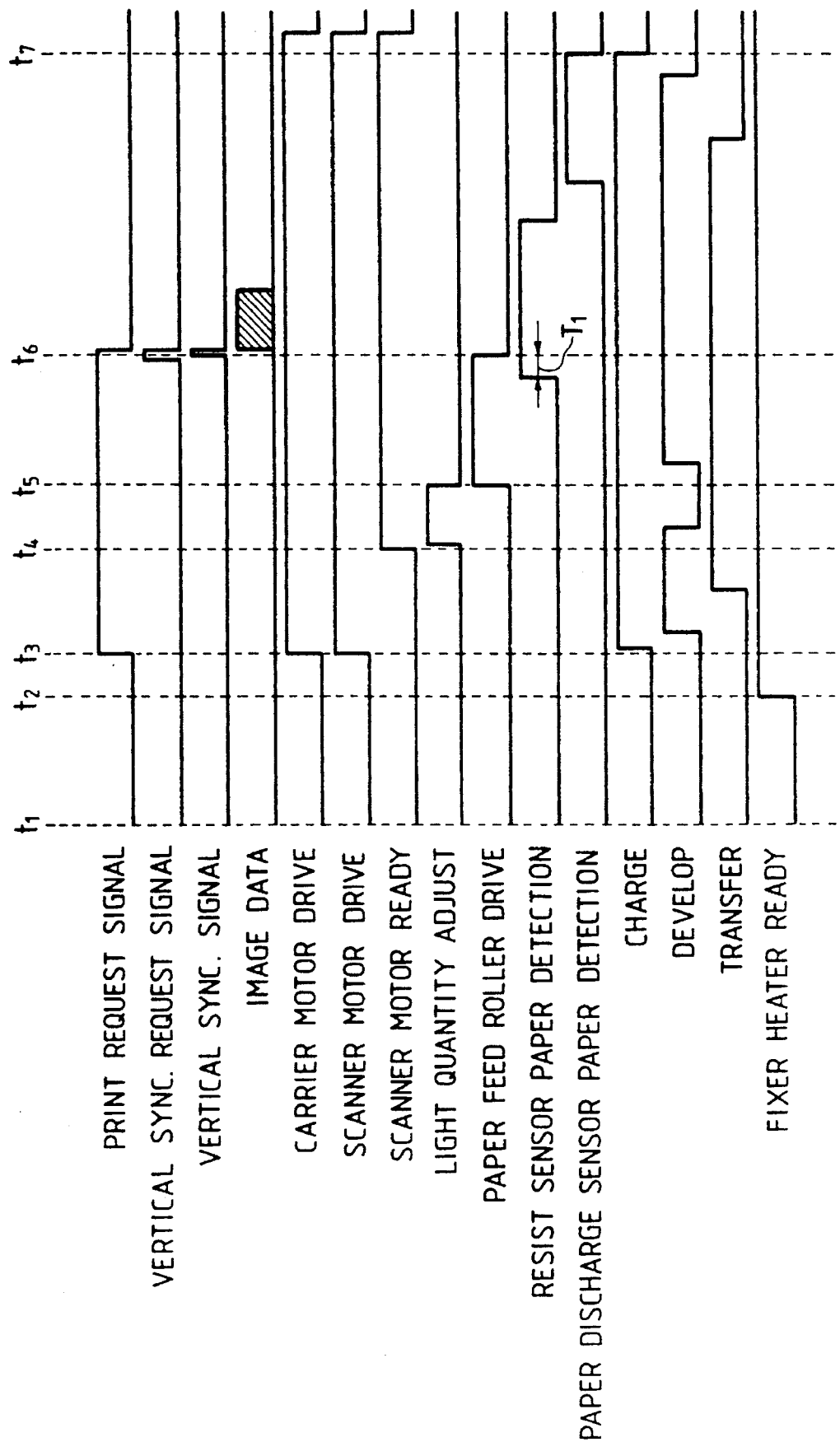

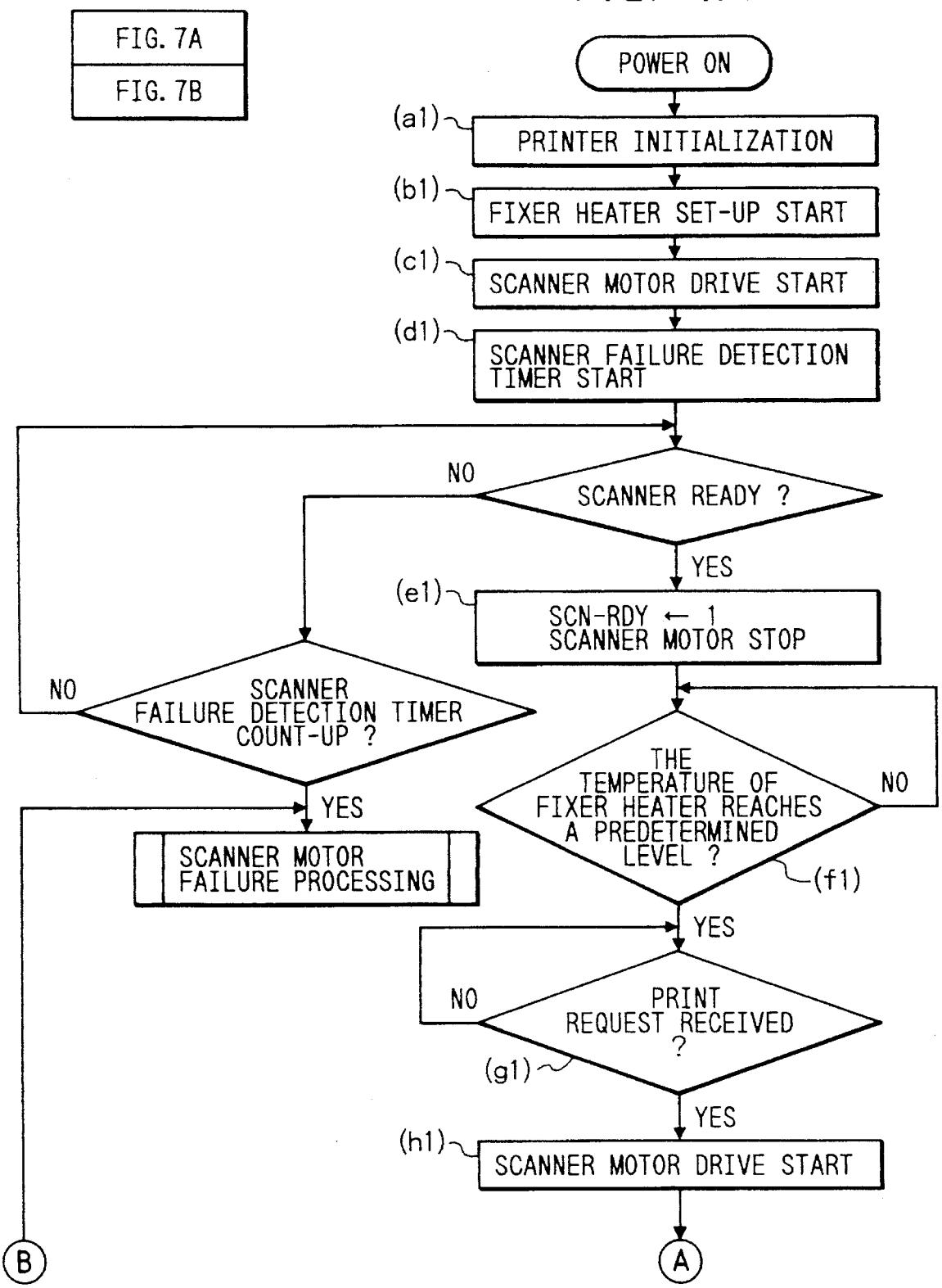

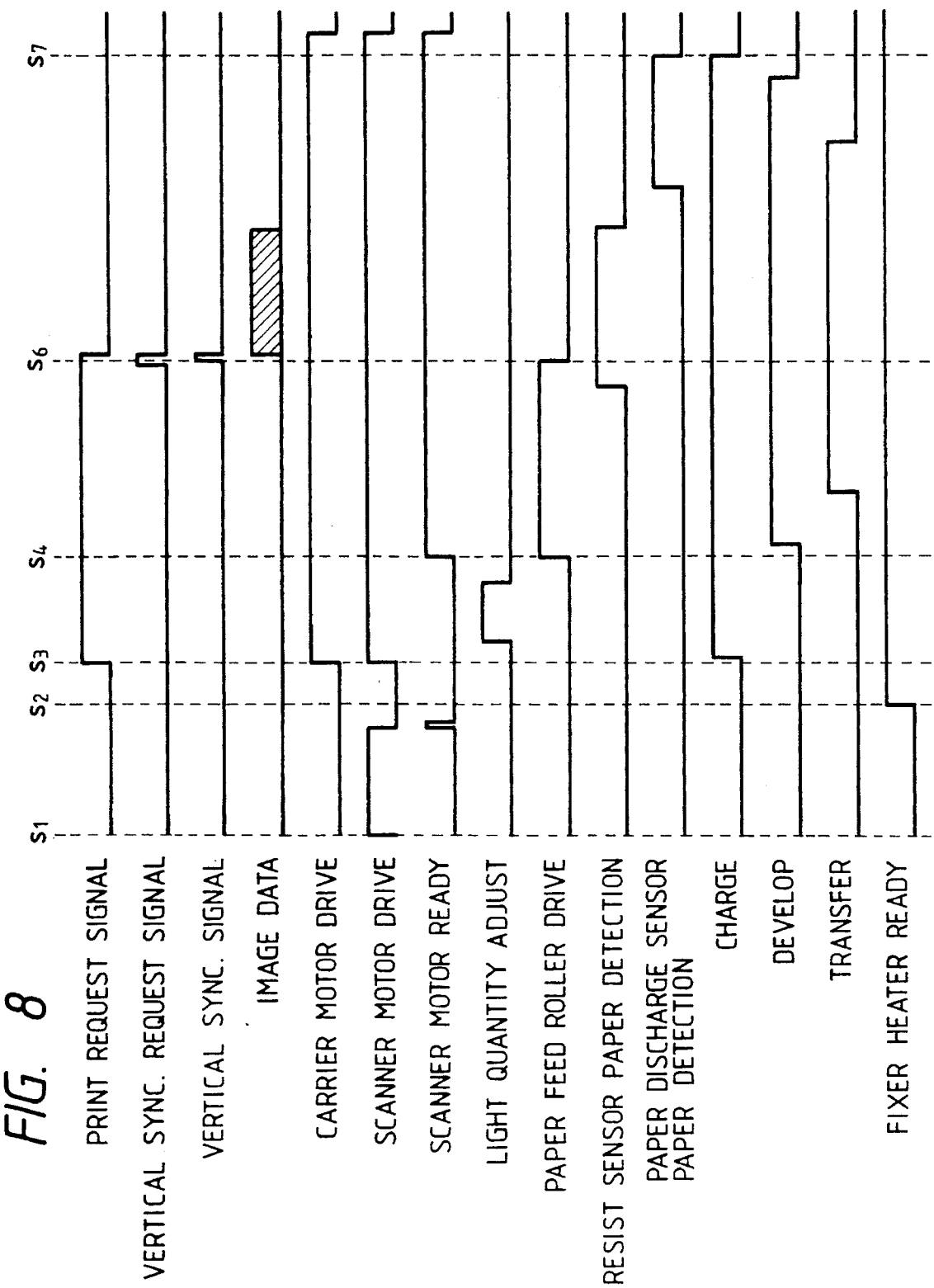

| FIG. 10A | FIG. 10C |
| FIG. 10B | |

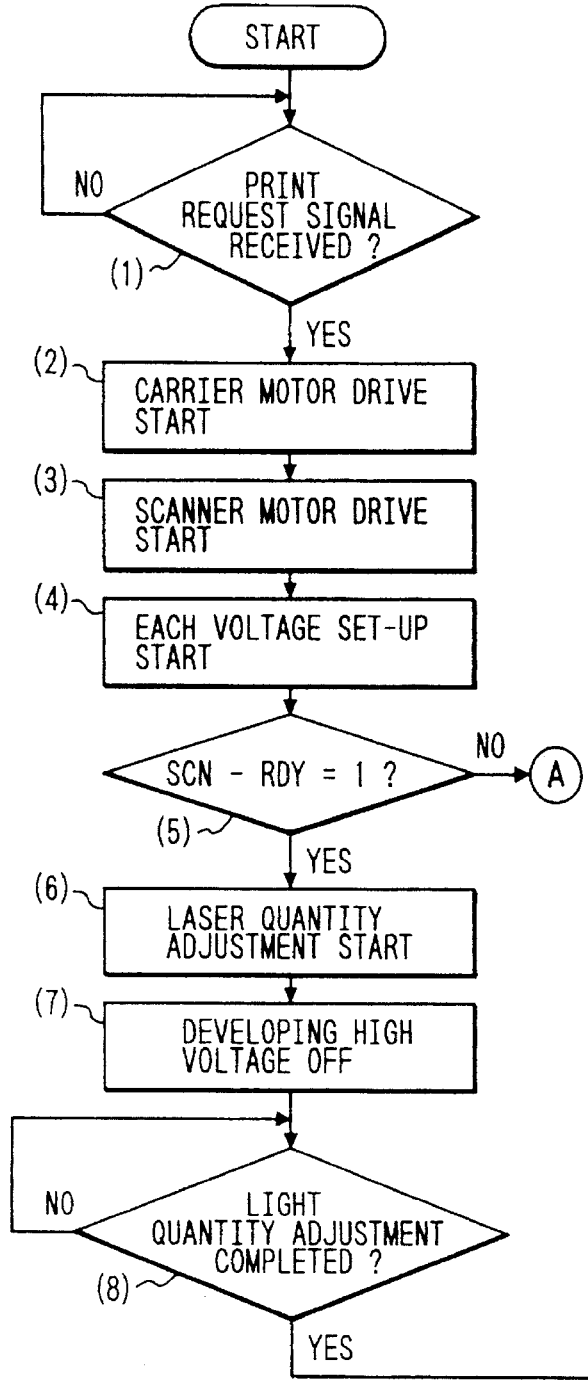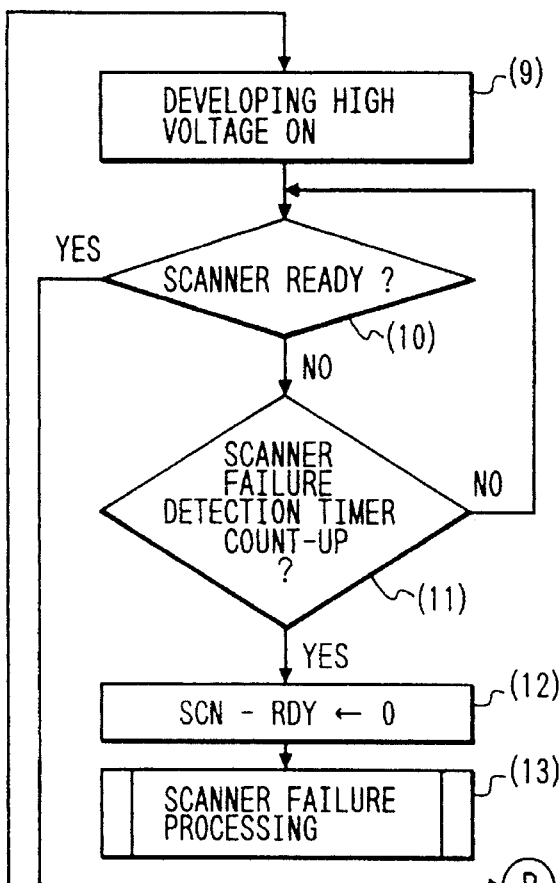

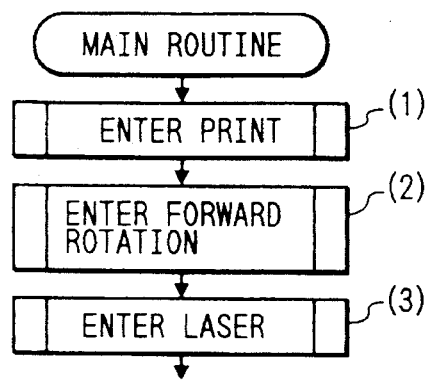
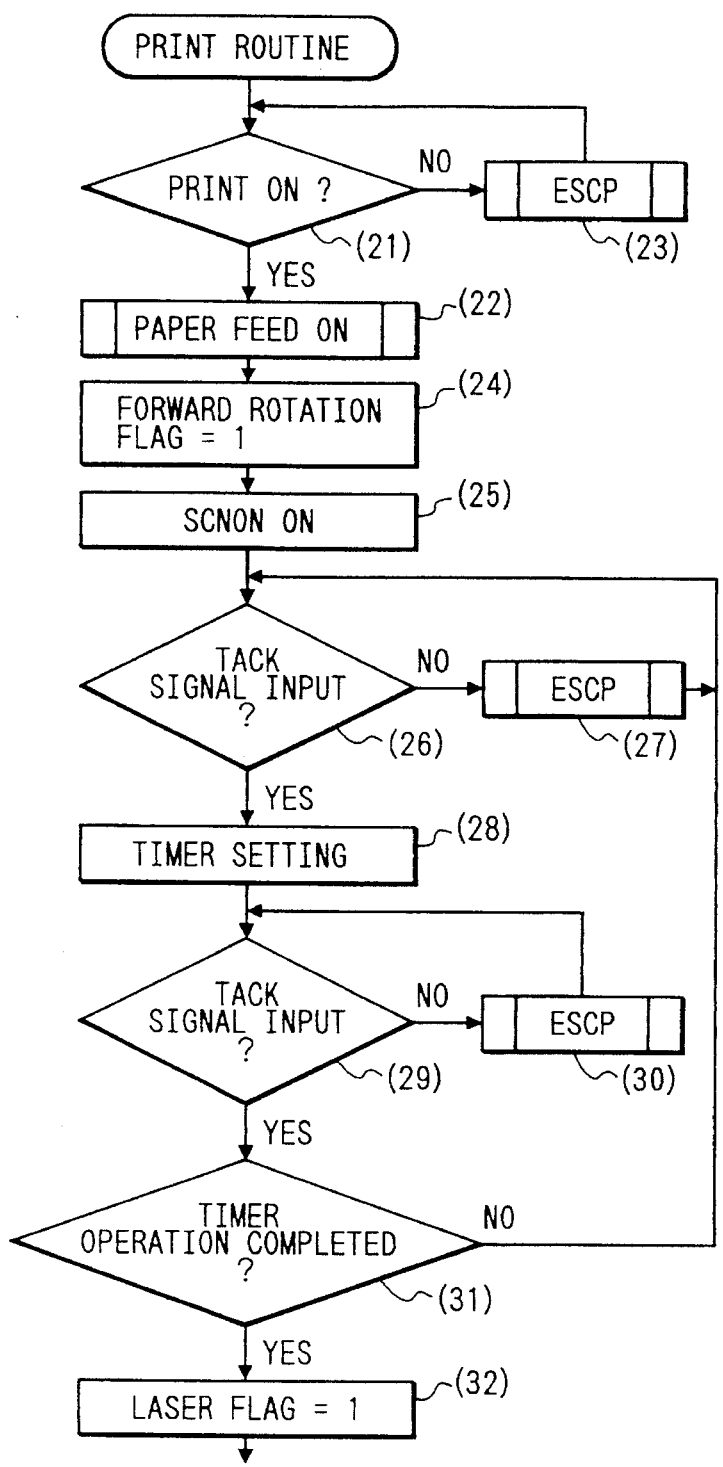

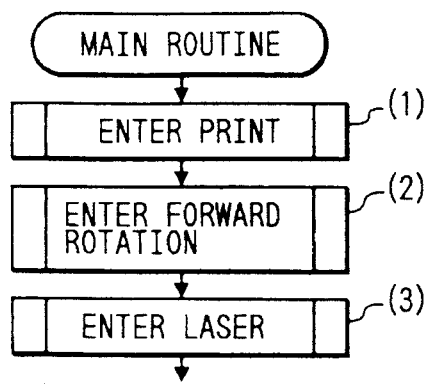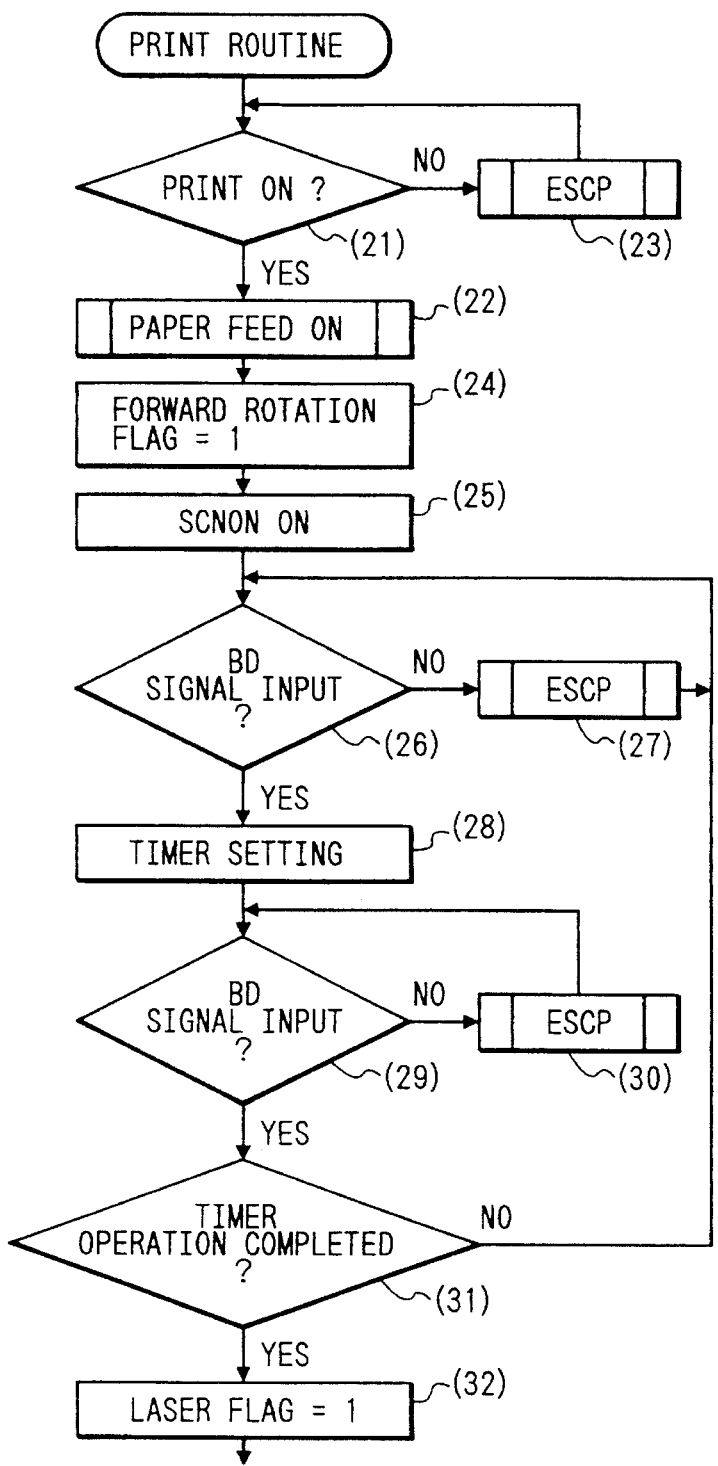

IMAGE FORMING APPARATUS USING A PHOTOSENSITIVE DRUM AND HAVING LIGHT QUANTITY ADJUSTMENT

This application is a continuation of application Ser. No. 07/782,384, filed Oct. 24, 1991, now abandoned.

BACKGROUND OF THE INVENTION

1. Field of the Invention

The present invention relates to an apparatus for forming an image by scanning the light beam.

2. Related Background Art

FIG. 1 is a cross-sectional view for explaining the constitution of such an image forming apparatus, wherein 1 is a photosensitive drum which is an electrostatic latent image carrier, 2 is a semiconductor laser which is a light source, 3 is a polygon scanner for scanning the light beam, 4 is an optical lens, 5 is a charger roller for uniformly charging the photosensitive drum 1, 6 is a developer for developing an electrostatic latent image formed on the photosensitive drum 1 with a toner, 7 is a transfer roller for transferring a toner image formed on the photosensitive drum 1 onto a paper of recording medium, 8 is a fixer roller for fixing the toner transferred onto the paper, 9 is a paper cassette for stacking papers, 10 is a paper feed roller for feeding a paper within the paper cassette 9 into a paper conveying passage, 11 is a paper detecting sensor (resist sensor) for detecting the paper fed therein, 12 is a resist roller for synchronizing the application of image data onto the photosensitive drum 1 with the feeding of paper, as well as correcting for an oblique movement of paper because the paper will abut once against the roller, and 13 is a paper discharge sensor for sensing the paper discharged.

FIG. 2 is a block diagram for explaining one example of a control system of the image forming apparatus as shown in FIG. 1, wherein 14 is a host computer which sends out code data of image to a print controller 15. The print controller 15 monitors the state of a printer engine or directs the operation condition, as well as expanding the code data of image into a predetermined bit map data. A print control unit 16 is to control each mechanism of the printer engine based on instructions of the printer controller 15, each mechanism sending out necessary data to the print control unit 16 and operating with instructions of the print control unit 16. The mechanism is composed of a paper feed driver 17, a high voltage driver 18, a scanner motor driver 19, and a laser driver 20. The paper feed driver 17 supplies the information of sensors 22 such as a paper detecting sensor to the print control unit 16, as well as driving or stopping rollers 21 based on instructions of the print control unit 16. The high voltage driver 18 drives or stops a heater in a fixer 26, as well as drives or stops each high voltage of a charger 23, a developer 24, and a transfer unit 25 with instructions of the print control unit 16. And it returns the temperature information of the heater necessary for controlling the print control unit 16. The scanner motor driver 19 returns the information of whether or not the scanner motor 27 reaches a predetermined rotation number, as well as drives or stops the scanner motor 27 with the instruction of the print control unit 16. 28 is a laser driver for turning on or off a semiconductor laser, not shown, based on the print data. 29 is a laser adjuster for detecting the quantity of a laser light emitted and returning a detected output to the laser driver 20.

Referring now to FIGS. 3 and 4, a print sequence in a conventional image forming apparatus will De described below.

FIG. 3 is a flowchart showing one example of a printing procedure in the image forming apparatus as shown in FIG. 1. Note that (1) to (17) show each step.

If the power is turned on, its own memory such as RAM or each mechanism is first initialized (1). Next, the fixer heater is warmed up at a predetermined temperature (2). If the warming up has been completed, it is placed in a state of receiving a print request from the print controller 15. If a print request signal is received (4), the drive of scanner motor 27 (5) is started by issuing an instruction for starting the drive of scanner motor 27, and the drive of carrier motor is started by issuing an instruction for starting the drive of carrier motor (6). Then, the high voltage driver 18 directs the set-up of each high voltage of charger 23, developer 24 and transfer unit 25 (7). Next, a determination is made whether or not the 10 scanner motor 27 has been set up at a predetermined number of rotations (8), in which if the number of rotations reaches a predetermined one and a scanner ready is received from the scanner motor driver 19, the adjustment of laser light quantity is started to set up at a predetermined value (9). If the light quantity reaches a predetermined level (10), an instruction for feeding a paper from the paper cassette 9 is issued (11). Then the procedure waits for the paper to reach a disposed position of resist sensor 11 (12), and if the paper reaches the disposed position of resist sensor 11, the procedure waits for a predetermined period of T1 sec to correct for the oblique movement (13). And the paper feed roller 10 is stopped, and a vertical synchronizing request signal that is an image output synchronizing signal is issued to the print controller 15 (14). If the vertical synchronizing signal is received from the print controller 15 (15), the print is started by applying the laser beam onto the photosensitive drum 1 (16). Next, if the paper discharge sensor 13 detects a paper discharged (17), one page print is terminated by stopping each driver.

FIG. 4 is a timing chart for explaining one example of the print sequence in the image forming apparatus as shown in FIG. 1. Note that t1 to t7 indicate each timing.

If the power is turned on (t1), the heater temperature of fixer roller 8 is set up at a predetermined one (t2). Then if a print request signal is received (t3), the operation is placed in a scanner ready state (t4), so that the pick up of a paper is started (t5). Then, if the vertical synchronizing signal is received (t6), the print processing is started, and if the paper discharge sensor 13 detects a paper discharged (t7), one page print is terminated by stopping each driver.

However, the above conventional example had a problem that the time from a standby state via the reception of a print request to the print termination (referred to as a first print time) was long, because the carrier motor and the scanner motor 27 were started (t3) after the reception of the print request, and further the laser light quantity adjustment was started after waiting for the scanner to reach a predetermined rotation number (t4).

Also, this type of recording apparatus first performed the print preparatory operation if it receives a print start request signal (print request signal PRINT), and subsequently performed the print operation. Particularly, a laser beam printer (LBP) was constituted in the following way. An image signal transmit control unit (controller) transmits a print signal to enable the LBP to perform the print operation. And if it receives an image signal transmit request signal (vertical synchronizing request signal VSNREQ) from the LBP, it outputs an image transmit synchronizing signal (vertical synchronizing signal VSYNC), and transmits an image signal in synchronism with a main scan synchronizing signal (main scan synchronizing signal BD) for forming the image which is received from the LBP.

On the other hand, if the LBP receives the print request signal, it starts the print operation at the timing not affecting a print preparatory operation, as well as starting the print preparatory operation. That is, the rotation control (forward rotation control) of the photosensitive member (photosensitive drum) is performed for the purpose to place the photosensitive member into an electrostatically stable state by applying a high voltage as the print preparatory operation, light quantity adjusting means (laser APC) is operated for setting the laser light source at a predetermined light quantity, or a polygon mirror scanning motor (scanner motor) which is a light scanning device within a scan optical system is set up at a desired scan speed to cause the light source to be scanned at a certain scan speed. Besides the print preparatory operation, a print paper is fed at a desired timing in accordance with the end timing of print preparatory operation for the print operation. Near the end timing of print preparatory operation, the vertical synchronizing request signal VSNREQ and the vertical synchronizing signal VSYNC are transmitted and/or received, and an image developed on the photosensitive member is synchronized with the print paper (resist adjustment).

Here, the specific timings in the LBP will be described with reference to FIGS. 5A & 5B.

FIGS. 5A & 5B are timing charts for explaining a resist adjusting processing in this kind of recording apparatus, with the axis of ordinates showing the rotation number (rpm) of the scanner motor and the axis of abscissas showing the time (sec).

In FIGS. 5A & 5B, if a print request signal PRINT is received, the prerotation control and the setup of the scanner motor at a set rotation number are first performed. Then at the timing when both operations are completed, the set-up of the laser light quantity is performed at a desired light quantity. At this adjustment timing for the light quantity, firstly, the laser light set-up must be necessarily performed when the laser is scanned by the rotation of the scanner motor, because if the light beam is concentrated at a point on the surface of photosensitive member when the light quantity is applied, the photosensitive characteristics at its portion are significantly degraded so that the image quality may be decreased. Secondly, if the light is applied with the laser light set-up, the photosensitive drum may be exposed to the light, and developed with the developer unit if left away, so that a developing powder may stick onto a transfer roller, making dirty the transfer roller, and thus a back face of print paper, which may significantly degrade the print quality, whereby the developing action must be prevented by turning off the development bias at the timing when an exposed drum face is brought to the developer unit (this processing is referred to as a postprocessing for laser light quantity adjustment). But since the development bias could not be turned off in the prerotation control, it was necessary to make different the phase between prerotation control period, laser light quantity step and processing control period. As above described, the print preparatory operation was started at the timing when the scanner motor was rotating and the postprocessing control for the laser light quantity adjustment did not overlap the prerotation control. Accordingly, the paper feed timing of a print paper was started at a timing 3.3 sec before the end timing of print preparatory operation (a timing after the passage of 5.5 sec from the reception of print request signal PRINT) as shown in FIGS. 5A & 5B.

However, with the constitution of the above constitutional example, if the time from the reception of print signal PRINT to the discharge of print paper (first print time) was calculated, it would be extended by the amount of print preparatory operation (about 2.2 sec) beyond an actual paper conveying time of this LBP.

Accordingly, there was a problem with the LBP which was associated with more intermittent print operations than continuous print operations, that the life of photosensitive member might be decreased, because the rotation of photosensitive member would be increased in proportion to the number of prints (it is said that the life of photosensitive member is proportional to its rotation time).

As shown in FIGS. 5A & 5B, the most consuming time in the print preparatory operation is a required time for setting up the rotation of scanner motor at a set scanning speed, and the time for which the scan speed is judged to have been stabilized. In the LBP, it is set at 3.2 sec by ability. That is, the most important factor in determining the print preparatory operation is a time for setting up the scanner motor rotation at a set scan speed, and a scan speed stabilization time for which the scan speed becomes stable. The set up time of scanner motor rotation can be improved by manipulating the motor drive current. However, the time for the stabilization of scan speed depends on the environmental condition at the service or variations of each device, and in practice, the scan speed stabilization time amounting to a predetermined greatest required time (which was often set at 1 sec in the LBP) was needed.

On the other hand, in recent recording apparatuses, the first print time holds a very important position as one item for the comparison of performance of recording apparatus, and may determine the performance of recording apparatus depending on the first print time. That is, in increasingly intensive development competitions, it is of urgent necessity in the present situation to shorten the first print time without sacrificing the performance, reliability or life of recording apparatus.

SUMMARY OF THE INVENTION

It is an object of the present invention to solve the above-mentioned technical problems.

It is another object of the present invention to provide a recording apparatus which allows the first print time to be shortened by initiating the set-up of light quantity control for a light source, before a scan optical system has been set up at a desired scan speed. Also, it is another object of the present invention to provide a recording apparatus which allows the first print time to be largely shortened, in such a manner as to determine any scan speed stabilization time for a scan optical system by detecting a changing condition of the scan speed in the scan optical system, after the scan speed of the scan optical system has reached a desired scan speed.

Other objects and advantages of the present invention will be more apparent from the following detailed description and claims, and with reference to the accompanying drawings.

BRIEF DESCRIPTION OF THE DRAWINGS

FIG. 4 is a timing chart showing one example of a print sequence in the image forming apparatus.

FIGS. 7 7A, and 7B, are control flowcharts in a first example of the present invention.

FIG. 8 is a timing chart for explaining the operation in the first example of the present invention.

FIGS. 12, 12A, and 12B, are flowcharts showing one example of a print processing procedure with a print control unit in a third example.

FIGS. 26A and 26B are a series of flowcharts showing one example of a third control procedure for the light quantity adjustment start timing in the recording apparatus in the tenth example of the present invention.

FIGS. 32A and 32B are a series of flowcharts showing one example of a fifth control procedure for the light quantity adjustment start timing in the recording apparatus in the twelfth example.

DESCRIPTION OF THE PREFERRED EMBODIMENTS

The preferred examples will be described below with reference to the accompanying drawings.

First example

Figure 1:
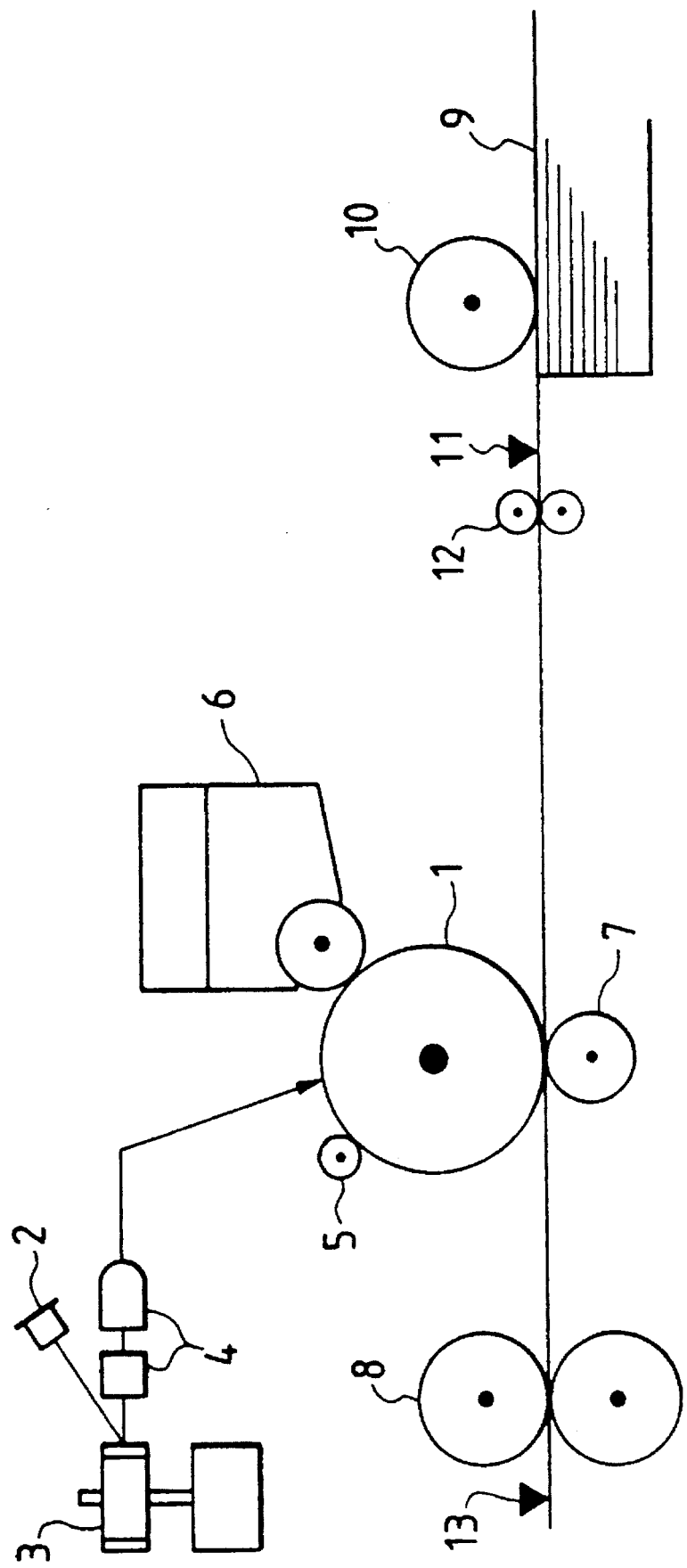
FIG. 1 is a cross-sectional view showing the mechanical configuration of a general image forming apparatus by the use of an electrophotographic system.
Figure 2:
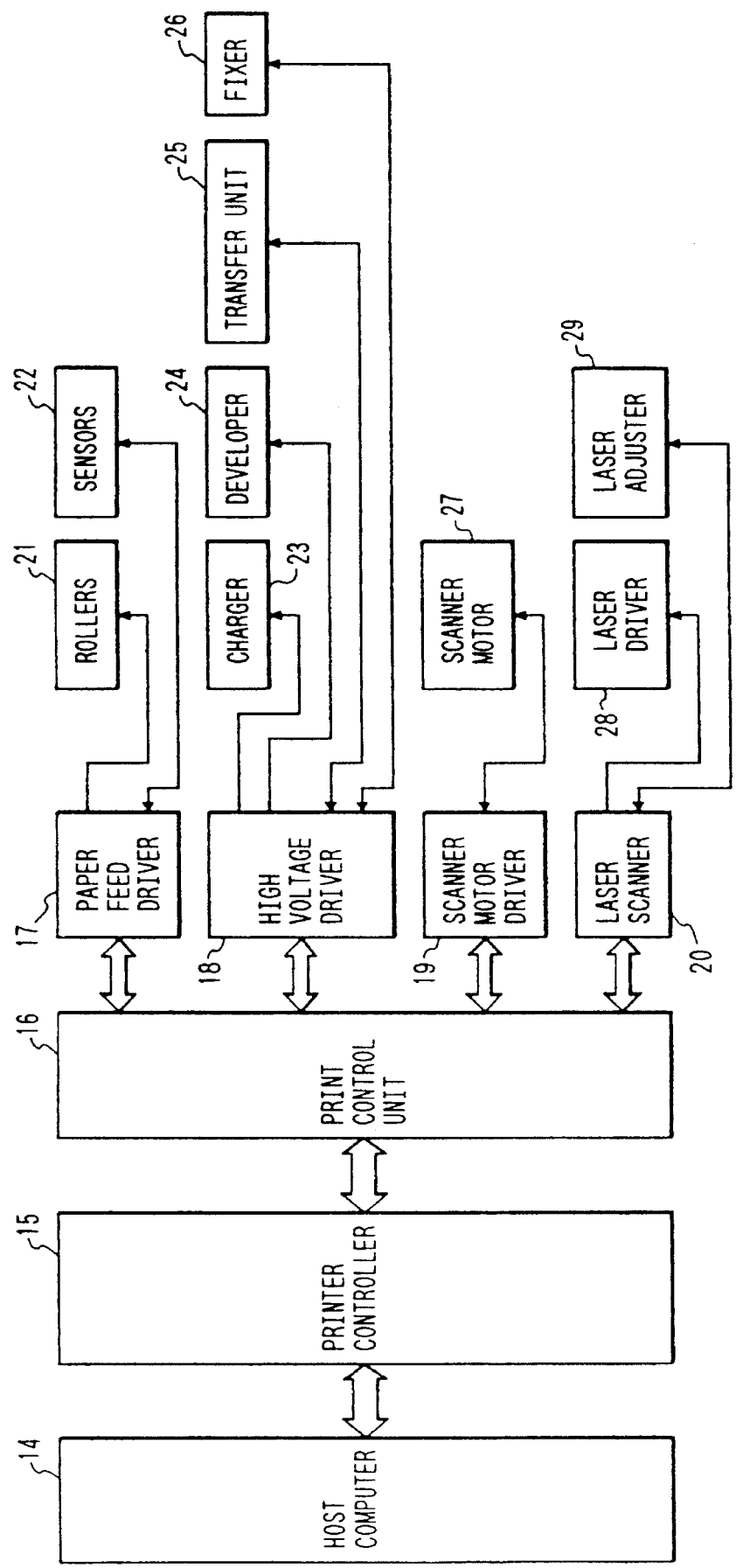
FIG. 2 is a block diagram showing the electrical configuration of a control system in the image forming apparatus.

The schematic view of an image forming apparatus which is applied to the first example of the present invention is the same as shown in the conventional example as previously described (FIG. 1), and the explanation of each function will be omitted here.

Figure 6:
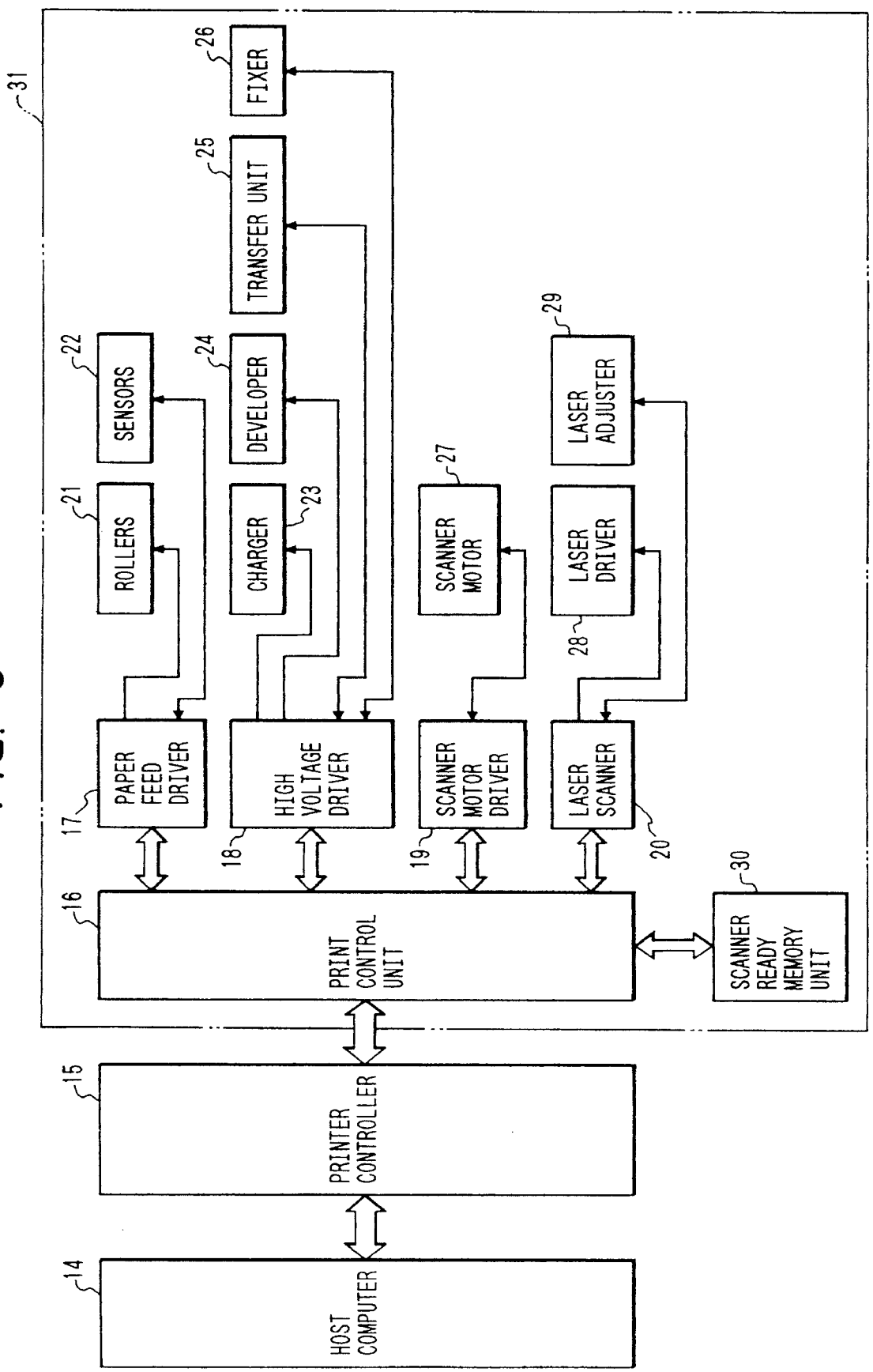
FIG. 6 is a block diagram showing the electrical configuration of a control system in the first to third examples of the present invention.

FIG. 6 is a block diagram for a control system for controlling each mechanism in the first example.

14 is a host computer which sends out code data of image to a print controller 15. The print controller 15 monitors the state of a printer engine 31 or directs the operation condition, as well as expanding the code data of image into a predetermined bit map. A print control unit 16 is to control each of mechanisms 17 to 20 in a printer based on an instruction of the printer controller 15, each of mechanisms 17 to 20 sending out necessary data to the print control unit 16 and operating with instructions of the print control unit 16. The mechanisms 17 to 20 are a paper feed driver 17, a high voltage driver 18, a scanner motor driver 19, and a laser driver 20, respectively. The paper feed driver 17 supplies the information of sensors 22 such as a paper detecting sensor 11 to the print control unit 16, as well as driving or stopping rollers 21 based on instructions of the print control unit 16. The high voltage driver 18 drives or stops a heater in a fixer 26, as well as drives or stops each high voltage of a charger 23, a developer 24, and a transfer unit 25 with instructions of the print control unit 16. And the fixer 26 returns the temperature information of the heater necessary for controlling the print control unit 16. The scanner motor driver 19 returns the information of whether or not the scanner motor 27 reaches a predetermined rotation number, as well as drives or stops the scanner motor 27 with an instruction of the print control unit 16. A laser driver 20 emits the laser beam based on a laser light-up signal sent from the print control unit 16, and a laser adjuster 29 returns the light quantity information necessary for the adjustment of laser light quantity to the print control unit 16. 30 is a scanner ready memory unit for storing the indication of a scanner ready status when the scanner ready status is returned within a predetermined time from the scanner driver 19 after a scanner drive command is issued to the scanner motor driver 19 during the set-up of the fixer heater 26 after turning on the power.

Figure 7B:
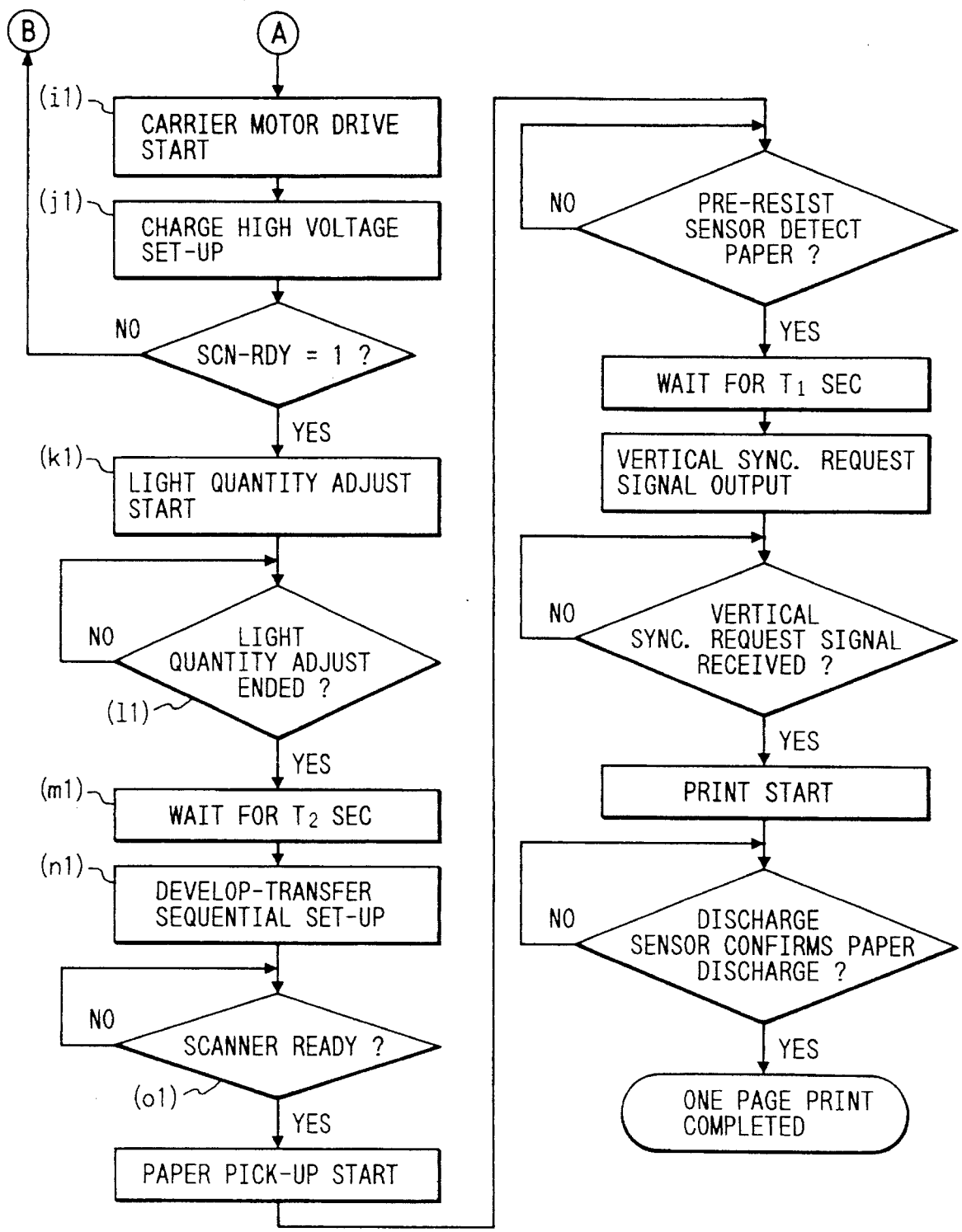

FIGS. 7A & 7B are flowcharts showing the operation of the print control unit 16 from the power on to the print of one page.

If the power is turned on, (a1) the printer is first initialized (1), and (b1) the warm up of the fixer heater is started. Further, (c1) the drive of the scanner motor is started, and at the same time (d1) a timer for detecting the scanner motor failure is started. When the scanner does not become ready even if the timer is counted up, the failure processing is performed, and when it becomes ready, (e1) the content of the scanner ready memory unit 30 referred to as a SCN_RDY flag is stored as "1", and at the same time the drive of the scanner motor is stopped. And (f1) if the fixer heater has become ready, (g1) the procedure is placed in a print request waiting state. If a print request is received, (h1) the start of the scanner motor, (i1) the start of the carrier motor, and (j1) the set-up of high voltage for charging are performed, and (k1) the adjustment of laser light quantity is started if the content of the SCN_RDY flag is "1". Then, (l1) if the adjustment of laser light quantity is ended, (m1) after the passage of a predetermined time $T_2$ (sec), (n1) each high voltage for the development and transfer is sequentially set up. And (o1) the pick-up of a paper is started at the timing when the scanner becomes ready, and then the print processing is performed in the same way as in step (l1) and following steps shown in FIG. 3 in the conventional example. Here, the reason why the development and transfer at (n1) is performed after the completion of light quantity adjustment is that a latent image on the photosensitive drum 1 caused by the laser light emitted in adjusting the light quantity is prevented from developing and the transfer roller is not made dirty. Accordingly, this can be also achieved with another method in which the development and transfer is once set up before the adjustment of light quantity, and the high voltage for development is turned off for a period corresponding to the position of the photosensitive drum for which the light quantity adjustment has been made. The timing chart for the former is shown in FIG. 8, while that for the latter is shown in FIG. 9.

In FIG. 8, if the power is turned on at the timing s1, the fixer heater becomes ready at the timing s2, and a print request signal is received at the timing s3. Then the scanner motor ready and the paper pick-up are both started at the timing s4, a vertical synchronizing signal is received at the timing s6, and the paper discharge is ended at the timing s7. Accordingly, the adjustment of light quantity will be performed at the timings s3 to s4 (before a scanner ready is output), so that the timing corresponding to that from t4 to t5 (FIG. 4) is shortened as compared with the conventional example. Note that the development is performed at the timing s4 or subsequent timings in this example.

Figure 9:
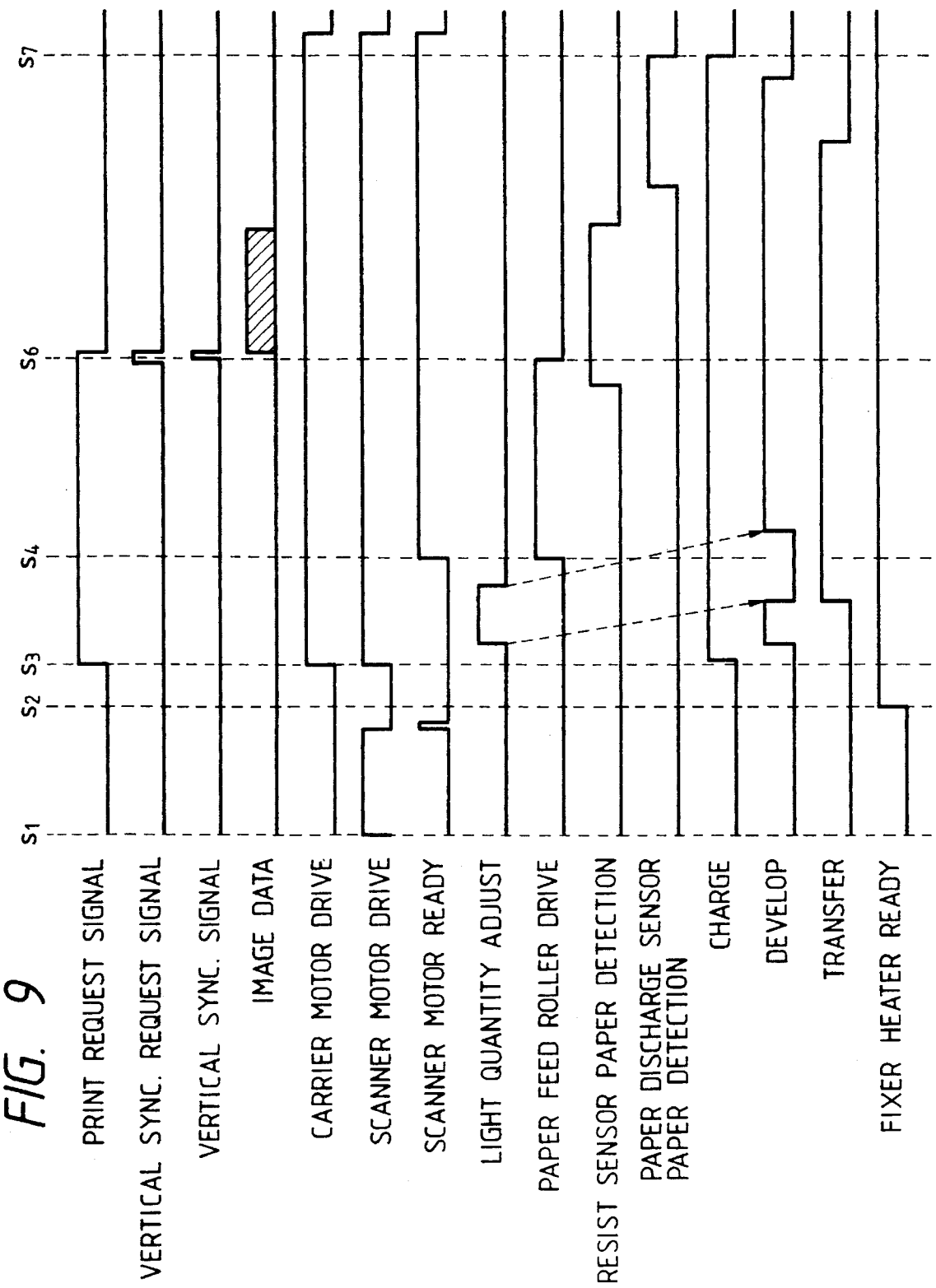
FIG. 9 is a timing chart for explaining the operation in a variation of the first example of the present invention.

FIG. 9 shows a timing chart of the control when the high voltage for development is turned off at the timing corresponding to a position on the photosensitive drum on which the adjustment of light quantity has been made. In this case, it is also possible to shorten the period corresponding to the timings t4 to t5 in the conventional example, because the timing of development and transfer is only different from that of FIG. 8.

Since the scanner motor can be sufficiently set up to a ready state during a warm-up period of the heater, with the warm-up of the fixer heater being ten seconds to several tens seconds, and the set-up of the scanner motor being about several seconds, for example, as above described, the first print time can be shortened in a period from the power on to a print request receiving enable state without having any effect in this example.

Figures 10, 10A:
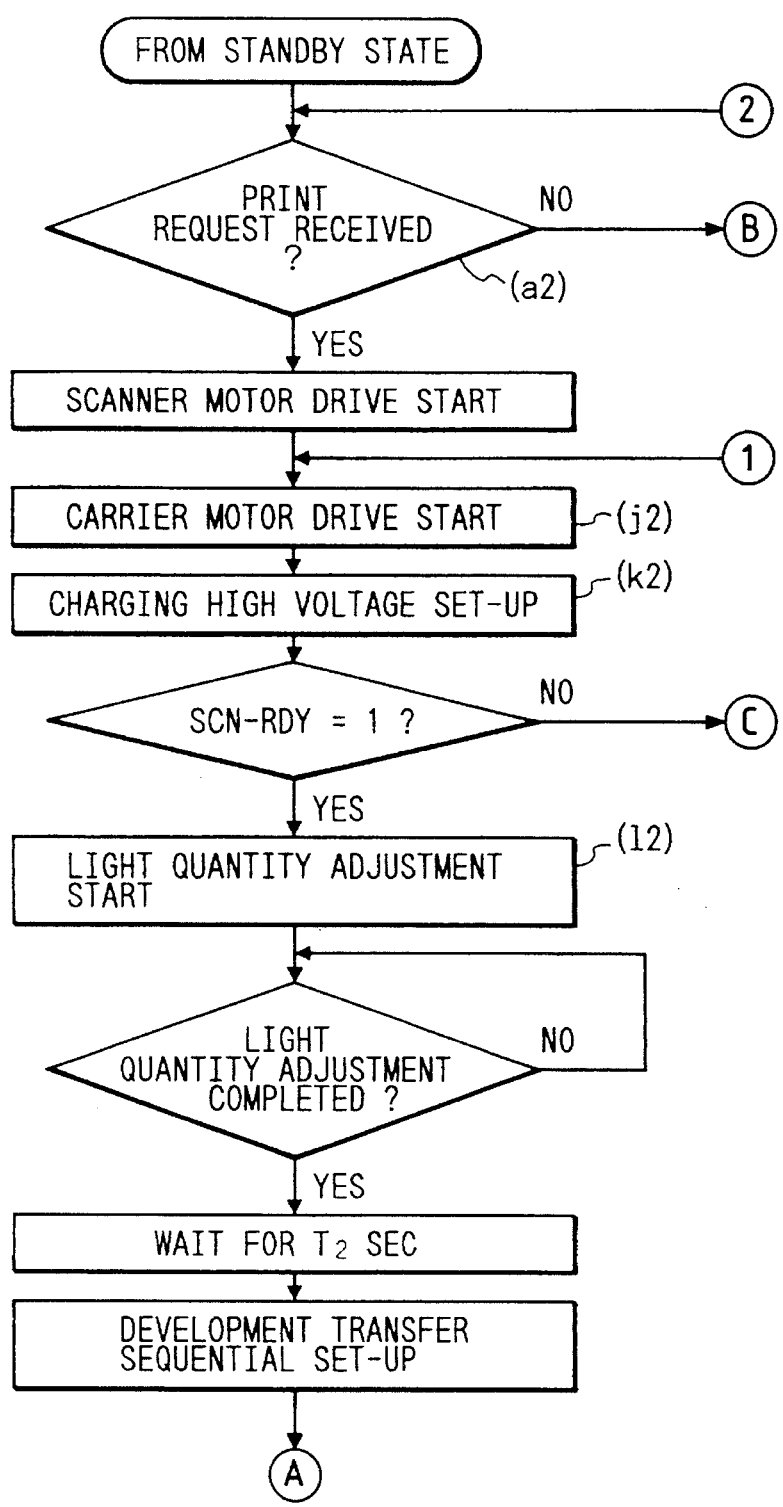
FIGS. 10 & 10A–10C, are control flowcharts in a second example of the present invention.
Figure 10B:
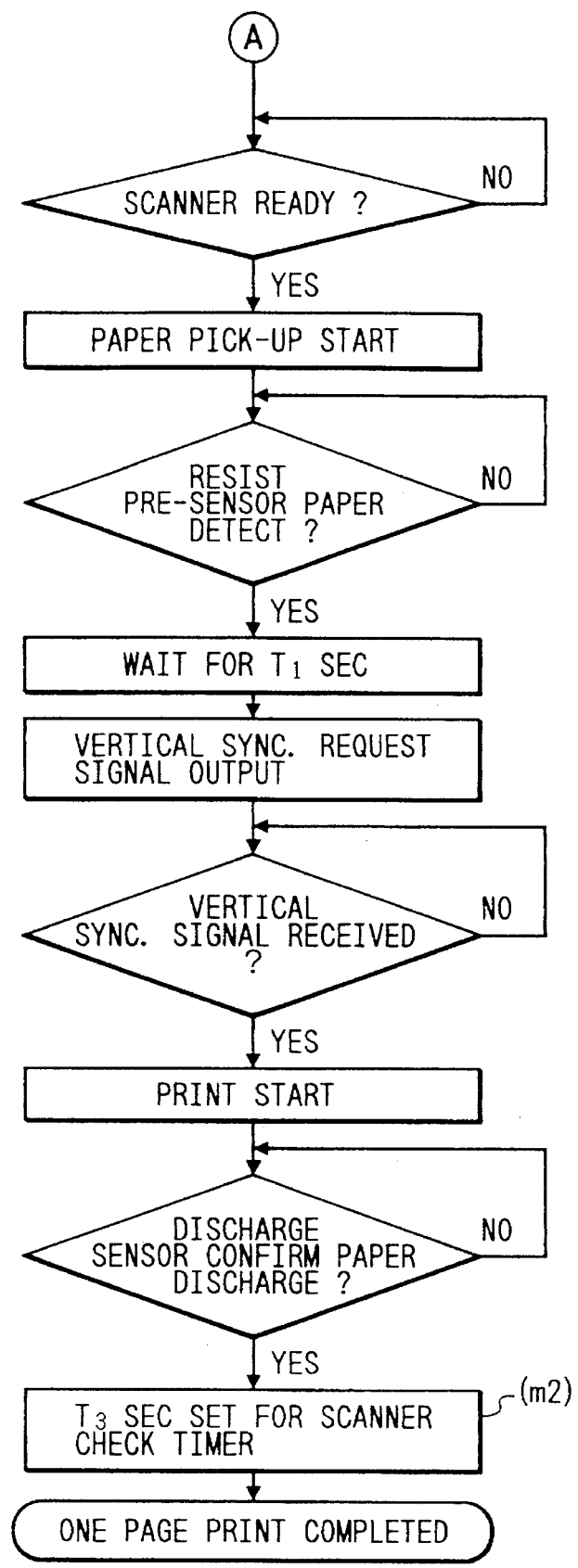
Figure 10C:
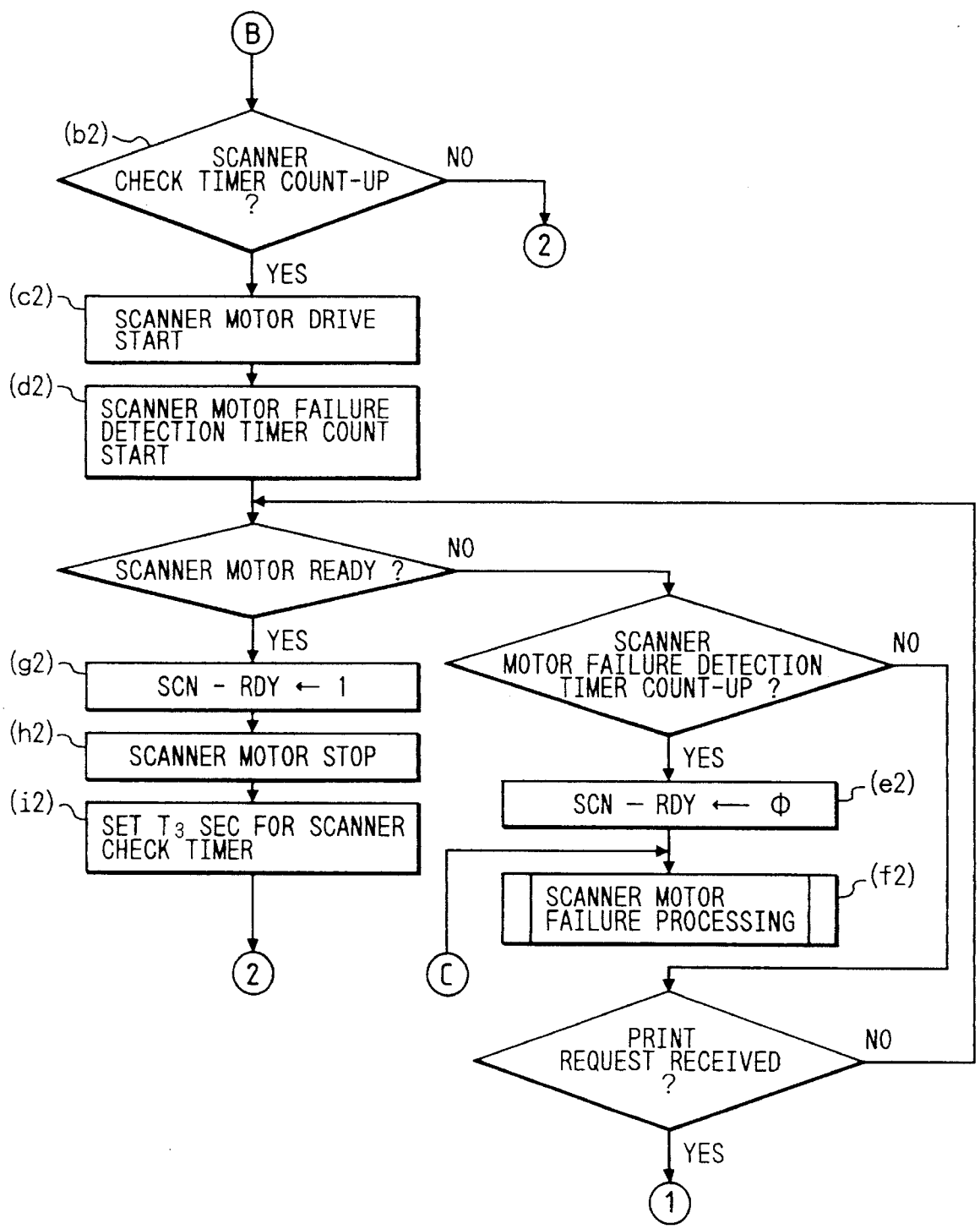

FIGS. 10A–10C are operation flowcharts of print control unit in the second example of the present invention. The printer engine and the control block diagram are the same as in the first example previously shown. Here, there is shown a processing where a print request signal is not received during a predetermined time when the printer is in a print request waiting state.

First, (a2) when there is no print request in a standby state, i.e., in the print request waiting state, (b2) a scanner check request timer of $T_3$ (sec) which has been preset is referred. If the count has not been completed, it is checked again whether or not there is any print request, while if the count has been completed, (c2) the scanner motor is started. At the same time, (d2) the scanner motor failure detection timer is started, and if the scanner motor does not become ready by the time when the failure timer is counted up, (e2) the SCN_RDY flag is set to 0, and (f2) a predetermined scanner motor failure processing is made. When the scanner motor becomes ready before the failure timer is counted up, (g2) the SCN_RDY flag is set to 1, and (h2) the scanner motor is stopped. Also, (i2) the scanner check request timer $T_3$ (sec) for the next check is set. If a print request is received during the scanner check, the procedure transfers to the carrier motor drive processings such as (j2), (k2) and (l2) via ① and enters the print operation. Note that when the print request is received at (a2), the print operation is performed in the same way as in the first example. At the time when the print is completed, (m2) the scanner check request timer $T_3$ (sec) is set again, and the procedure is placed in the print waiting state.

Figure 11:
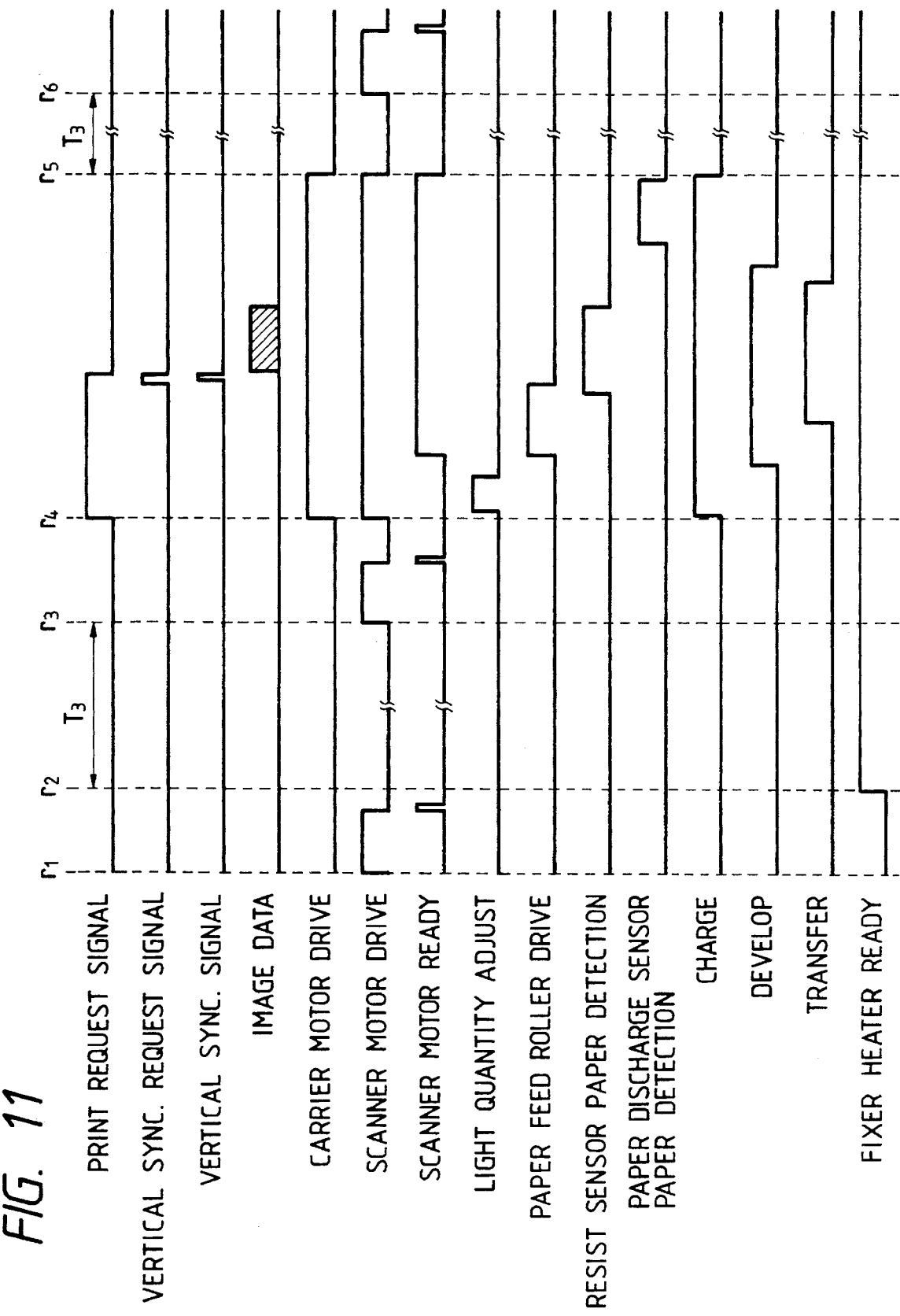
FIG. 11 is a timing chart for explaining the operation in the second example of the present invention.

As described, in this example, only when the print waiting state continues for $T_3$ (sec), the scanner motor is driven, and then it is checked whether or not the scanner motor is ready, so that the latest state of the SCN_RDY flag can be held at all times. This control is shown with a timing chart in FIG. 11.

In the figure, the power is turned on at the timing r1, and the fixer heater becomes ready at the timing r2. At the timing r3 after the passage of $T_3$ (sec) from the fixer heater ready and thus the print waiting state, the scanner motor is driven, and stopped when the scanner becomes ready. At the timing r4, a print request is received, and at the timing r5, one page of print is completed. From this time, the scanner check request timer is started again. And at the timing r6 after the passage of $T_3$ (sec), the scanner motor is driven again and confirmed for the ready state.

In this example, the scanner motor is checked for the ready state at fixed intervals of $T_3$ (sec), even in the print request waiting state where the state of scanner motor can not be confirmed, so that the latest data (SCN_RDY) can be held at all times, thereby enhancing the reliability in driving the scanner with the adjustment of light quantity at actual print. Also, based on the flowchart of FIG. 10, the procedure can transfer immediately to the print sequence even if the print request is received during the rotation of the scanner due to the scanner check, so that the first print time can be improved without having any adverse effect on the print operation.

While in the first and second examples, the paper pick-up operation is performed after entering the scanner ready state, there are some types of printers that the paper pick-up operation is performed along with the driving of the scanner and carrier motors after the receipt of print request, the paper is awaited at the position of a resist roller from the scanner ready until the completion of light quantity adjustment, and then a vertical synchronizing signal is output after the completion of light quantity adjustment. For such a type of printer, it is also possible to improve the first print time by performing the first and second examples. Furthermore, as the scanner failure can be detected with the scanner ready flag (SCN_RDY flag) prior to the pick-up of paper (the set-up of scanner motor), a new effect arises that when the print request arrives, the paper will not be picked up wastefully.

As above described, by providing a feature of confirming beforehand that the scanner motor can be driven at a predetermined rotation number and storing that confirmation, it is possible to perform the adjustment of laser light quantity before the scanner ready, which conventionally could be made only in the scanner ready, so that it is possible to largely shorten the period from the standby state through the receipt of print request to the completion of print (first print time), thereby significantly contributing to a higher performance of the printer.

Third example

Figure 12B:
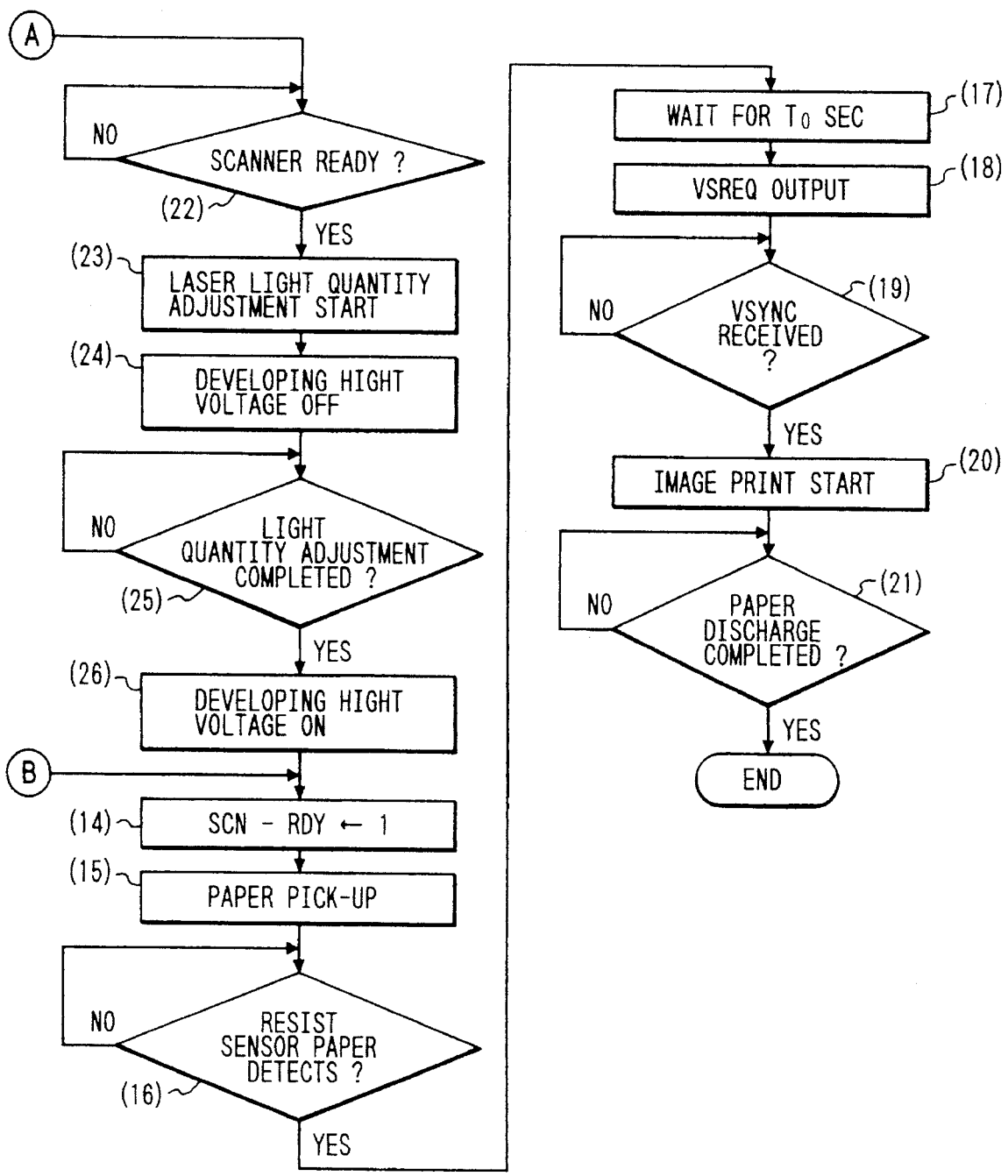

FIGS. 12A & 12B are flowcharts showing one example of a printing procedure in the third example of the present invention. The electrical constitution of this example is the same as in the first example (FIG. 6), and the explanation will be omitted. Note that (1) to (26) show each step.

If the power is turned on, its own memory such as RAM or each mechanism is first initialized, the fixer heater is warmed up at a predetermined temperature, and the procedure is placed in a state where a print request from the print controller 15 is received. If a print request signal is received (1), the drive of carrier motor and scanner motor 27 is started (2), (3), and each high voltage of charger 23, developer 24, transfer unit 25 and fixer 26 is sequentially set up. And the content of scanner ready memory unit 30, i.e., the content of the SCR_RDY flag, is checked to see whether or not it is 1 (5), and if the answer is YES, the laser quantity adjustment is started without waiting for the scanner ready state. Next, the high voltage is turned off (7), and the procedure waits for the completion of light quantity adjustment (8). And the developing high voltage in the developer 24 is turned on (9). Then a determination is made whether or not the rotation state of scanner motor 27 is in a ready state (10), in which if the answer is YES, the procedure proceeds to step (14), while if the answer is NO, a determination is made whether or not the scanner failure detection timer count-up is completed (11), in which if the answer is NO, the procedure returns to step (10), while if the answer is YES, the SCN_RDY flag on the scanner ready memory unit 30 is set to 0 (12), and the scanner failure processing is performed (13).

On the other hand, if the answer is YES at step (10), the SCR_RDY flag on the scanner ready memory unit 30 is set to 1 (14), and the paper pick up is started (15). Next, the procedure waits for the resist sensor 11 to detect the leading end of paper (16), and if the paper is detected, a vertical synchronizing request signal VSREQ is output to the print controller 15, after the passage of a predetermined time $T_0$ sec (18). Next, if a vertical synchronizing signal VSYNC is received from the print controller 15 (19), the image print is started (20). Then if the paper discharge sensor 13 detects the completion of paper discharge (21), the motor and high voltage units are set up because of the completion of one page print, whereby the system is placed in the print request waiting state again.

On the other hand, if the determination is NO at step (5), it is checked whether the rotation state of scanner motor 27 is a ready state (22), in which if the answer is YES, the adjustment of semiconductor laser light quantity is started (23), the developing high voltage is turned off (24) so that an electrostatic latent image formed on the photosensitive drum 1 with the laser emission at the light quantity adjustment is not developed by the toner, and the procedure waits for the completion of light quantity adjustment (24). Then if the light quantity adjustment is completed, the high voltage driver 18 turns on the high voltage for the developer 24 (26), and then the procedure returns to step (14).

Figure 13:
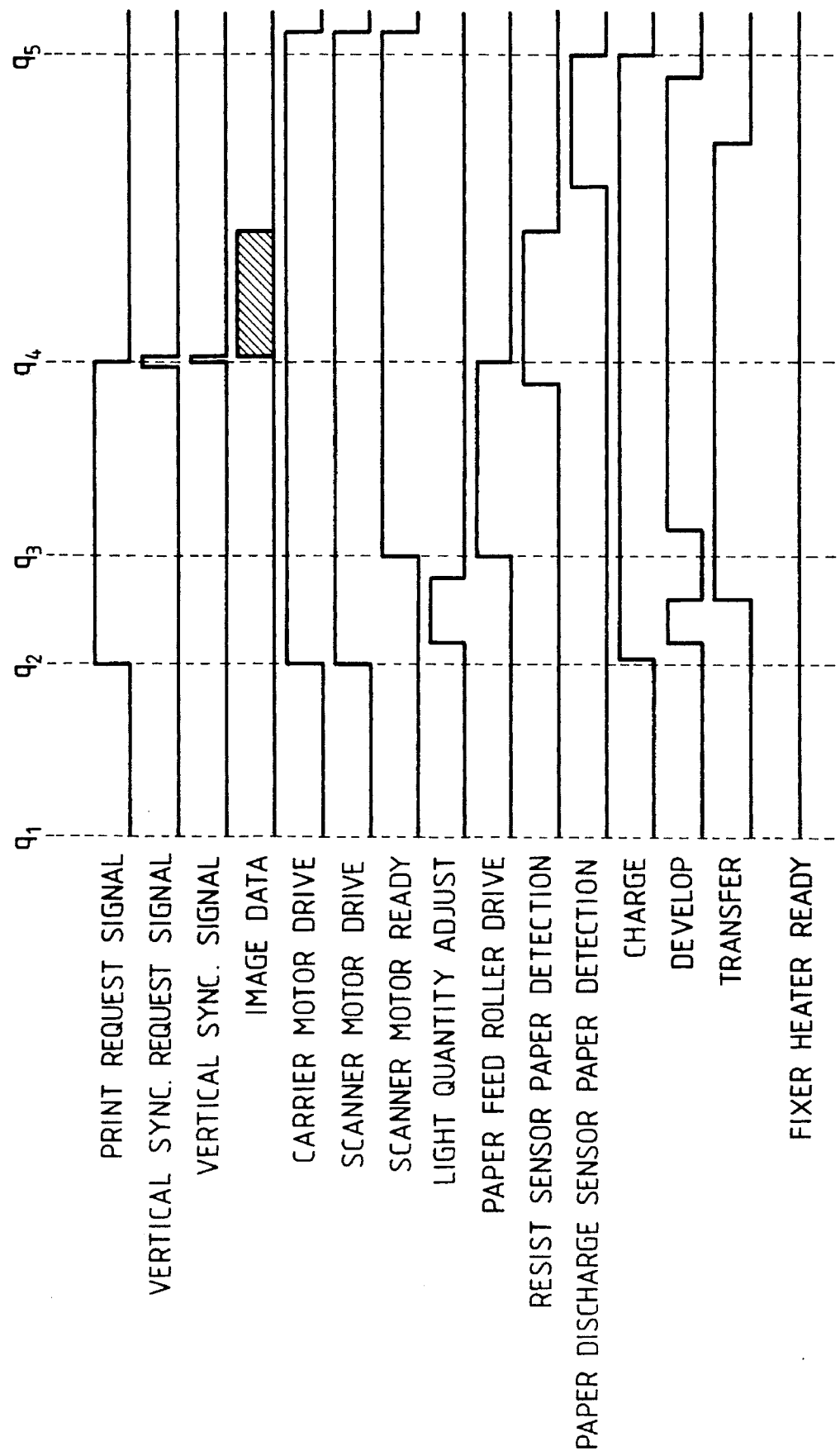
FIG. 13 is a timing chart for explaining one example of a print sequence with a print controller in the third example.

FIG. 13 is a timing chart for explaining one example of the print sequence with the print controller 15. Note that q1 to q5 show the timing.

In the print waiting state (q1), if a print request signal is received (q2), the carrier motor, the scanner motor 27 and each high voltage are set up. The SCN_RDY flag (having a content of 1 in this example) on the scanner ready memory unit 30 which was rewritten at the previous set-up is checked, and tile light quantity adjustment of semiconductor laser is immediately started. Substantially in synchronism with the start of light quantity adjustment, the developing high voltage is turned on or off. In this way, if the light quantity adjustment is completed and thus the scanner is ready (q3), the paper pick-up is started. Then waiting for the resist sensor 11 to have a paper, a vertical synchronizing request signal VSREQ is output (q4). If a vertical synchronizing signal VSYNC is received in accordance with the vertical synchronizing request signal VSREQ, the output of image data is started. Then if the print is ended, each high voltage is lowered, the carrier motor and the scanner motor 27 are stopped (q5), and the procedure is placed in the print waiting state again.

In this example, if the SCN_RDY flag is set to 1 at the initialization of the printer, the adjustment of light quantity can be made during the set-up of the scanner to print the first page after turning on the power. On the contrary, if the SCN_RDY flag is set to 0, it is also possible to take a sequence of making the light quantity adjustment after the scanner has been set up to the ready state, only when the first page is printed after turning on the power.

Fourth example

Figure 14:
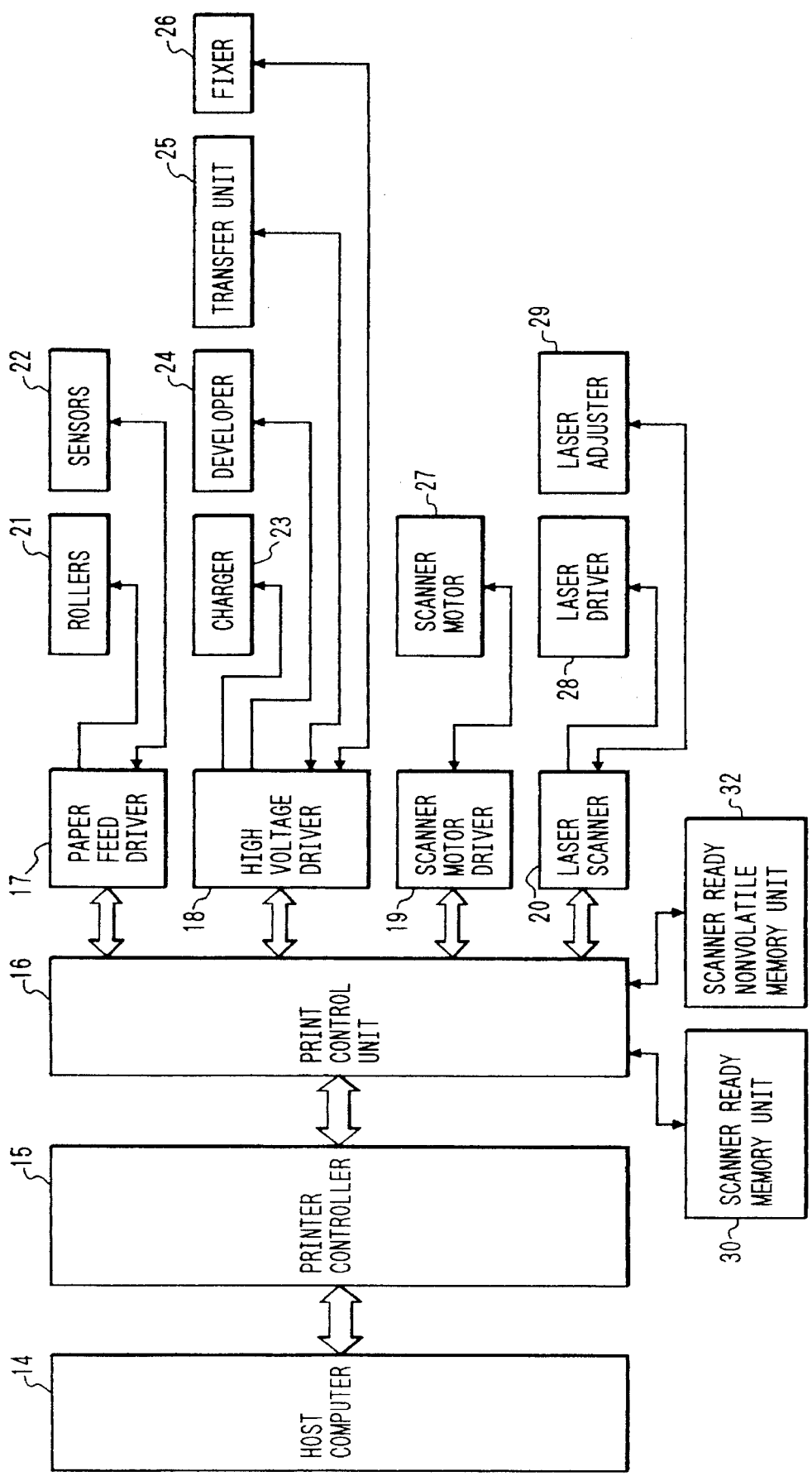
FIG. 14 is a block diagram showing the electrical configuration of a control system in an image forming apparatus in a fourth example.

FIG. 14 is a block diagram for explaining the control configuration of an image forming apparatus in the fourth example, and the like numerals refer to the like parts in FIGS. 6 and 14.

In the figure, 32 is a nonvolatile scanner ready memory unit into which the content of scanner ready memory unit 30 is stored when updated.

Figure 15:
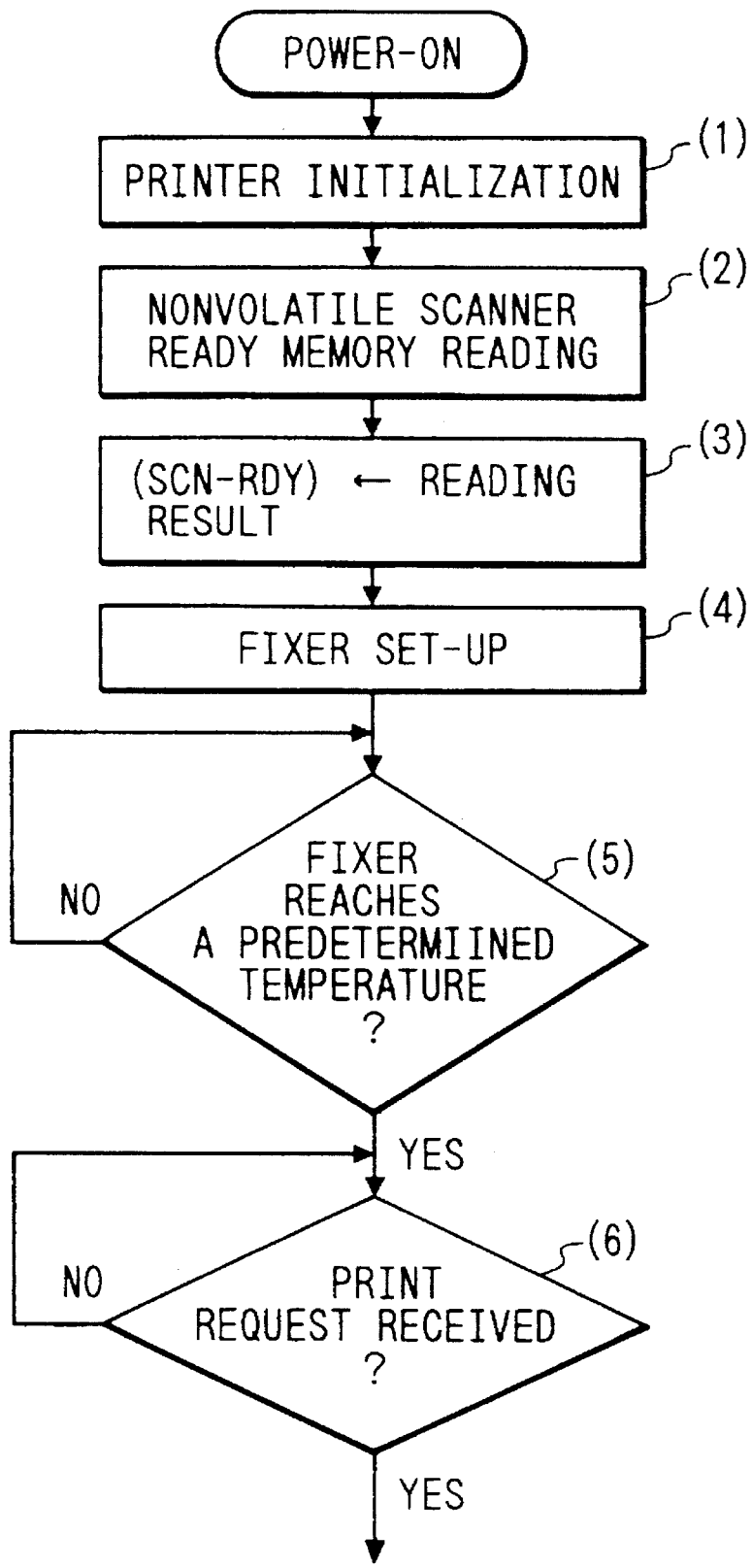
FIG. 15 is a flowchart showing one example of essential procedure for a print processing in the image forming apparatus of the fourth example.

FIG. 15 is a flowchart showing one example of an essential printing procedure in the image forming apparatus in the fourth example. Note that (1) to (6) show each step.

First, the power is turned on, each function of the printer is initialized (1). And when the initialization is ended, the memory content of the nonvolatile scanner ready memory unit 31 is read (2) and transferred to the SCN_RDY flag in the scanner ready memory unit 30. Next, the fixer heater is set up (4). If the set-up of the fixer heater is completed (5), the printer is placed in a print 10 request receiving state (6), and then the processing from the step (1) as shown in FIG. 12 is performed. Note that when the content of the SCR_RDY flag in the scanner ready memory unit 30 is rewritten with a new data, the same content has been also transferred to the nonvolatile scanner ready memory unit 31. Hence, if the power might be turned off, the latest content of the SCN_RDY flag during the power on can be held, so that the light quantity control for the print of first page at the power on can be surely carried out without waiting for the scanner ready, by reading and rewriting the content into the SCN_RDY flag in turning on the power.

As above described, in the third and fourth examples, there are provided directing means for directing the drive/stop of a rotatable polygon mirror depending on whether or not there is any print request input from the external device, and memory means for storing the judgment information for the completion of the set-up of a rotatable polygon mirror which is directed sequentially from the directing means to a desired speed while updating that information sequentially, by monitoring the rotation speed of the rotatable polygon mirror for a predetermined period from the start of driving the rotatable polygon mirror, whereby it is possible to store the set-up completed state within a predetermined period immediately before the rotatable polygon mirror is started. Accordingly, it is possible to store and manage the information for determining the start timing for the adjustment of the light beam before the next start of the rotatable polygon mirror.

Also, there are provided light quantity adjusting means for adjusting the light quantity of light beam to a predetermined value, and control means for controlling the timing of directing the start of light quantity adjustment with the light quantity adjusting means, based on the judgement information of set-up completion stored in the memory means, every time the directing means directs the rotatable polygon mirror to be driven in accordance with the print request, so that the light quantity adjustment can be completed before the rotatable polygon mirror reaches a desired speed. Accordingly, an effect can be exhibited that the first print time from the reception of a print signal to the completion of print can be significantly improved.

Fifth example

Figure 16:
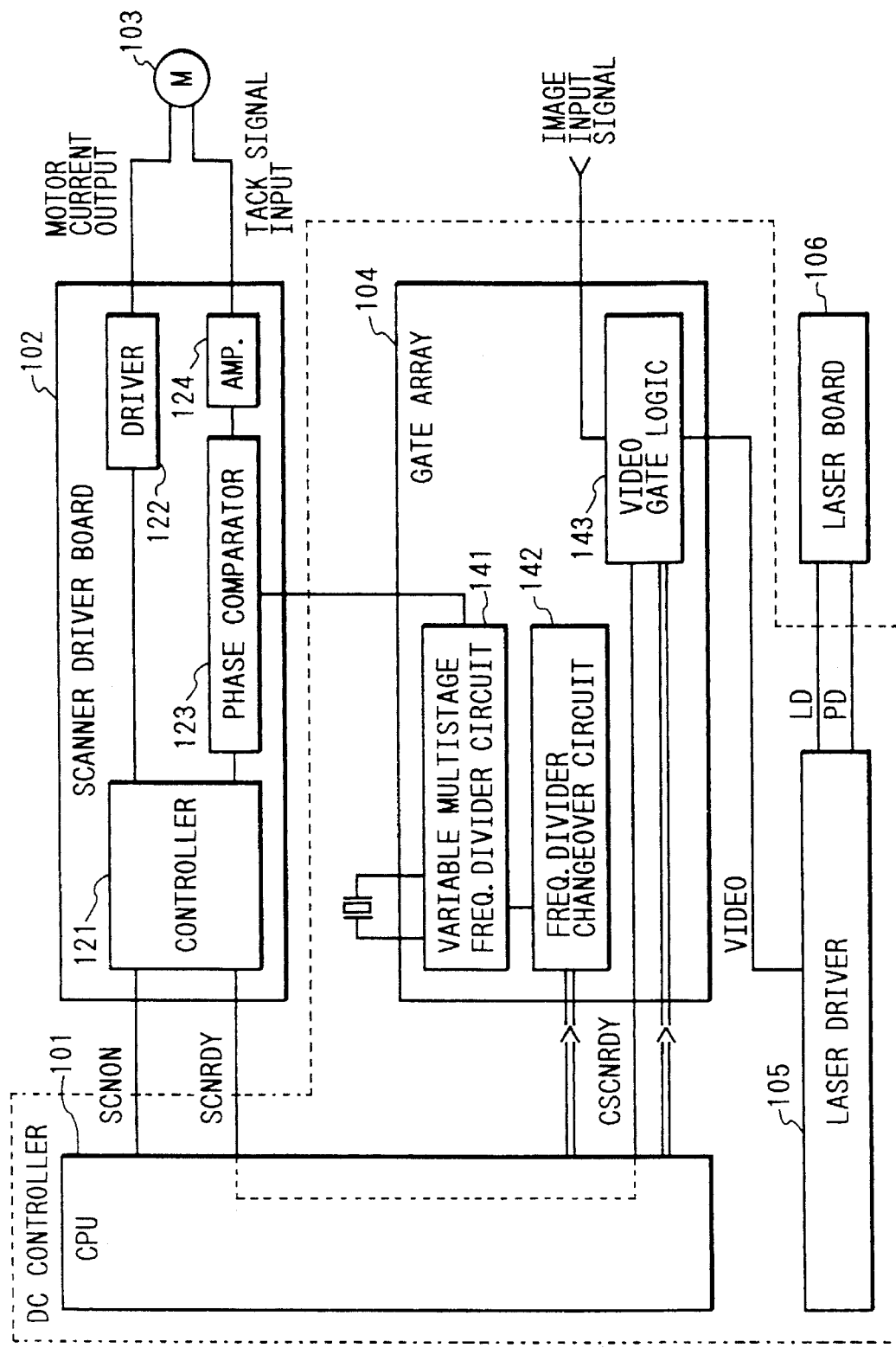
FIG. 16 is a block diagram of essential parts for explaining the configuration of a recording apparatus in a fifth example of the present invention.

FIG. 16 is a block diagram of essential parts for explaining the configuration of a recording apparatus in the fifth example of the present invention. A DC controller is composed of a CPU 101, a laser driver 105, and a gate array 104, in which the CPU 101 outputs a scanner motor rotation start signal SCNON to a scanner driver board 102. 106 is a laser board composed of a semiconductor laser, not shown. The scanner driver board 102 is composed of a control circuit 121, a driver 122, a phase comparator 123, and an amplifier 124. The gate array 10 is composed of a variable multistage frequency divider circuit 141, a frequency divider changeover circuit 142, and a video gate logic 143. Note that 103 is a scanner motor.

In FIG. 16, if the CPU 101 receives a print signal PRINT from the controller, the high voltage is turned on at each timing preset on each high voltage unit, not specifically shown, to start the prerotation control. On the other hand, the CPU 101 issues a scanner motor rotation start signal SCNON to the scanner driver board 102, besides the prerotation control. If the control circuit 121 receives the scanner motor rotation start signal SCNON, it starts the PLL control, i.e., outputs a motor current from the driver 122 to the scanner motor 103, in which a desired rotation number is set up by increasing or decreasing the motor current so that the basic clock and a tack signal frequency input via the amplifier 124 from the scanner motor 103 are in phase by comparing them in the phase comparator 123. And if the desired rotation number is set up, the control circuit 121 issues a scanner ready signal SCNRDY indicating the rotation lock state. The variable multistage frequency divider circuit 141 in the gate array 104 outputs the basic clock to be supplied to the phase comparator 123 of the scanner driver board 102 at a desired frequency, based on the output from the frequency divider changeover circuit 142 in accordance with the set-up directed by the CPU 101. That is, the clock supplied from an oscillator is controlled by the frequency divider changeover circuit 142 in accordance with the content directed by the CPU 101, and the basic clock having a desired frequency is output by the variable multistage frequency divider circuit 141.

On the other hand, the gate array 104 receives an image input signal from the controller, not shown, in which the image signal is synthesized with a control signal necessary for the LBP in the video gate logic 143, and output as an image signal VIDEO to the laser driver 105. Here, the content of the image signal VIDEO synthesized in the video gate logic 143 will be described below.

The image signal VIDEO is a composite signal based on a timing signal for lighting up the laser to obtain an image input signal from the controller, a light-up control signal for operating the laser APC as described below, and a synchronizing signal BD which is a beam detection signal at a predetermined position in a main scan direction.

The laser driver 105 sets the laser light quantity on the laser board 106 to a desired value with an instruction from the CPU 101. In this case, a desired light quantity can be set up in such a way as to turn on the laser drive current (LD), detect the feedback voltage PD from a pin photodiode for the detection of light quantity, and control the current value for driving the laser (this control method is already known as a laser light quantity control (laser APC).) If the laser APC is completed, the laser light is basically turned on or off in accordance with the image input signal from the controller.

In the recording apparatus as thus constituted, if detecting means detects a changing condition of the scan speed (by the phase comparison between a tack signal output from the scanner motor 103 and a reference signal in this example) with the scan optical system (including a polygon mirror, not shown, driven by the scanner motor 103), after the scan speed of the scan optical system reaches a desired scan speed, determining means (by a feature of the CPU 101 in this example) determines the scan speed stabilization time (which is a time for which the scan speed can be judged to be stable after the output of the SCN RDY, and after this time has passed, the print operation is enabled) for the scan optical system based on the output of the detecting means, whereby it is possible to shorten the first print time.

Also, the determining means comprises monitor means (by a feature of the CPU 101) for monitoring a scan speed state signal output from the detecting means for a predetermined period, and count means (an internal timer of the CPU 101) for counting up the scan speed out-of-range time of the scan optical system by monitoring the output of the detecting means while the monitor means monitors the scan speed state signal, whereby the determining means determines the scan speed stabilization time based on a count value counted up by the count means, thereby shortening the first print time.

Figure 17A:
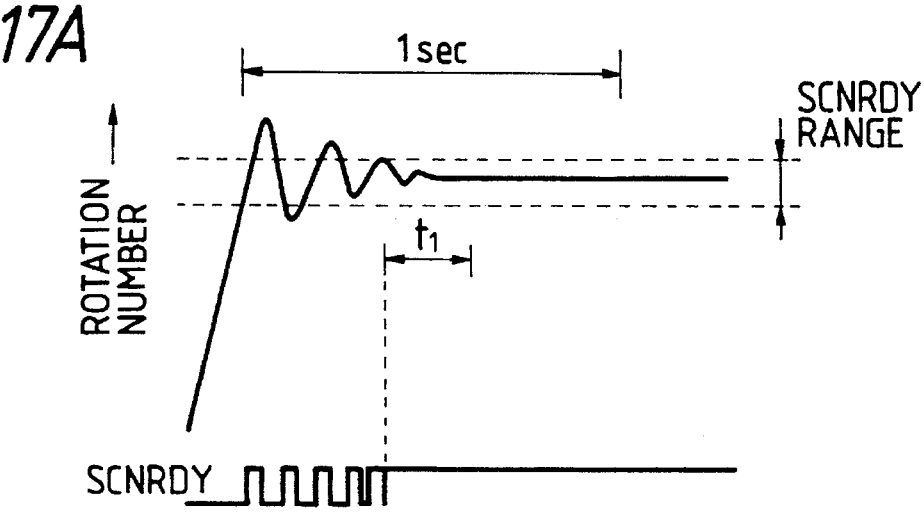
FIGS. 17A, 17B and 17C are timing charts showing the set-up characteristics of a scanner motor as shown in FIG. 16.
Figure 17B:
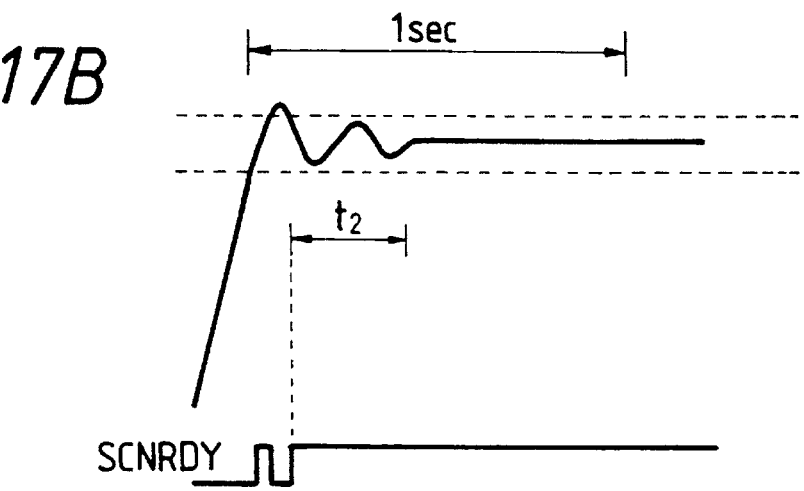
Figure 17C:
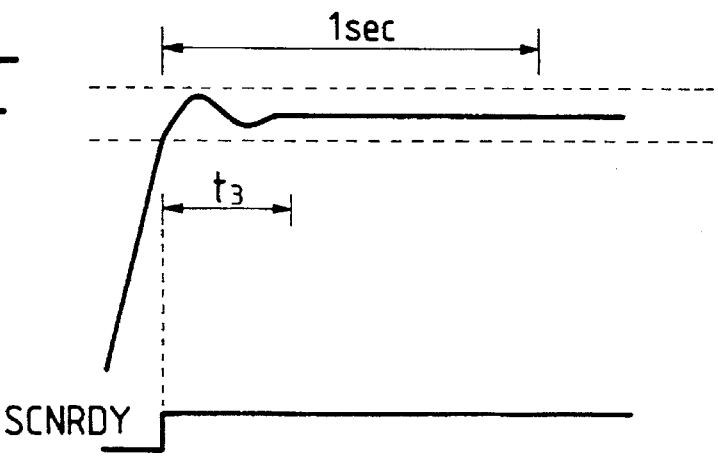

FIGS. 17A to 17C are timing charts showing the set-up characteristics of the scanner motor 103, with the axis of abscissas indicating the time, and the axis of ordinates indicating the rotation number. Note that a broken line width portion shows a set rotation range, in which the set-up characteristics shown in FIG. 17A corresponds to a case where it takes a significant amount of time to converge the number of rotations even if a set rotation number is once reached, and in which the scan speed stabilization time must be set up with the summation of a time outside the set rotation range and a convergence time t1 (convergence monitoring time within the set rotation range) after reaching the set rotation range, the set-up characteristics shown in FIG. 17B corresponds to a case where it takes only a slight amount of time to converge the number of rotations if a set rotation number is once reached, and in which the scan speed stabilization time must be set up with the total of a time outside the set rotation range and a converging time t2 (convergence monitoring time within the set rotation range) after reaching the set rotation range, and the set-up characteristics shown in FIG. 17C corresponds to a case where once a set rotation number is reached, that is, lies within the set rotation range, the scan speed stabilization time must be set up with a converging time t3 (convergence monitoring time within the set rotation range). Note that the convergence monitoring time t1–t3 within the set rotation range is substantially constant, irrespective of the service conditions or differences between devices such as the scanner motor, and for the LBP, it lies within a range from about 0.2 to 0.3 sec. Accordingly, if the time outside the set rotation range is calculated, the scan speed stabilization time can be set up.

Thus, basically, it is possible to shorten variably the scan speed stabilization time during which the scan speed can be stabilized, which was conventionally uniquely set, in such a way that once the set rotation number is reached, the scanner ready signal SCNRDY from the scanner motor is monitored for a period of 0.3 sec, for example, the time NOTRDY indicating the time outside the set rotation range of the scanner during the monitor period is accumulated, and the scan speed stabilization time is extended by the amount of accumulated time after the completion of the monitor time. Note that when the convergence can not be made with the above control, the set-up can be always made by repeating the procedure several times. The practical set-up characteristics are the characteristics as shown in FIG. 17A or 17B in most cases, and once the monitor time+time NOTRDY is executed, the rotation can be converged stably for almost all the scanner motors, whereby the scan speed stabilization time can be significantly shortened.

Figure 18:
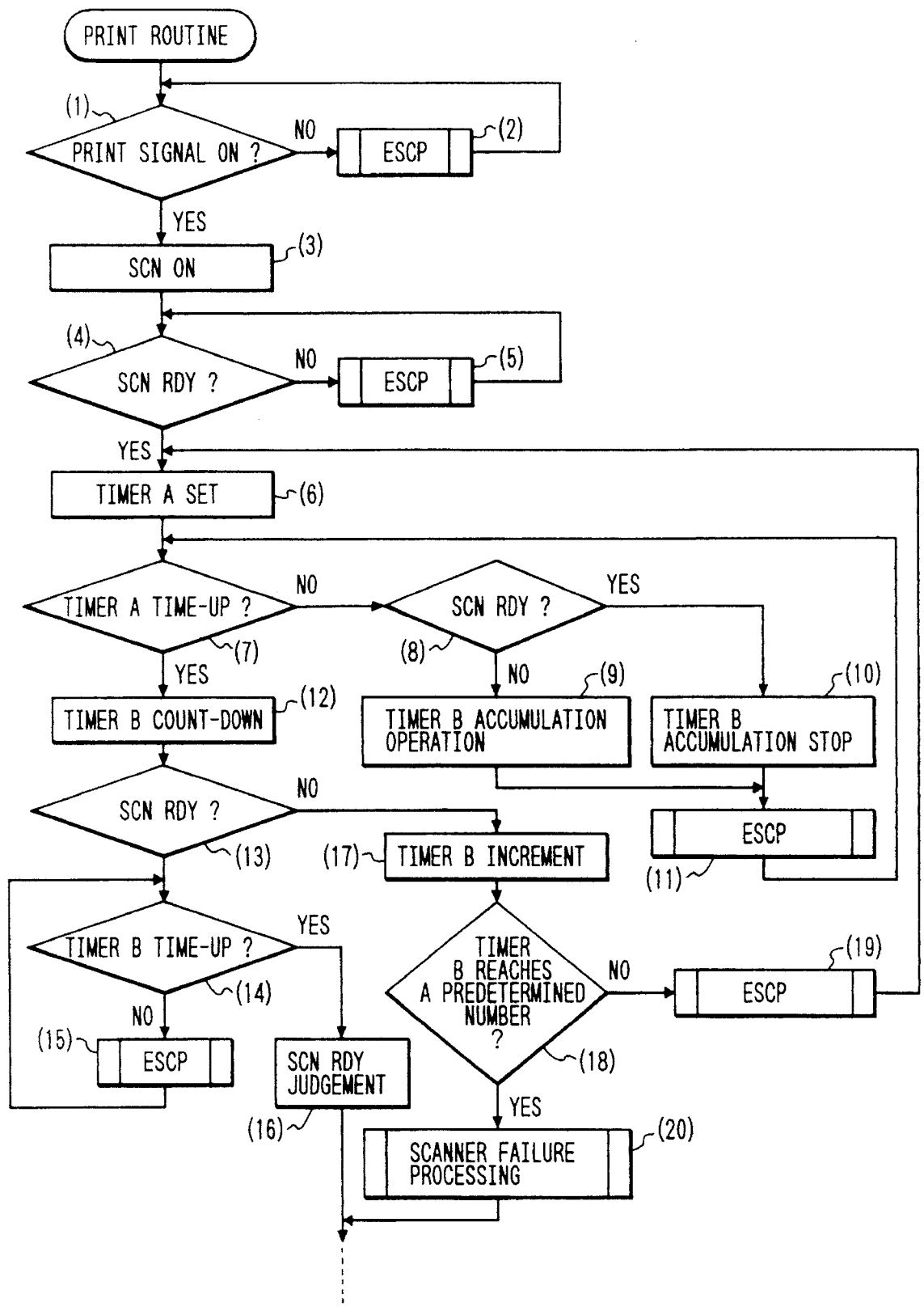
FIG. 18 is a flowchart showing one example of a predetermined procedure for scanner motor setup control in the recording apparatus as shown in FIG. 16.

FIG. 18 is a flowchart showing one example of a predetermined procedure for scanner motor set-up control in the recording apparatus as shown in FIG. 16. Note that (1) to (20) show each step.

As this program adopts a monitor program method which is capable of making the parallel processing of each sequence routine, each sequence routine program scans another program sequentially, separated by the ENTER/ESCP. This monitor program capable of the parallel processing is quite common, and is not limited to that of the present invention. Particularly, in this example, the ENTER starts the program at an address stored in the memory content specified by a memory table (with a CALL statement from the specified address). The ESCP is defined to store an address for starting the program at the next ENTER into a specified memory table and return to the address where it is entered (RETURN statement).

The routine waits for a print signal indicating the execution of print to be turned on by a print routine called by a main routine not specifically described (1), in which if the answer is NO, the ESCP processing routine is executed (2), and the return to step (1) is made.

On the other hand, if the determination at step (1) is YES, the rotation of scanner is indicated with a scanner motor rotation start signal SCNON as the print preparatory operation (3). Then it is judged whether or not the rotation of scanner has once reached a set rotation number, depending on whether or not the scanner ready signal SCNRDY is in the ON state (4), in which if the answer is NO, the ESCP processing routine is executed (5), and the return to step (4) is made. On the other hand, if the determination at step (4) is YES, the ready monitor time is set to a timer A of the CPU 1 (6). Then it is checked whether or not the timer A has confirmed the time-up (7), in which if the answer is NO, it is checked whether or not the scanner ready signal SCNRDY is in the ON state (8). If the answer is NO, the accumulation time is accumulated in a timer B for counting up the time NOTRDY (9), while if the answer is YES, the count up of the timer B is stopped (10). Then the ESCP processing routine is executed (11), and the return to step (7) is made.

On the other hand, if the determination at step (7) is YES, the timer B is counted down (12). And it is checked again whether or not the scanner ready signal SCNRDY is in the ON state (13), in which if the answer is YES, namely, in the set-up characteristics as shown in FIG. 17B, it is checked whether or not the timer B is at the time-up (14), and if the answer is NO, the ESCP processing routine is executed (15), while if the answer is YES, the scanner is judged to be in the ready state, and the transfer to subsequent print sequence is made. That is, a vertical synchronizing request signal VSN-REQ, which is a signal indicating a ready state for the reception of image signal, is output to the controller.

On the other hand, if the determination at step (13) is NO, the timer B is incremented again (17). And a determination is made whether or not the content of counter B reaches a predetermined value (18), in which if the answer is NO, the ESCP processing routine is executed (19), and the return to step (6) is made, while if the answer is YES, the scanner failure processing routine is executed (20), and then the transfer to subsequent print sequence is made. Therefore, in the set-up characteristics as shown in FIG. 17C, namely, when the scanner ready signal SCNRDY has not been received during an extended time, the determination at step (13) will result in NO, and the step (17) and the followings are executed. With such a control, the scan speed stabilization time, which was 1 sec in most cases, can be shortened within a time of 0.4 to 0.5 sec. In any case, the scan speed stabilization time from the reception of print signal PRINT can be made within 1 sec.

While the above fifth example has been described in conjunction with a case wherein once a set rotation number is reached, the scanner ready state of the scanner motor 103 is monitored with a scanner ready signal SCNRDY for a predetermined time, the scanner not ready time NOTRDY of the scanner occurring during that monitor period is accumulated, and the scan speed stabilization time is variably set to the accumulated time after the completion of the monitor time, it can be also configured in such a way that once the set rotation number is reached, the scanner ready signal SCNRDY from the scanner motor 103 is monitored for a predetermined period, and if the scanner ready signal SCNRDY of the scanner is turned OFF during that monitor time, the monitor time is reset immediately to extend the monitor time so that the scan speed stabilization time is variably set.

Figure 19:
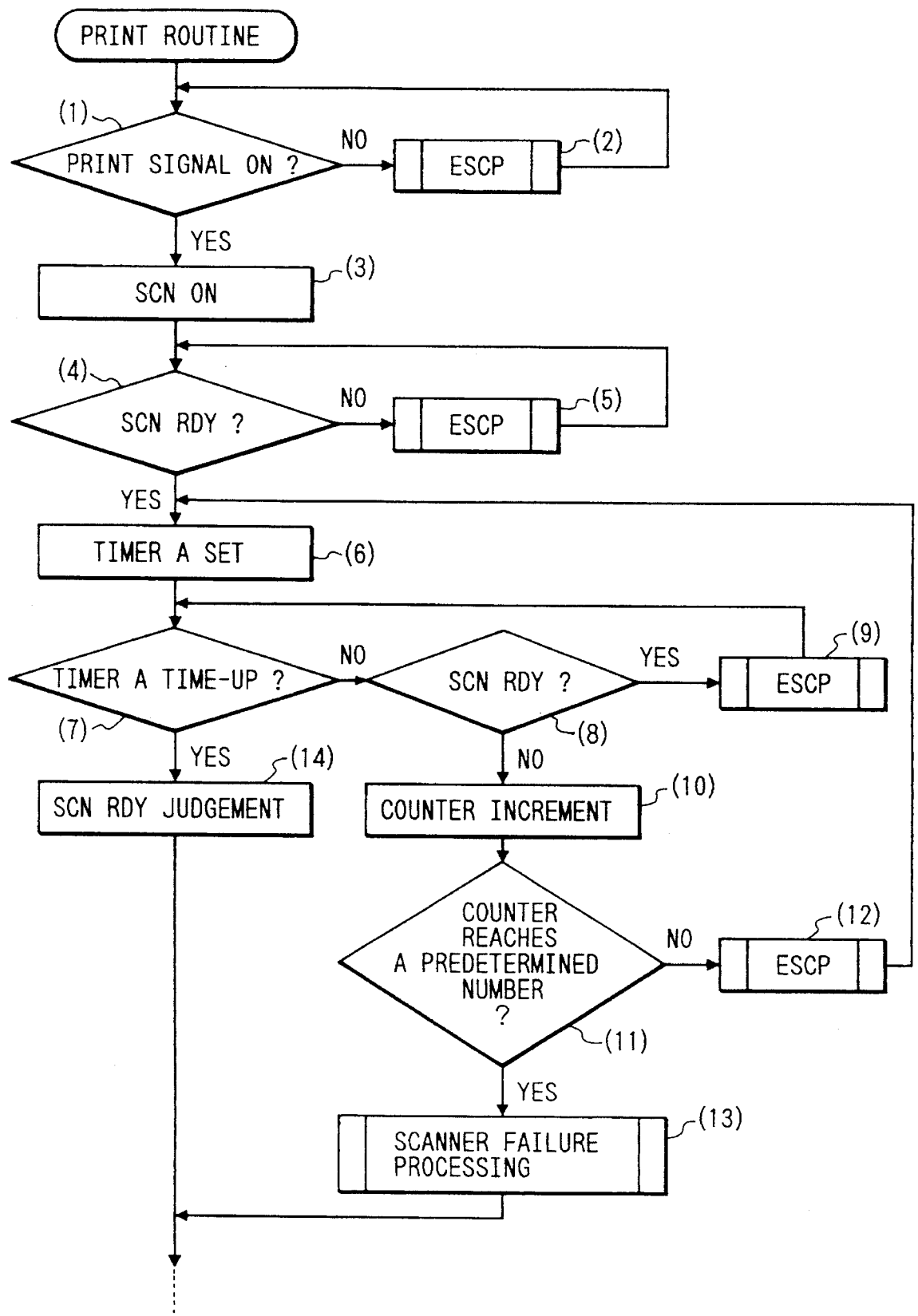
FIG. 19 is a flowchart showing one example of a predetermined procedure for scanner motor set-up control in a recording apparatus in a sixth example of the present invention.

That is, the scan speed stabilization time can be determined with the procedure as shown in FIG. 19, by comprising determining means (by a feature of the CPU 101 in this example), and remonitor setting means (by a feature of the CPU 101 in this example) for setting the remonitor time to monitor means (by a feature of the CPU 101 in this example) while judging whether or not the scan speed of the scan optical system is out of range by monitoring the output from the detecting means during the monitoring of scan speed state signal with the monitor means, wherein the scan speed stabilization time of the scan optical system can be determined after the passage of the remonitor time to be set with this remonitor setting means or a predetermined time.

Sixth example

FIG. 19 is a flowchart showing one example of a predetermined procedure for scanner motor set-up control in the recording apparatus according to the sixth example of the present invention. Note that (1) to (14) show each step.

The routine waits for a print signal indicating the execution of print to be turned on by a print routine called by a main routine not specifically described (1). If the print signal is not turned on, the ESCP processing routine is executed (2), and the return to step (1) is made.

On the other hand, if the determination at step (1) is YES, the rotation of scanner is indicated with a scanner motor rotation start signal SCNON as the print preparatory operation (3). Then it is judged whether or not the rotation of scanner has once reached a set rotation number, depending on whether or not the scanner ready signal SCNRDY is in the ON state (4), in which if the answer is NO, the ESCP processing routine is executed (5), and the return to step (4) is made. On the other hand, if the determination at step (4) is YES, the ready monitor time is set to a timer A of the CPU 1 (6). Then it is checked whether or not the timer A has confirmed the time-up (7), in which if the answer is NO, it is checked whether or not the scanner ready signal SCNRDY is in the ON state (8). If the answer is YES, the ESCP processing routine is executed (9), and the return to step (7) is made. On the other hand, if the determination is NO at step (8), the counter is incremented (10), and then it is judged whether or not the counter value has reached a predetermined value (11), in which if the answer is NO, the ESCP processing routine is executed (12) and the return to step (6) is made, while if the answer is YES, the scanner failure processing routine is executed (13) and the transfer to subsequent print sequence is made.

On the other hand, if the determination at step (7) is YES, the scanner is judged to be in the ready state (14), and the transfer to subsequent print sequence is made.

In this way, the scanner ready signal SCNRDY is monitored during a preset monitor time, in which with the set-up characteristics as shown in FIG. 17A, for example, it is judged that the scanner motor rotation reaches a set value and is converged stably at the time when the monitor is completed (YES at step (7)), and the transfer to subsequent print sequence is made. Also, with the set-up characteristics as shown in FIG. 17B, the scanner rotation failure detection processing (steps (8) to (10)–(13)) is executed in the same way as in the above example, and the routine returns to step (6) where the monitor time is set again. And if the monitor time is terminated, it is judged that the scanner motor rotation reaches a set value and is converged stably, and the transfer to subsequent print sequence is made. Note that as the scanner not ready time NOTRDY is a slight time in this example, the convergence is completed in a value almost equal to the monitor set-up time. Furthermore, with the set-up characteristics (c) as shown in FIG. 17, the monitor time during which the scanner rotation can be converged stably is set several times, repeatedly, and in practice, the convergence can be terminated with the total time of a time for which the scanner rotation is converged stably and the monitor time. With the above control, the scan speed stabilization time, which was 1 sec previously, can be made within a time of 0.4 to 0.5 sec in most cases.

While the fifth and sixth examples have been described in conjunction with a case wherein the determination is made based on the changing condition of the scan speed, or the rotation speed condition (scanner ready signal SCNRDY) of the scanner motor 103 for driving the scan optical system, the scan speed stabilization time can be also set by obtaining the changing information based on the variation of rotation speed, like the above examples. An example in which the stable convergence of the scan speed is judged from the changing condition of the power to be supplied to the scanner motor will be described below as the seventh example with reference to FIGS. 20 and 21.

Seventh example

Figure 20:
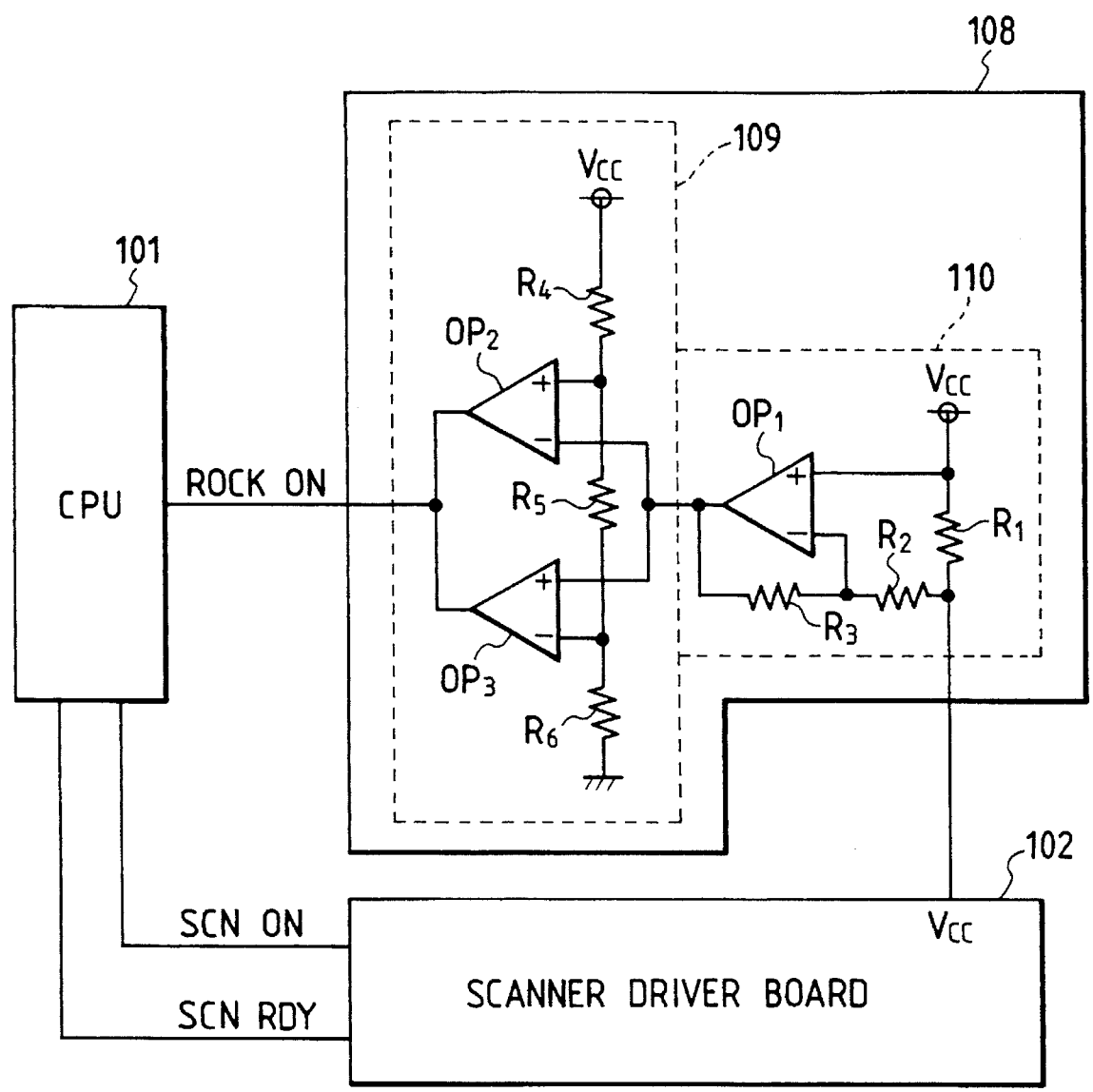
FIG. 20 is a block diagram for essential parts for explaining the configuration of a recording apparatus in a seventh example of the present invention.

FIG. 20 is a block diagram of essential parts for explaining the configuration of a recording apparatus in the seventh example of the present invention, wherein the like numerals refer to the like parts in FIGS. 16 and 20.

In FIG. 20, 108 is detecting means for detecting the changing condition of the scan speed, which is constituted of a window comparator 109 and a detecting unit 110, which is composed of resistors R1 to R3, and an operational amplifier OP1, with the electric current to be supplied to the scanner driver board 102 being converted into its drop voltage with a resistor R1 having a quite small resistance and amplified by the operational amplifier OP1. The window comparator 109, constituted of resistors R4 to R6, and operational amplifiers OP2, OP3, compares the drop voltage value amplified by the operational amplifier OP1 of the detecting unit 110 with a predetermined range value, and outputs a rock on signal ROCK ON to the CPU 101 at the time when the drop voltage is converged to the predetermined range value. With such a constitution, the consumed current of the scanner motor 103 shows a large current value when the rotation is started, and decreases gradually with increasing rotation number. And when a set rotation number is reached, it shows a constant current value. However, where the set rotation number is reached, the slight adjustment of the current is made to converge the rotation. This minute current change is detected by the detecting unit 110, amplified by the operational amplifier OP1, and converted into digital form in the window comparator 109, which then outputs the ROCK ON signal to the CPU 101. The scan speed stabilization time can be set by processing the input state of this rock on signal ROCK ON in accordance with a flowchart as shown in FIG. 21, as in the fifth and sixth examples.

In the recording apparatus as thus constituted, the detecting means 108 detects the changing state of the scan speed from that of the electric power to be supplied to the scan optical system, allowing a converging variation of the scanner motor rotation to be detected with the supply current to the scanner motor 103, with a finer precision, whereby the scan speed stabilization time can be calculated in an optimal time.

Figure 21:
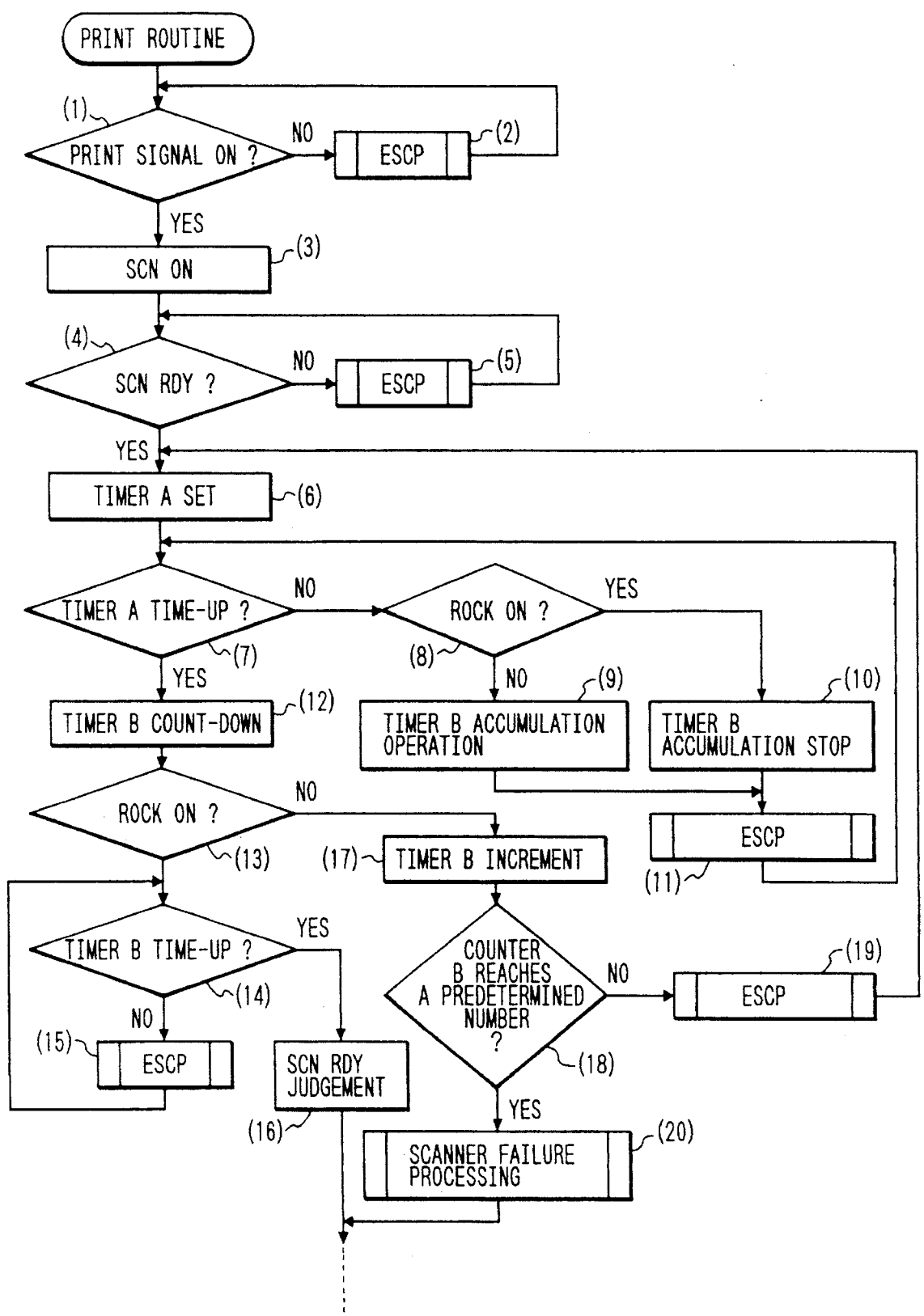
FIG. 21 is a flowchart showing one example of a predetermined procedure for scanner motor set-up control in the recording apparatus as shown in FIG. 20.

FIG. 21 is a flowchart showing one example of a predetermined procedure for scanner motor set-up control in the recording apparatus as shown in FIG. 20.

Note that (1) to (20) show each step. As this program adopts a monitor program method which is capable of making the parallel processing of each sequence routine, each sequence routine program scans another program sequentially, separated by the ENTER/ESCP. This monitor program capable of the parallel processing is quite common, and is not limited to that of the present invention. Particularly, in this example, the ENTER starts the program at an address stored in the memory content specified by a memory table (with a CALL statement from the specified address). The ESCP is defined to store an address for starting the program at the next ENTER into a specified memory table and return to the address where it is entered (RETURN statement).

The routine waits for a print signal indicating the execution of print to be turned on by a print routine called by a main routine not specifically described (1). If the print signal is not turned on, the ESCP processing routine is executed (2), and the return to step (1) is made.

On the other hand, if the determination at step (1) is YES, the rotation of scanner is indicated with a scanner motor rotation start signal SCNON as the print preparatory operation (3). Then it is judged whether or not the rotation of scanner has once reached a set rotation, depending on whether or not the scanner ready signal SCNRDY is in the ON state (4), in which if the answer is NO, the ESCP processing routine is executed (5), and the return to step (4) is made. On the other hand, if the determination at step (4) is YES, the ready monitor time is set to a timer A of the CPU 101 (6). Then it is checked whether or not the timer A has confirmed the time-up (7), in which if the answer is NO, it is checked whether or not the rock on signal ROCK ON is in the ON state (8). And if the answer is NO, the accumulation time is accumulated in a timer B for counting up the scanner not ready time NOTRDY (9), while if the answer is YES, the timer B accumulation count is stopped (10). Then the ESCP processing routine is executed (11) and the return to step (7) is made.

On the other hand, if the determination at step (7) is YES, the timer B is counted down (12). And it is checked again whether or not the rock on signal ROCK ON is in the ON state (13), in which if the answer is YES, namely, in the set-up characteristics as shown in FIG. 17B, it is checked whether or not the timer B is at the time-up (14). And if the answer is NO, the ESCP processing routine is executed (15), while if the answer is YES, the scanner is judged to be in the ready state (16), and the transfer to subsequent print sequence is made. Also, in the set-up characteristics as shown in FIG. 17A, the transfer to step (16) is immediately made, because the extended time is 0.

On the other hand, if the determination at step (13) is NO, the timer B is incremented again (17). And a determination is made whether or not the content of counter B has reached a predetermined value (18), in which if the answer is NO, the ESCP processing routine is executed (19), and the return to step (6) is made, while if the answer is YES, the scanner failure processing routine is executed (20), and then the transfer to subsequent print sequence is made. Therefore, in the set-up characteristics as shown in FIG. 17C, namely, when the scanner ready singal SCNRDY is not received during the extended time, the determination at step (13) will result in NO, in which the step (17) and the followings are executed. With such a control, it is possible to detect a converging variation of the scanner motor rotation with the supply current to the scanner motor 3, with a finer precision, whereby the scan speed stabilization time can be calculated in an optimal time.

The detecting means as shown in the above seventh example is one example, in which alternatively it can detect a converging variation of the scanner motor rotation with the F/V conversion (frequency/voltage conversion) by using a tack signal for use in controlling the scanner motor rotation, for example, with the same control as in the seventh example. Furthermore, it can also detect the converging variation with the F/V conversion (frequency/voltage conversion) by using a horizontal synchronizing signal (BD signal) which is a reference signal for writing the image in the main scan direction, with the same control as in the seventh example.

As above described, according to the fourth to seventh examples, there are provided detecting means for detecting a changing condition of the scan speed in the scan optical system, after the scan speed of the scan optical system has reached a desired scan speed, and determining means for determining any scan speed stabilization time for the scan optical system, based on the output of the detecting means, so that it is possible to variably set the scan speed stabilization time which was conventionally fixed at a set value in accordance with the set-up characteristics of the scan optical system.

Also, the determining means is provided with monitor means for monitoring a scan speed state signal output from the detecting means for a predetermined period, and count means for counting up the scan speed out-of-range time of the scan optical system by monitoring the output of detecting means while the monitor means monitors the scan speed state signal, thereby determining any scan speed stabilization time based on a count value counted up by the count means, so that any scan speed stabilization time corresponding to the scan speed out-of-range time can be determined.

Furthermore, determining means is provided with remonitor setting means for setting a remonitor time to monitor means while judging whether or not the scan speed of the scan optical system is out of range by monitoring the output from detecting means during the monitoring of a scan speed state signal with monitor means, thereby determining the scan speed stabilization time of the scan optical system after the passage of the remonitor time to be set with this remonitor setting means for a predetermined time, so that when there is no scan speed out-of-range of the scan optical system within the monitor time, the optimal scan speed stabilization time can be determined immediately after the passage of the monitor time.

Since the detecting means detects a changing condition of the scan speed from that of the electric power to be supplied to the scan optical system, a more precise detection is allowed, whereby the scan speed stabilization time can be calculated at optimum. Accordingly, even if the set-up characteristics of the scan optical system may be changed with the service condition or variation with the passage of time, it is always possible to determine an optimal smallest scan speed stabilization time, thereby exhibiting an excellent effect of largely shortening the first print time as compared with a conventional one.

Eighth example

The block diagram showing the configuration of essential parts of a recording apparatus in the eighth example of the present invention is the same as the fifth example (FIG. 16) as previously described, and the explanation will be omitted.

In the recording apparatus according to this example, while the scan speed information (ready signal SCNRDY in this example) of the scan optical system output from a scan optical unit is monitored with monitor means (phase comparator 123 in this example), directing means (control circuit 121 in this example) directs a judgment of whether the scan speed of the scan optical system has reached a first scan speed set for writing the image or a second scan speed set at a slower speed than the first scan speed, based on the output of the monitor means, in which if the second scan speed is directed with this judgment, authorization means (CPU101) authorizes the light quantity adjustment with light quantity adjusting means, performing the light quantity adjustment with the light quantity adjusting means in parallel with the set-up of the scan optical system, whereby it is possible to shorten the first print time.

Referring now to a flowchart as shown FIGS. 22 and 23, the control operation for the start timing of light quantity adjustment in a recording apparatus according to this example will be described below.

Figure 22A:
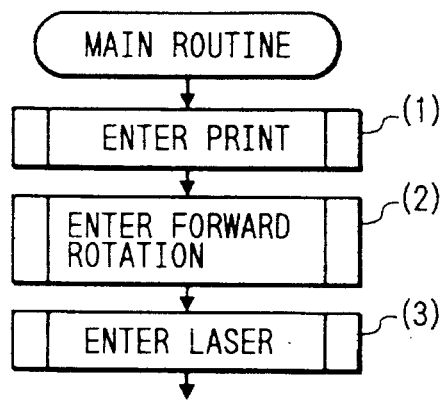
FIGS. 22A and 22B are a series of flowcharts showing one example of a control procedure for the light quantity adjustment start timing in the recording apparatus in an eighth example of the present invention.
Figure 22B:
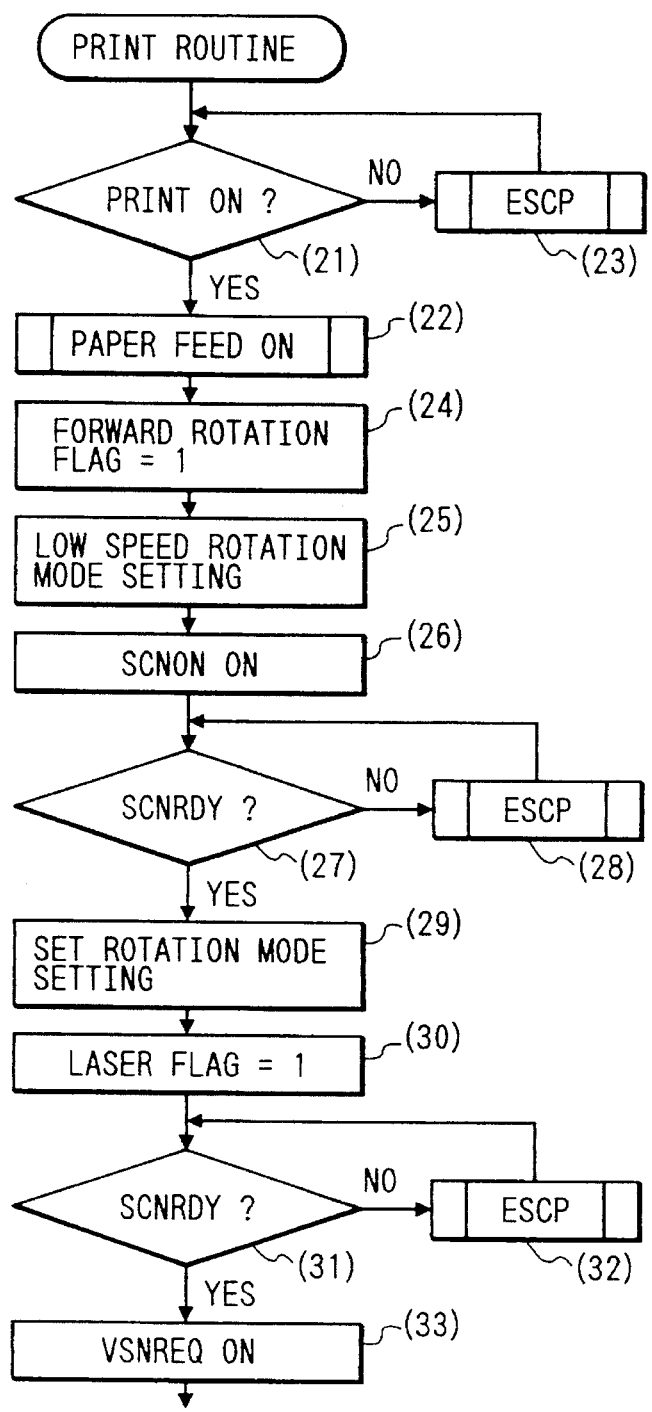
Figure 23A:
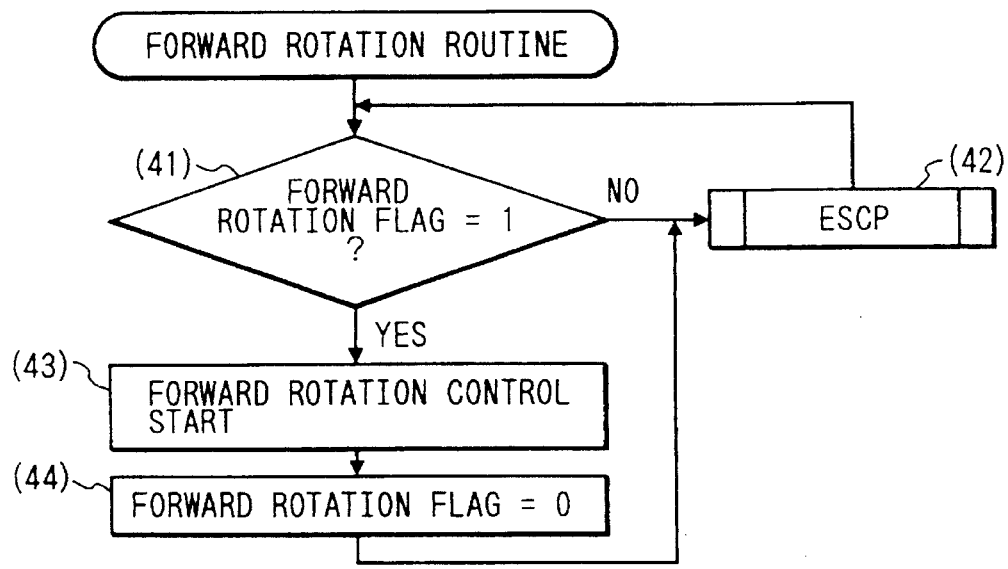
FIGS. 23A and 23B are a series of flowcharts showing one example of a control procedure for the light quantity adjustment start timing in the recording apparatus in the eighth example of the present invention.
Figure 23B:
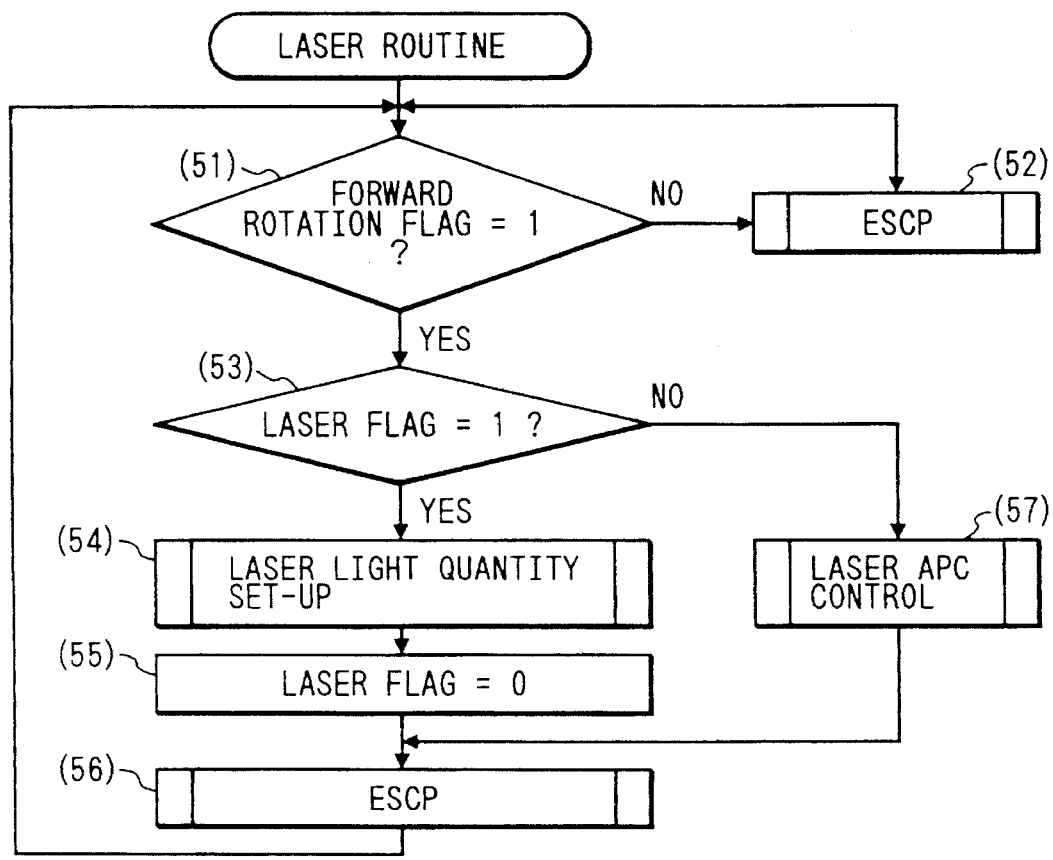

FIGS. 22 and 23 are a series of flowcharts showing one example of the control procedure for the light quantity adjustment start timing in the recording apparatus according to the present invention. In FIG. 22A, shows a main routine, and FIG. 22B shows a print routine, and in FIG. 23A shows a prerotation routine, and FIG. 23B shows a laser routine.

As this program adopts a monitor program method which is capable of making the parallel processing of each sequence routine, each sequence routine program scans another program, for example, routines as shown in FIG. 22B, FIGS. 23A and 23B, sequentially, separated by the ENTER/ESCP. This monitor program capable of the parallel processing is quite common, and is not limited to that of this example. In this example, the ENTER starts the program at an address stored in the memory content specified by a memory table (with a CALL statement from the specified address). The ESCP is defined to store an address for starting the program at the next ENTER into a specified memory table and return to the address where it is entered (RETURN statement).

If the print routine is ENTERed at step (1) in the main routine as shown in FIG. 22A, the control is passed to the print routine as shown in FIG. 22B. First, a determination is made whether or not there is any print request (print signal PRINT) (21), in which if the answer is NO, the ESCP processing routine is executed (23), and the return to step (21) is made. If the determination at step (21) is YES, a print paper is fed (22), the forward rotation flag which is a prerotation control request flag is set to 1 (24), the setting for the frequency divider changeover circuit 142 is performed to start the scanner motor 103 at a lower rotation number (25), and the scanner motor rotation start signal SCNON is is turned on for the scanner driver board 102 (26). And a determination is made whether or not the ready signal SCNRDY has been detected at the lower rotation speed (27), in which if the answer is NO, the ESCP processing routine is executed (28), and the return to step (27) is made. The ESCP processing routine is repeatedly executed until a ready signal SCNRDY is detected at step (27), thereby going and returning to and from the main routine shown in FIG. 22A, so that the forward rotation routine shown in FIG. 22B is ENTERed from the main routine (2) to initiate the forward rotation routine as shown in FIG. 23A, and at step (41), it is checked whether or not a request flag of the forward rotation control is 1. If the answer is NO, the ESCP processing routine is executed (42), then returning to step (1), while if the answer is YES (the request flag is 1 at the print), the forward rotation control is started (43). After the completion of the forward rotation control, the request flag of the forward rotation flag is reset (44), and the print operation is executed. In the forward rotation control at step (43), as the ESCP processing routine may be entered at times, the return to the main routine is made at each time.

Next, at step (3) in the main routine as shown in FIG. 22A, the laser routine as shown in FIG. 23B is ENTERed, in which a determination is made whether or not the request flag of forward rotation control is 1 (51). If the answer is NO, the ESCP processing routine is executed (52), and the return to step (51) is made. In this case, the return to the main routine is caused with the ESCP routine until the forward rotation processing has been completed.

As above described, if the print signal is received, the scanner motor rotation and the forward rotation control are started. Since the comparison between the scanner motor rotation and the forward rotation control in this LBP indicates that the scanner motor rotation at lower speed is terminated more early than the forward rotation, as shown in FIG. 24, the ready signal SCNRDY at lower rotation speed is received at step (27), and then the transfer is made to step (29), where the rotation speed is switched to a rotation number to be set normally. At step (30), the laser flag is set to 1 to allow the adjustment of laser light quantity, because the scanner rotation has been determined. Then the routine proceeds to steps (31) to (33) in a conventional print sequence. On the other hand, in the laser routine, if the forward rotation processing is terminated, the routine transfers to step (53) of the laser routine (b) as shown in FIG. 23, where a determination is made whether or not a preset laser flag is 1. While the recording apparatus (laser beam printer) of this example has a relatively long forward rotation processing time, it is noted that the LBP having a shorter forward rotation processing time is needed to compare the time of the forward rotation processing with that of the scanner low speed rotation processing at steps (51) and (53). And if the determination at step (53) is YES, the routine transfers to step (54), where a set-up sequence for the adjustment of laser light quantity is executed, and after the reset of the laser flag (55), the return to the main routine is caused with the ESCP processing routine. If the determination is NO, the laser APC control is executed (57), and the transfer is made to step (56), where the return to the main routine is caused with the ESCP processing routine.

Figure 24A:
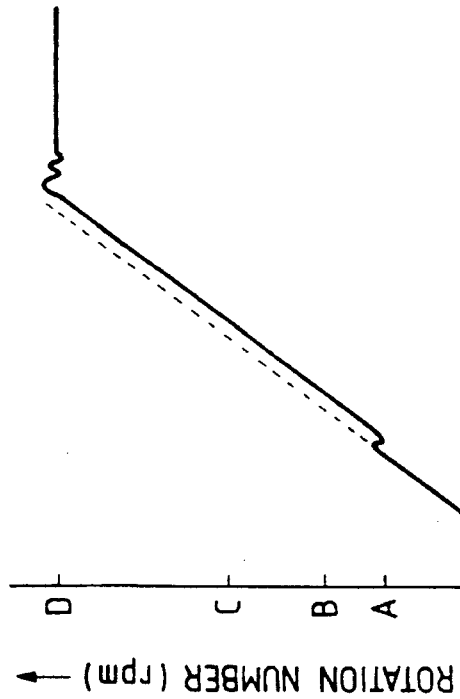
FIGS. 24A and 24B, are timing charts for explaining the control procedure of a recording apparatus in the eighth and ninth examples.
Figure 24B:
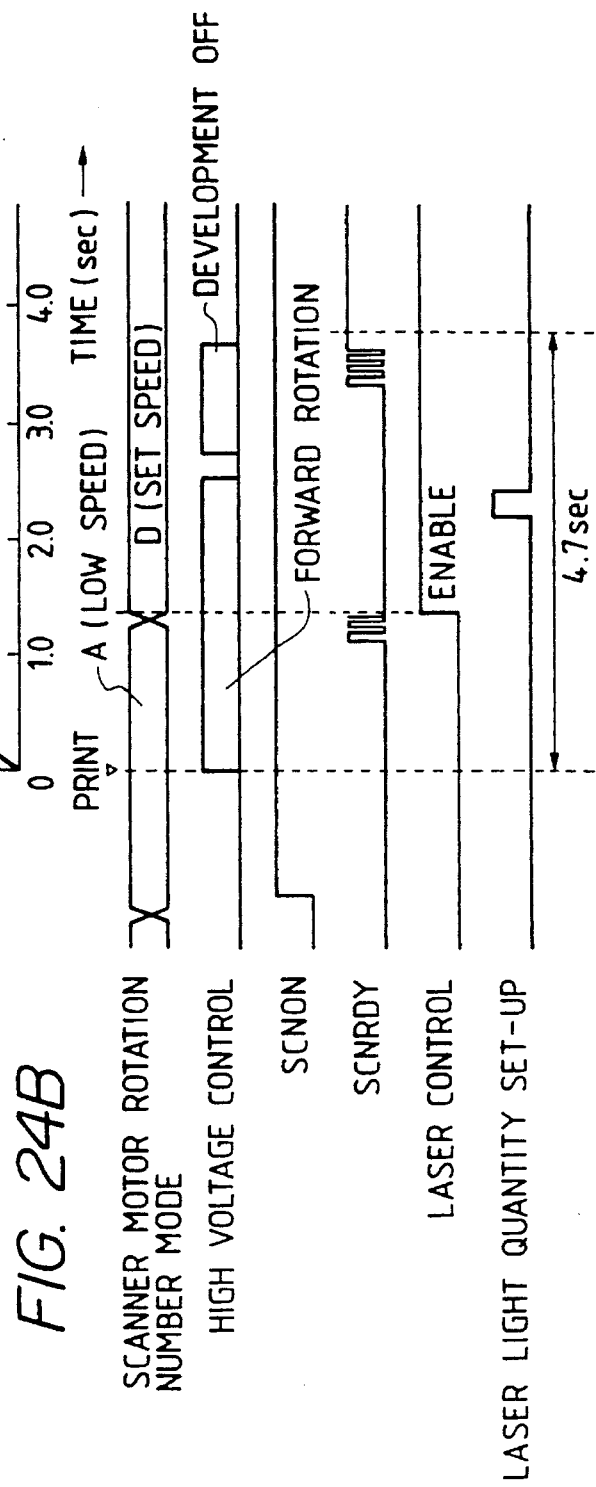

With such a control, the print preparatory operation can be completed in a shorter time, as shown in FIGS. 24A & 24B, thereby allowing the first print time to be greatly shortened.

Ninth example

While the above example has been described in conjunction with a case wherein the scanner motor rotation is classified into the low speed rotation and the high speed rotation being set, and the laser light quantity control is started with the set-up of the low speed rotation as the reference timing, the present invention is easily applicable to a case where the image is recorded with the resolution corresponding to any of set resolutions, for example, 240, 300, 400, 600 (DPI (dot per inch)), in the recording apparatus having resolution switching means capable of switching the image density easily. This switching of resolution is carried out by switching the resolution in the main scan direction easily with the CPU 101 which changes the frequency dividing ratio for the variable multistage frequency divider circuit 141 as shown in FIG. 16.

In the recording apparatus as thus constituted, if the scan optical system is started with a first scan speed set for the scan optical system, based on a resolution indicated by switching means (CPU 101), directing means (control circuit 21) directs to the CPU 101 a judgment of whether or not the scan motor reaches a second scan speed, when it reaches any first scan speed which can be set at a slower speed than the first scan speed set by the switching means, and if the second scan speed is directed, authorization means (by the CPU 101) authorizes the adjustment of light quantity, in which the light quantity adjustment with the light quantity adjusting means is performed in parallel with the set-up of the scan optical system, thereby shortening the first print time.

In this case, as shown in the timing charts of FIGS. 24A & 24B, when the resolution at which the rotation is effected at a rotation number D (greatest rotation number to be set) is specified, the adjustment of laser light quantity can be completed at the desired rotation number D in such a way as to control the adjustment of laser light quantity to be started upon detecting that a rotation number A (smallest rotation number to be set) is reached. While this example has been described in conjunction with a case wherein the set-up is first made at the lowest rotation number, and the rotation speed is switched to a desired rotation number after the ready signal SCNRDY is turned on, it may be sufficient if the scanner motor is set up at a lower rotation number than the desired rotation number, but no necessarily at the lowest rotation number. Since the print preparatory operation can be fulfilled in a shorter time without switching, as shown in FIGS. 24A & 24B, when the desired rotation number is the lowest rotation number, it is possible not to make the switching at low rotation speed.

While the above eighth and ninth examples have been described in conjunction with a case wherein the laser light quantity adjustment control is started by referring to the ready signal SCNRDY output from the scanner driver board 102, the laser light quantity adjustment control may be started by referring to the tack signal TAC of the scanner motor 103. That case will be described below.

Tenth example

Figure 25:
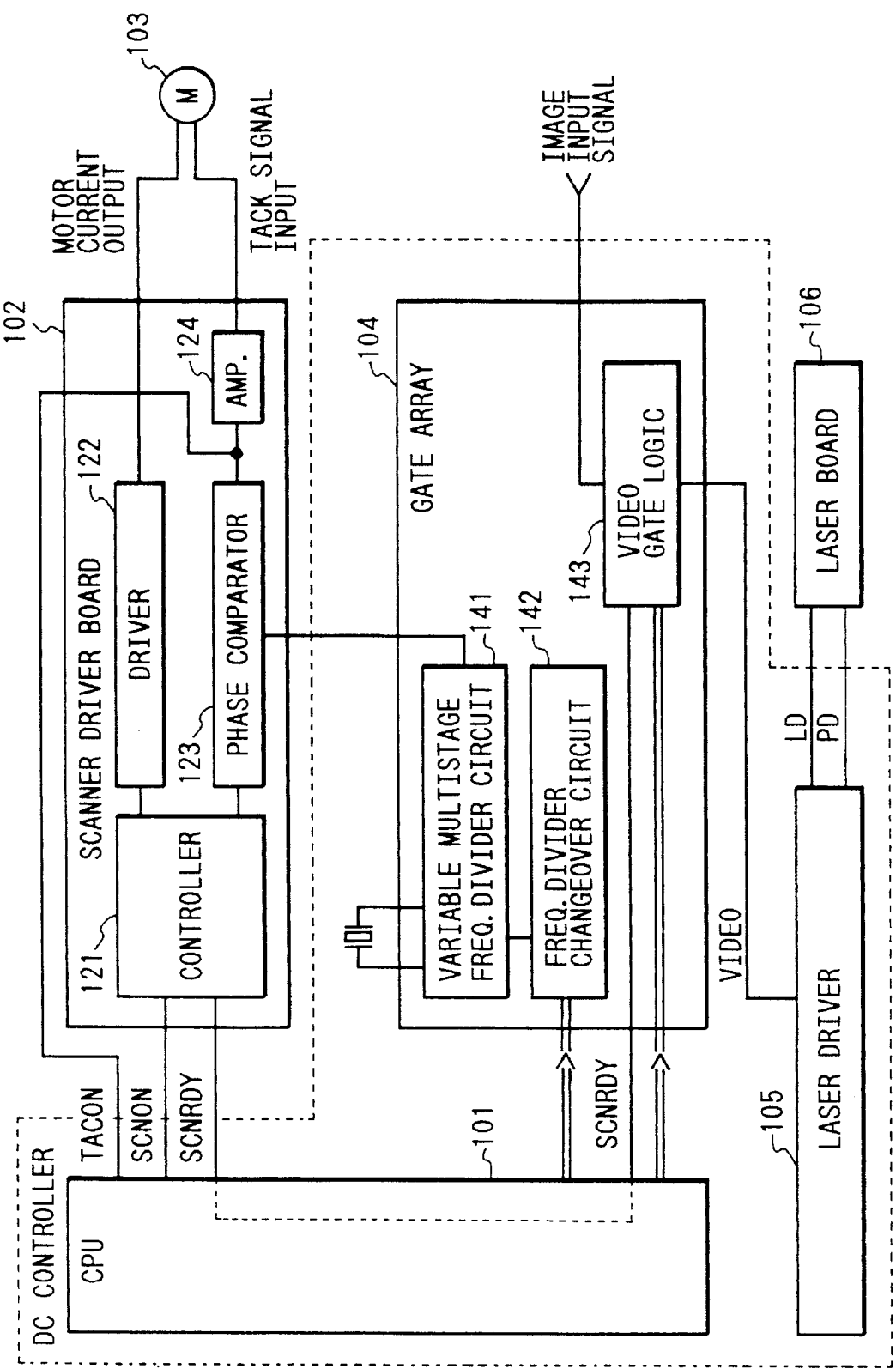
FIG. 25 is a block diagram showing an essential configuration of a recording apparatus in a tenth example of the present invention.

FIG. 25 is a block diagram showing the configuration of essential parts for a recording apparatus in the tenth example of the present invention. The like numerals refer to the like parts in FIGS. 16 and 25.

As shown in this figure, a different point from the fifth example (FIG. 16) is that the tack signal TAC (tack signal for the detection of the scanner motor rotation number) output from the amplifier 124 is input into the CPU 101, in which this tack signal TAC is a signal detected by Hall elements contained in the scanner motor 3, and if the frequency of the tack signal TAC is detected to have reached a predetermined frequency by detecting the change of frequency, the set-up control of laser light quantity is started. Note that in this example, the variable multistage frequency divider circuit 141 and the frequency divider changeover circuit 142 in the gate array 104 are unnecessary with the operation, but may be provided for other operations.

Referring now to the flowcharts as shown in FIGS. 26 and 27, the control operation for the light quantity adjustment start timing in the recording apparatus according to this example will be described below.

Figure 27A:
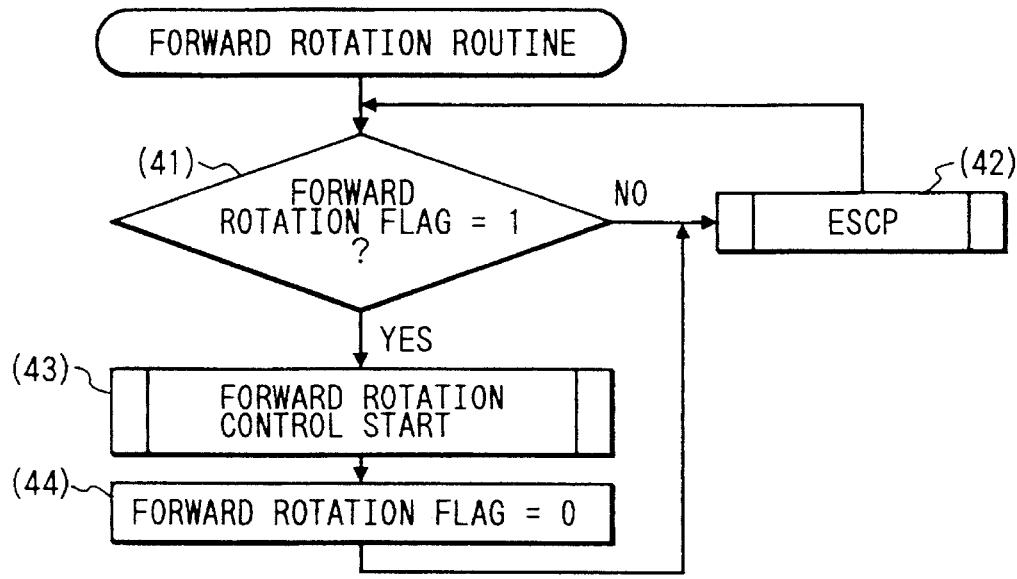
FIGS. 27A and 27B are a series of flowcharts showing one example of the third control procedure for the light quantity adjustment start timing in the recording apparatus in the tenth example.
Figure 27B:
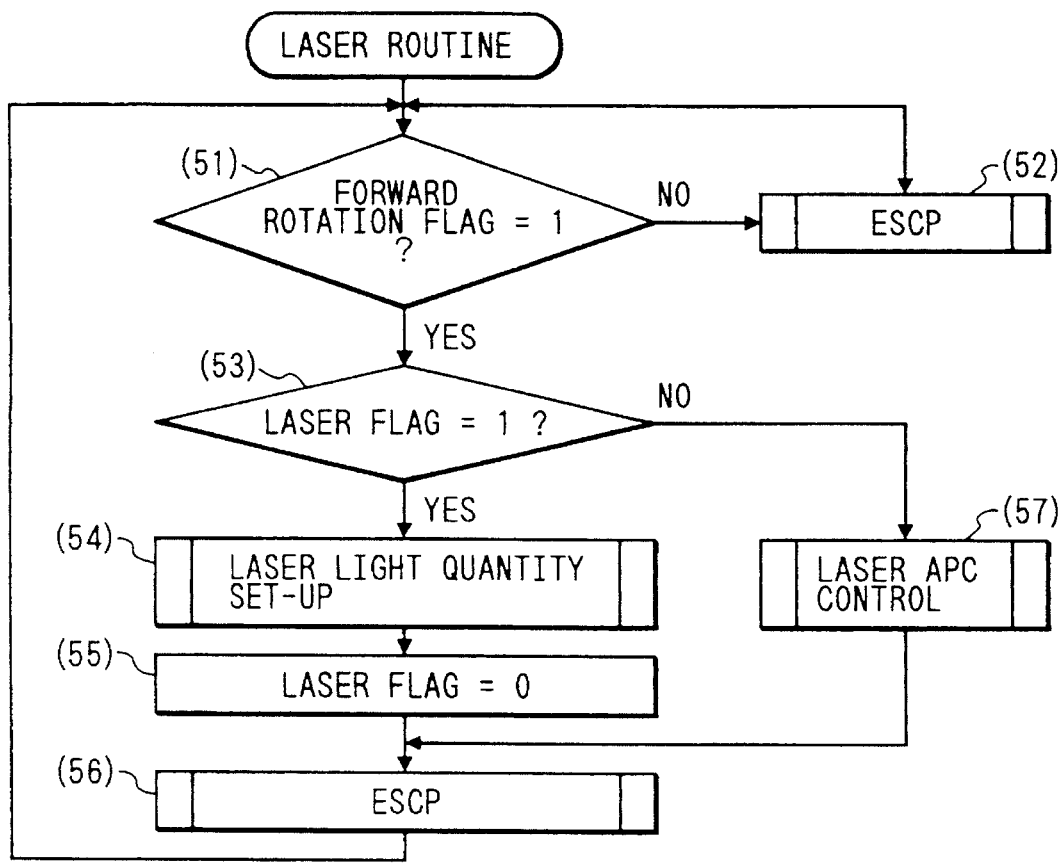

FIG. 26A shows a main routine, and FIG. 26B shows a print routine, and FIG. 27A shows a prerotation routine, and FIG. 27B shows a laser routine.

As this program adopts a monitor program method which is capable of making the parallel processing of each sequence routine, each sequence routine program scans another program, for example, routines as shown in FIG. 26B, FIGS. 27A and 27B, sequentially, separated by the ENTER/ESCP. This monitor program capable of the parallel processing is quite common, and is not limited to that of this example. In this example, the ENTER starts the program at an address stored in the memory content specified by a memory table (with a CALL statement from the specified address). The ESCP is defined to store an address for starting the program at the next ENTER into a specified memory table and return to the address where it is entered (RETURN statement).

If the print routine is ENTERed at step (1) in the main routine as shown in FIG. 26A the control is passed to the print routine as shown in FIG. 26B. First, a determination is made whether or not there is any print request (print signal PRINT) (21), in which if the answer is NO, the ESCP processing routine is executed (23), and the return to step (21) is made. If the determination at step (21) is YES, a print paper is fed (22), the forward rotation flag which is a prerotation control request flag is set to 1 (24), the scanner motor 103 is started (25), and the routine waits for the tack signal TAC to the input (26) for the synchronization with the tack signal TAC, in which if the tack signal is not input, the ESCP processing routine is executed (27), and the return to step (26) is made.

On the other hand, if there is any input tack signal TAC at step (26), an internal timer of the CPU 101 is set at a predetermined time (28), and the timer is started. Note that the timer routine is not specifically described, but it is a quite common timer routine, which is decremented at the time of a timer interrupt if the timer value has been set, and stopped if the data value becomes 0. Next, a determination is made whether or not the next tack signal TAC has been input (29), in which if the answer is NO, the ESCP processing routine is executed (30), and the return to step (29) is made, while if the answer is YES, a determination is made whether or not the timer count operation is completed (31). If the answer is NO, the return to step (26) is made, while if the answer is YES (operating while the timer data value is not 0), the laser flag is set to 1 (32).

Thereby, the forward rotation routine as shown in FIG. 27B ENTERed from the main routine (2) in the processing of step (30), to initiate the forward rotation routine as shown in FIG. 27A and at step (41), it is checked whether or not a request flag of the forward rotation control is 1. If the answer is NO, the ESCP processing routine is executed (42), and the return to step (1) is made, while if the answer is YES (the request flag is 1 at the print), the forward rotation control is started (43). After the completion of the forward rotation control, the request flag of the forward rotation control is reset (44), and the print operation is executed. Note that the content of the forward rotation control is not specifically related to the present invention, and therefore the explanation will be omitted. Also, in the forward rotation control at step (43), the ESCP processing routine may be entered at times, and the return to the main routine is made at each time.

Next, at step (3) in the main routine as shown in FIG. 26A, the laser routine as shown in FIG. 27B is ENTERed, and a determination is made whether or not the request flag of forward rotation control is 1 (51), in which if the answer is NO, the ESCP processing routine is executed (52), and the return to step (51) is made. In this case, the return to the main routine is caused with the ESCP routine until the forward rotation processing has been completed in the forward rotation routine shown in FIG. 27B.

If the forward rotation processing is terminated, the routine transfers to step (53) of the laser routine as shown in FIG. 27B, where a determination is made whether or not a preset laser flag is 1. If the answer is YES, the routine transfers to step (54), where the set-up sequence for the adjustment of laser light quantity is executed, and after the reset of the laser flag (55), the return to the main routine is caused with the ESCP processing routine, while if the answer is NO, the laser APC control is executed (57), and the routine proceeds to step (56), where the return to the main routine is caused with the ESCP processing routine.

In this way, at steps (26) to (31), it is possible to detect the timing of attaining a predetermined frequency of the motor tack signal whose frequency will increase along with the scanner motor rotation number. Accordingly, it is possible to detect the timing at which the optical scan is securely enabled after starting of the scanner motor 103, prior to reaching a desired scan speed, and the set-up of laser light quantity is more promptly allowed, thereby shortening the first print time.

Figure 28:
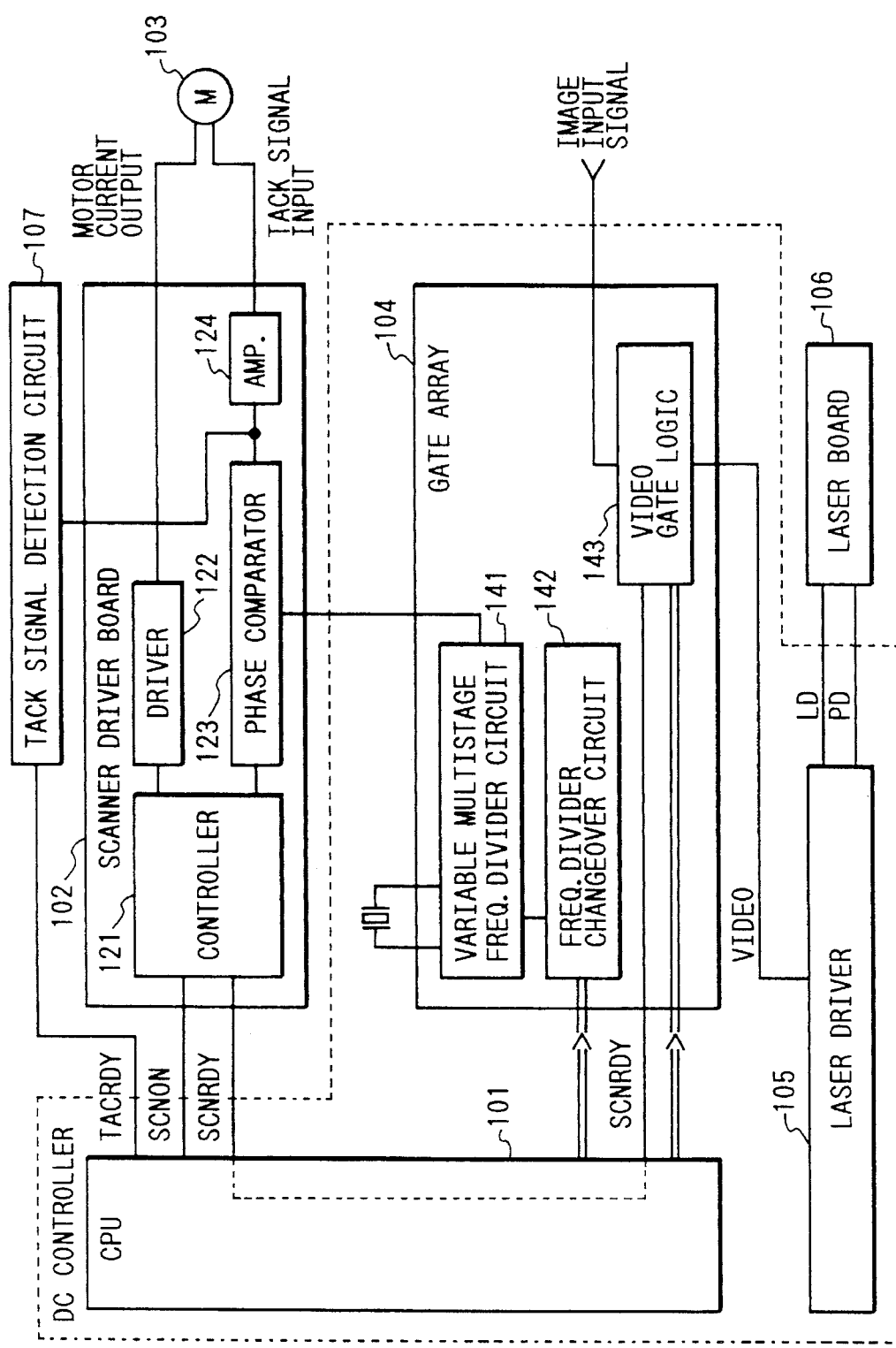
FIG. 28 is a block diagram showing essential parts of a recording apparatus in an eleventh example of the present invention.

While this example has been described in conjunction with a case wherein the light quantity control of laser light source is set up at a desired timing while the CPU 101 is directly monitoring the input frequency of the tack signal TAC for the scanner motor 103, the tack signal detection circuit 7 may be provided as the external circuit, as shown in FIG. 28 and described below.

Eleventh example

FIG. 28 is a block diagram showing the configuration of essential parts for a recording apparatus in the eleventh example of the present invention. The like numerals refer to the like parts in FIGS. 16 and 28.

In this figure, 107 is a tack signal detection circuit, which inputs the tack ready signal TACRDY to the CPU 101 if it detects a preset frequency to be reached by monitoring the frequency of the tack signal TAC for the scanner motor 103.

Note that the variable multistage frequency divider circuit 141 and the frequency divider changeover circuit 142 of the gate array 104 are unnecessary with the operation, but may be provided for other operations.

In this example, along with the rotation of the scanner motor 103, the tack signal detection circuit 107 detects that the tack signal TAC which is detected by Hall elements contained in the scanner motor 103 has reached a predetermined frequency, so that the set-up control of laser light quantity is performed. Note that the tack signal detection circuit 107 is the same as a quite common phase comparator contained in the scanner driver board 102, and is configured such that if a desired range is reached by the comparison with the basic clock, the tack ready signal TACRDY is generated, but it is not limited to such a configuration, and may be configured in another way if the frequency of the tack signal TAC can be detected.

Figure 29A:
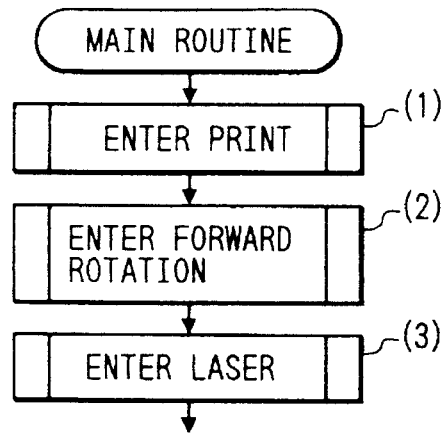
FIGS. 29A and 29B are a series of flowcharts showing one example of a fourth control procedure for the light quantity adjustment start timing in the recording apparatus in the eleventh example.
Figure 29B:
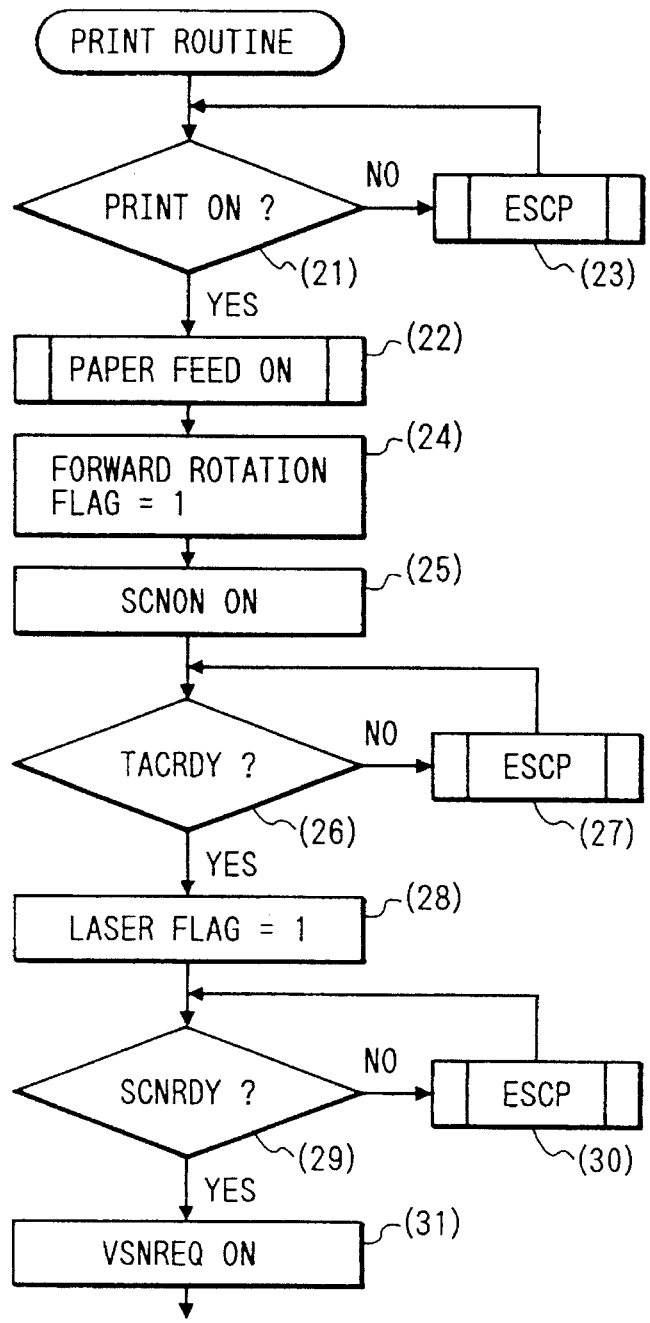

Referring now to the flowcharts as shown in FIGS. 29A, 29B and 30, the control operation of light quantity adjustment start timing in the recording apparatus according to this example will be described below.

Figure 30A:
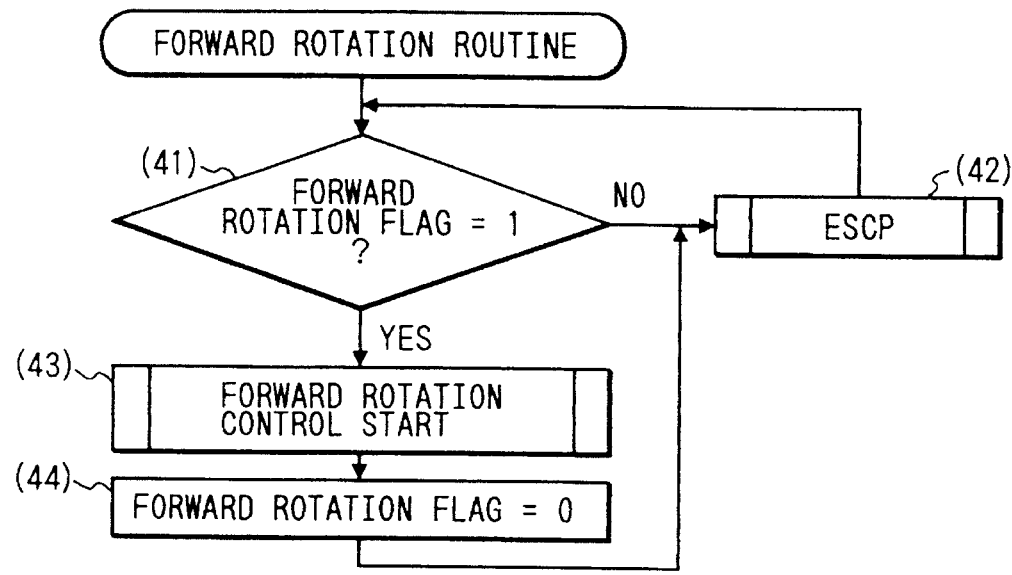
FIGS. 30A and 30B are a series of flowcharts showing one example of the fourth control procedure for the light quantity adjustment start timing in the recording apparatus in the eleventh example.
Figure 30B:
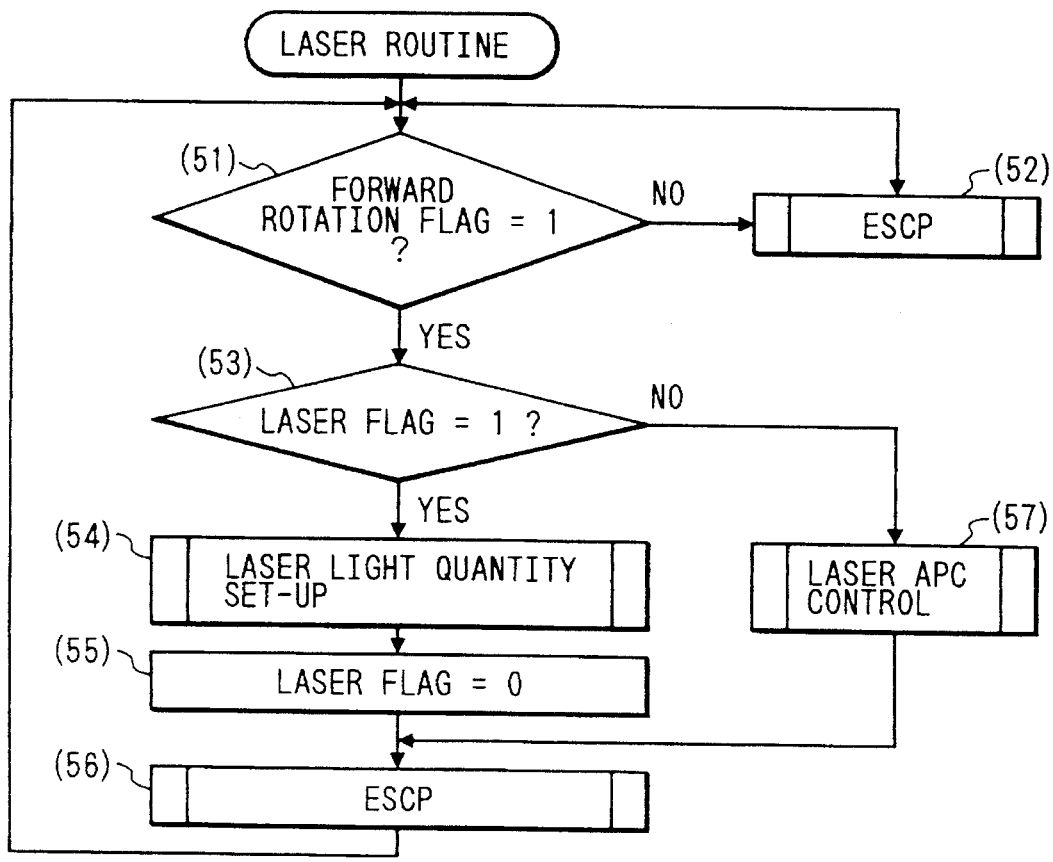

In FIG. 29A shows a main routine, and FIG. 29B shows a print routine, and in FIG. 30A shows a prerotation routine, and FIG. 30B shows a laser routine.

If the print routine is ENTERed at step (1) in the main routine as shown in FIG. 29A, the control is passed to the print routine as shown in FIG. 29B. First, a determination is made whether or not there is any print request (print signal PRINT) (21), in which if the answer is NO, the ESCP processing routine is executed (23), and the return to step (21) is made, while if the answer is YES, a print paper is fed (22), the forward rotation flag which is a prerotation control request flag is set to 1 (24), the scanner motor 103 is started (25), and the routine waits for the tack ready signal TACRDY to be input (26). If the answer is NO, the ESCP processing routine is executed (27), and the return to step (26) is made.

On the other hand, if there is any input tack ready signal TACRDY at step (26), the laser flag is set to 1 (28), and then, a determination is made whether or not the ready signal SCNRDY is 1 (29), in which if the answer is NO, the ESCP processing routine is executed (30), and the return to step (29) is made, while if the answer is YES, the image signal transmit request signal VSNREQ is turned on (31), and the print routine is continued.

Thereby, the forward rotation routine shown in FIG. 30B is ENTERed from the main routine (2) in the processing of step (30), to initiate the forward rotation routine as shown in FIG. 30A, and at step (41), it is checked whether or not a request flag of the forward rotation control is 1. If the answer is NO, the ESCP processing routine is executed (42), and the return to step (41) is made, while if the answer is YES (the request flag is 1 at the print), the forward rotation control is started (43). After the completion of the forward rotation control, the request flag of the forward rotation control is reset (44), and the print operation is executed. Note that the content of the forward rotation control is not specifically related to the present invention, and therefore the explanation will be omitted. Also, in the forward rotation control at step (43), the ESCP processing routine is entered at times, and the return to the main routine is made at each time. At step (3) in the main routine as shown in FIG. 29A, the laser routine as shown in FIG. 30B is ENTERed, and a determination is made whether or not the request flag of forward rotation control is 1 (51), in which if the answer is NO, the ESCP processing routine is executed (52), and the return to step (51) is made. However, the return to the main routine is caused with the ESCP routine until the forward rotation processing has been completed in the forward rotation routine shown in FIG. 30A.

If the forward rotation processing is terminated, the routine transfers to step (53) of the laser routine as shown in FIG. 30B, where a determination is made whether or not a preset laser flag is 1, in which if the answer is YES, the routine transfers to step (54), where the set-up sequence for the adjustment of laser light quantity is executed, and after the reset of the laser flag (55), the return to the main routine is caused with the ESCP processing routine, while if the answer is NO, the laser APC control is executed (57), and the routine proceeds to step (56), where the return to the main routine is caused with the ESCP processing routine. In this way, it is possible to detect the timing at which the optical scan is securely enabled after starting of the scanner motor 103, prior to reaching a desired scan speed, and thereby make the set-up of laser light quantity more promptly.

Figure 31:
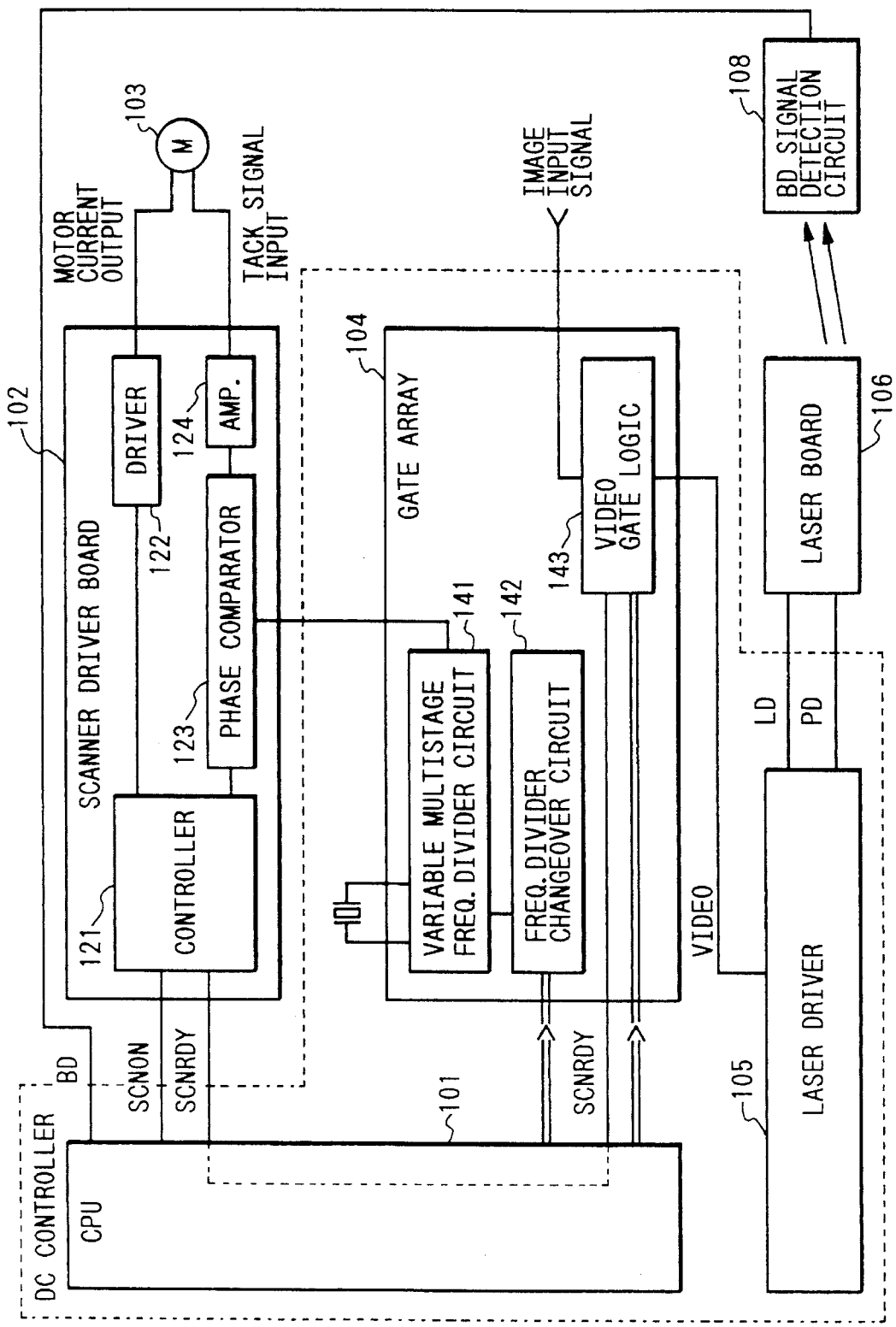
FIG. 31 is a block diagram showing an essential configuration of a recording apparatus in a twelfth example of the present invention.

While the above tenth and eleventh examples have been described in conjunction with a case wherein the laser light quantity set-up start timing is controlled by detecting a scan speed variation in processing the information originating from the tack signal TAC output from the scanner motor 3, it can be controlled in another way of detecting the scan speed variation from the detected frequency of a horizontal synchronizing signal BD which generates a synchronizing signal in the main scan direction, while scanning the laser beam with a polygon mirror, not shown, which is driven by the scanner motor 3 as shown in FIG. 31.

Twelfth example

FIG. 31 is a block diagram showing the configuration of essential parts for a recording apparatus in the twelfth example of the present invention. The like numerals refer to the like parts in FIGS. 28 and 31.

In this figure, 108 is a BD signal detection circuit, comprising a light receiving unit constituted of photodiodes, not shown, in which if it receives the laser light emitted from the laser board 106 and scanned by the polygon mirror, not shown, it outputs a horizontal synchronizing signal BD to the CPU 101. Note that in this example, for simplicity of explanation, the horizontal synchronizing signal BD is directly input into the CPU 101, but it may be input via a BD signal processing unit existing in the gate array 104 into the CPU 101.

In the recording apparatus as thus constituted, the rotation of the scanner motor 103 can be monitored and detected for a proper operation by the CPU 101 which detects the frequency of horizontal synchronizing signal BD, and its detection timing can be made prior to the set-up of the scanner motor 103, so that the set-up of laser light quantity can be performed more promptly, thereby shortening the first print time. That is, the set-up of laser light quantity is controlled in accordance with the procedure in the flowcharts as shown in FIGS. 12 and 13, by the CPU 101 judging that the frequency of horizontal synchronizing signal BD has reached a predetermined frequency.

Figure 33A:
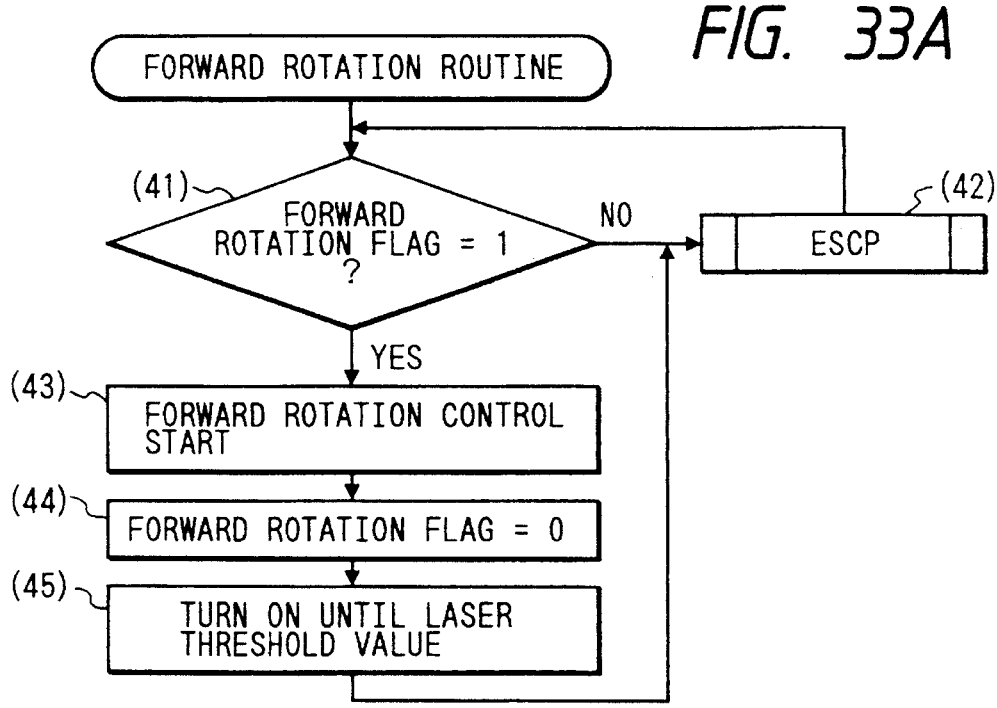
FIGS. 33A and 33B are a series of flowcharts showing one example of the fifth control procedure for the light quantity adjustment start timing in the recording apparatus in the twelfth example.
Figure 33B:
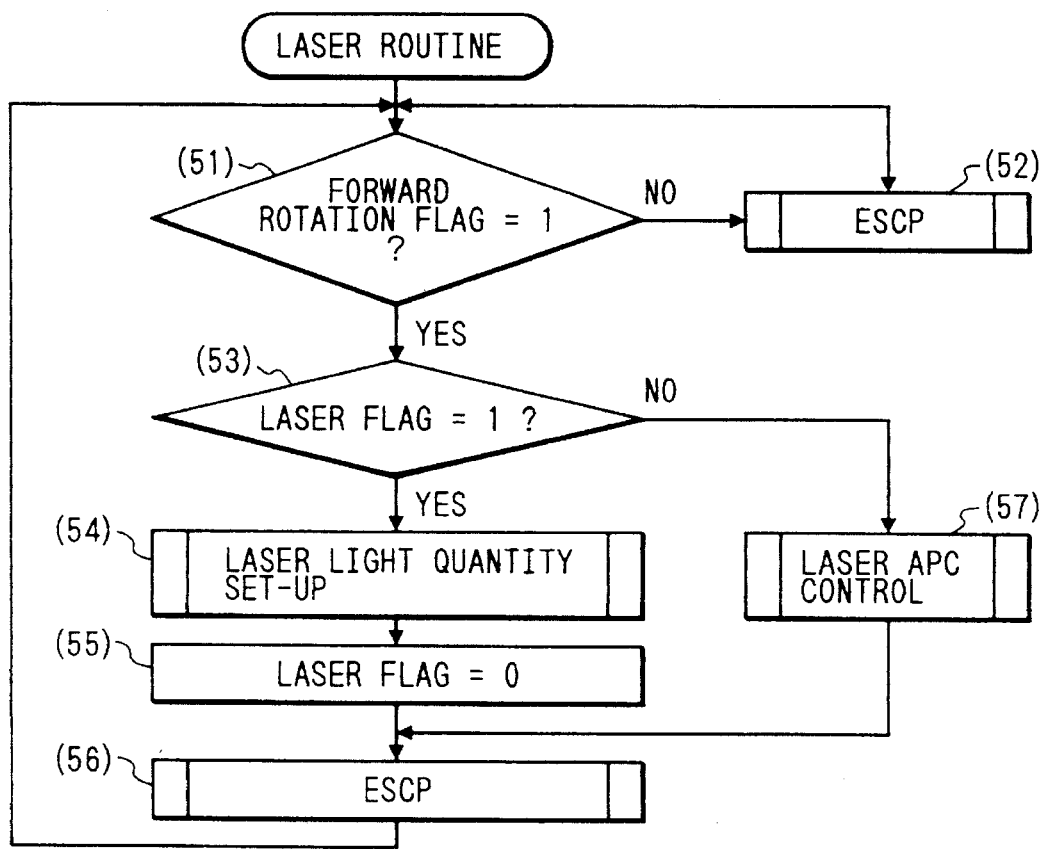

FIG. 32A shows a main routine, and FIG. 32B shows a print routine, and FIG. 33A shows a prerotation routine, and FIG. 33B shows a laser routine. If the print routine is ENTERed at step (1) in the main routine as shown in FIG. 32A, the control is passed to the print routine as shown in FIG. 32B. First, a determination is made whether or not there is any print request (print signal PRINT) (21), in which if the answer is NO, the ESCP processing routine is executed (23), and the return to step (21) is made, while if the answer is YES, a print paper is fed (22), the forward rotation flag which is a prerotation control request flag is set to 1 (24), the scanner motor 103 is started (25), and the routine waits for the horizontal synchronizing signal BD to be input (26) for the synchronization with the horizontal synchronizing signal BD. However, as the laser light is not emitted immediately at an early time of the start of rotation, the ESCP processing routine is executed (27) to return to the main routine as shown in FIG. 33A, where the forward rotation routine as shown in FIG. 33B is executed. At step (41), it is checked whether or not the request flag of the forward rotation control is 1, in which if the answer is NO, the ESCP processing routine is executed (42), and the return to step (41) is made, while if the answer is YES (request flag is 1 at the print), the forward rotation control is started (43), the forward rotation flag is set to 0 (44), and the laser is set up at a quite minute light quantity (up to a laser threshold current value referred to as a laser emission point at a light quantity having no effects on the photosensitive drum) (45). Note that this set-up control is performed with the laser APC which is already known, and therefore the explanation will be omitted. And if the laser is set up, the reception of the horizontal synchronizing signal BD is allowed so that at step (26) of the print routine as shown in FIG. 32B, the input of horizontal synchronizing signal BD is confirmed. As a result, if the horizontal synchronizing signal BD has been input, an internal timer of the CPU 101 is set at a predetermined time value, and the timer is started. Note that the timer routine is not specifically described, but it is a quite common timer routine, which is decremented at the time of a timer interrupt if the timer value has been set, and stopped if the data value becomes 0.

Then, a determination is made whether or not the next horizontal synchronizing signal BD is input (29), in which if the answer is NO, the ESCP processing routine is executed (30), and the return to step (29) is made, while if the answer is YES, a determination is made whether or not the timer count operation is completed (31). If the answer is NO, the routine returns to step (26), while if the answer is YES (operating while the timer value is not 0), the laser flag is set to 1 (32).

Next, at step (3) in the main routine as shown in FIG. 32A, the laser routine as shown in FIG. 33B is ENTERed, and a determination is made whether or not the request flag of forward rotation control is 1 (51), in which if the answer is NO, the ESCP processing routine is executed (52), and the return to step (51) is made. However, the return to the main routine is caused with the ESCP routine until the forward rotation processing has been completed in the forward rotation routine as shown in FIG. 33A.

If the forward rotation processing is terminated, the routine transfers to step (53) of the laser routine as shown in FIG. 33B, where a determination is made whether or not a preset laser flag is 1, in which if the answer is YES, the routine transfers to step (54), where the set-up sequence for the adjustment of laser light quantity is executed, and after the reset of the laser flag (55), the return to the main routine is caused with the ESCP processing routine, while if the answer is NO, the laser APC control is executed (57), and the routine proceeds to step (56), where the return to the main routine is caused with the ESCP processing routine.

As above described, at steps (26) to (31) of the print routine as shown in FIG. 32B, it is possible to detect the timing at which the horizontal synchronizing signal BD attains a predetermined frequency, when the frequency of the rotation number for the scanner motor 103 is increased.

Accordingly, it is possible to detect the timing at which the optical scan is securely enabled after starting of the scanner motor 103, prior to reaching a desired scan speed, and make the set-up of laser light quantity more promptly, thereby shortening the first print time. Of course, it will be appreciated in this example that the detection configuration of the horizontal synchronizing signal BD can be implemented in the hardware by the use of a phase comparator.

As above described, in the eighth to twelfth examples, there are provided monitor means for monitoring a predetermined state signal varying with the drive of the scan optical system, directing means for directing a judgment of whether the scan speed of the scan optical system reaches a first scan speed set for writing the image or a second scan speed set at a lower speed than the first scan speed, based on the output of the monitor means, and authorization means for authorizing the light quantity adjustment with the light quantity adjusting means, at the time when the second scan speed is reached, as directed by the directing means, so that the light quantity adjustment can be performed in parallel with the set-up of the scan optical system by detecting that the scan speed of the scan optical system reaches a second scan speed, without largely changing the constitution of a conventional scan optical system.

Also, there are provided switching means for switching a plurality of first scan speeds for the scan optical system, based on a directed resolution, and directing means for directing a judgment of whether or not the scan motor reaches a second scan speed, at the time when it reaches any one of first scan speeds which can be set at lower speed than the first scan speed, switched by the switching means, so that a specific second scan speed corresponding to the first scan speed set based on the directed resolution can be selected from the plurality of first scan speeds for setting, whereby it is possible to easily detect whether or not a desired second scan speed is reached without largely changing the hardware.

Furthermore, there are provided signal generating means for generating a synchronizing signal in the main scan direction by receiving the light scanned by the scan optical system, and monitor means for monitoring the frequency change of the synchronizing signal in the main scan direction which is output from the signal generating means, so that the synchronizing signal in the main scan direction can be utilized as a predetermined status signal varying with the drive of the scan optical system, whereby the set-up of the light quantity adjustment can be made in parallel with the set-up of the scan optical system by detecting that the scan speed of the scan optical system reaches a desired second scan speed, and only by changing the software.

Accordingly, it is possible to direct the start of light quantity adjustment during the set-up processing of the optical scan system, thereby having an effect that the first print time can be largely shortened.

The present invention is not limited to the above example, but various variations can be made within the scopes of the claims. Also, the above-described examples can be combined in any form, and their variation and combination are intended to be within a scope of the present invention.

What is claimed is:

1. An image forming apparatus comprising:

light beam generating means for generating a light beam;

light quantity detecting means for detecting a light quantity of the light beam generated by said light beam generating means;

adjusting means for adjusting the light quantity of the light beam generated by said light beam generating means in accordance with the detection of said light quantity detecting means;

a rotational polygon mirror for scanning the light beam generated by said light beam generating means across a member to be illuminated;

rotation detecting means for detecting whether or not a rotation number of said rotational polygon mirror reaches a predetermined rotation number within a predetermined time after start of driving the rotational polygon mirror; and control means for controlling said light quantity adjusting means and said rotational polygon mirror, wherein said light quantity adjusting means starts the light quantity adjustment, after starting the rotation of said rotational polygon mirror, and before said rotation detecting means detects the rotation number of said rotational polygon mirror reaches the predetermined rotation number.

2. The image forming apparatus according to claim 1, further comprising memory means for storing a detected result by said rotation detecting means.

3. The image forming apparatus according to claim 1, further comprising:

a photosensitive member on which a latent image is formed by scanning the light beam deflected by said rotational polygon mirror;

developing means for visualizing the latent image formed on said photosensitive member; and transfer means for transferring a visual image on said photosensitive member onto a recording sheet;

wherein said apparatus controls at least one of said developing means or said transfer means so that the latent image or the visualized image formed on said photosensitive member by the light quantity adjustment is not developed or transferred.

4. The image forming apparatus according to claim 2, wherein when the power of said apparatus is turned on, said rotational polygon mirror is caused to rotate and said memory means stores a detected result by said rotation detecting means.

5. The image forming apparatus according to claim 2, wherein said rotational polygon mirror is caused to rotate at predetermined intervals at least in a standby state and the detected result by said rotation detecting means is stored into said memory means.

6. The image forming apparatus according to claim 2, wherein said rotational polygon mirror starts to rotate in response to a print request signal output from means for producing said image information.

7. The image forming apparatus according to claim 6, further comprising:

stock means for stocking a plurality of recording sheets; and feed means for feeding said recording sheets stocked in said stock means one sheet at a time;

wherein said feed means starts a feed operation prior to said print request signal when the detected result stored in said memory means is positive.

8. The image forming apparatus according to claim 6, wherein said apparatus stores a detected result of said detecting means into said memory means when said rotational polygon mirror is rotated in response to a print request signal.

9. The image forming apparatus according to claim 1, further comprising nonvolatile memory means for storing the detected result by said rotation detecting means.

10. An image forming apparatus comprising:

light beam generating means for generating a light beam;

a rotational polygon mirror for scanning the light beam generated by said light beam generating means across a member to be illuminated;

rotation detecting means for detecting whether or not a rotation number of said rotational polygon mirror reaches a predetermined rotation number for image formation within a predetermined time after start of driving said rotational polygonal mirror; and memory means for storing a detected result by said rotation detecting means.

11. The image forming apparatus according to claim 10, further comprising adjusting means for adjusting the light quantity of the light beam generated by said light beam generating means, wherein said adjusting means starts the light quantity adjustment, in accordance with a storage content of said memory means, after starting rotation of said rotational polygon mirror, and before said rotation detecting means detects that the rotation number of said rotational polygon mirror reaches the predetermined rotation number.

12. The image forming apparatus according to claim 11, further comprising:
   a photosensitive member on which a latent image is formed by scanning the light beam deflected by said rotational polygon mirror;
   developing means for visualizing the latent image formed on said photosensitive member; and
   transfer means for transferring a visual image on said photosensitive member onto a recording sheet;
   wherein said apparatus controls at least one of said developing means or said transfer means so that the latent image or the visualized image formed on said photosensitive member by the light quantity adjustment is not developed or transferred.

13. The image forming apparatus according to claim 10, wherein when the power of said apparatus is turned on, said rotational polygon mirror is caused to rotate and said memory means stores a detected result by said rotation detecting means.

14. The image forming apparatus according to claim 10, wherein said rotational polygon mirror is caused to rotate at predetermined intervals at least in a standby state and the detected result by said rotation detecting means is stored into said memory means.

15. The image forming apparatus according to claim 10, wherein said rotational polygon mirror starts to rotate in response to a print request signal output from means for producing said image information.

16. The image forming apparatus according to claim 15, further comprising:
   stock means for stocking a plurality of recording sheets; and
   feed means for feeding said recording sheets stocked in said stock means one sheet at a time;
   wherein said feed means starts a feed operation prior to said print request signal when the detected result stored in said memory means is positive.

17. The image forming apparatus according to claim 6, wherein said apparatus stores a detected result of said detecting means into said memory means when said rotational polygon mirror is rotated in response to a print request signal.

18. The image forming apparatus according to claim 10, further comprising nonvolatile memory means for storing the detected result by said rotation detecting means.

19. An image forming apparatus comprising:
   light beam generating means for generating the light beam;
   a rotational polygon mirror for scanning the light beam generated by said light beam generating means across a member to be illuminated;
   rotation detecting means for detecting whether or not a rotation number of said rotational polygon mirror reaches a predetermined rotation number for an image formation; and
   determining means for determining a stabilizing time needed for stabilizing the rotation of said rotational polygon mirror after said rotation detecting means detects that the rotation number of said rotational polygon mirror reaches the predetermined rotation number.

20. The image forming apparatus according to claim 19, further comprising:
   input means for inputting the image information sent by an external apparatus; and
   output means for outputting a signal representing an image information receivable state when the stabilizing time determined by said determining means has elapsed.

21. The image forming apparatus according to claim 19, wherein said rotation detecting means detects that the rotation number of said rotational polygon mirror lies within a predetermined range, and said determining means determines the stabilizing time.

22. The image forming apparatus according to claim 21, wherein said determining means determines the stabilizing time based on a detected result of said detecting means for a predetermined monitor time after the rotation number of said rotational polygon mirror reaches the predetermined range.

23. The image forming apparatus according to claim 22, wherein said determining means determines the stabilizing time within said monitor time in accordance with a time when the rotation number of said rotational polygon mirror is out of said predetermined range.

24. The image forming apparatus according to claim 22, wherein said monitor time is extended based on the detected output of said detecting means for said monitor time.

25. The image forming apparatus according to claim 23, wherein said apparatus performs an error processing when an accumulated time for which the rotation number of said rotational polygon mirror is out of said predetermined range exceeds a predetermined value.

26. The image forming apparatus according to claim 23, wherein the rotation of said rotational polygon mirror is controlled by a phase locked loop method, and said rotation detecting means detects whether or not the phase is locked.

27. The image forming apparatus according to claim 21, wherein said detecting means detects that the rotation number of said rotational polygon mirror lies within the predetermined range, based on a supply power for the rotation of said rotational polygon mirror.

28. The image forming apparatus according to claim 21, wherein the stabilizing time terminates when the rotation number of said rotational polygon mirror lies within the predetermined range for a predetermined period.

29. An image forming apparatus comprising:
   light beam generating means for generating a light beam;
   adjusting means for adjusting a light quantity of the light beam generated by said light beam generating means;
   a rotational polygon mirror for scanning the light beam generated by said light beam generating means across a member to be illuminated;
   rotation detecting means for detecting whether said rotational polygon mirror rotates at a first rotation number or a second rotation number greater than the first rotation number; and
   control means for controlling said light quantity adjusting means and said rotational polygon mirror, wherein when said rotational polygon mirror should be rotated at the second rotation number, said light quantity adjusting means can start adjusting the light quantity in response to the detection of said rotational polygon mirror rotating at the first rotational number.

30. The image forming apparatus according to claim 29, wherein said rotational polygon mirror can be stably driven in rotation at said first and second rotation numbers.

31. The image forming apparatus according to claim 30, wherein said apparatus can perform the image forming at two different first and second resolutions, said first and second rotation numbers corresponding to said first and second resolutions, respectively.

32. The image forming apparatus according to claim 29, wherein said rotation detecting means has a beam detector for detecting the light beam deflected by said rotational polygon mirror at a predetermined position, and detects that said rotational polygon mirror is rotated at least the first rotation number, based on the output of said beam detector.

33. The image forming apparatus according to claim 29, further comprising a tacho-signal generating means, said rotation detecting means detecting that said rotational polygon mirror is rotating at at least the first rotation number, based on the frequency of said tacho-signal.

34. An image forming apparatus comprising:

light beam generating means for generating a light beam;

a rotational polygon mirror for scanning the light beam generated by said light beam generating means across a member to be illuminated;

detecting means for detecting when a rotation number of said rotational polygon mirror reaches a rotation number for image formation;

adjusting means for adjusting a light quantity of the light beam generated by said light beam generating means, said light quantity adjustment being performed prior to a detection that a rotation number of said rotational polygon mirror reaches the rotation number for the image formation; and means for inhibiting modulation of the light beam with an image signal until the rotation of said rotational polygon mirror is stabilized even after the detection that the rotation number of said rotational polygon mirror reaches the rotation number for the image formation.

35. The image forming apparatus according to claim 34, further comprising memory means for storing a result detected by said rotation detecting means.

36. The image forming apparatus according to claim 34, further comprising:

a photosensitive member on which a latent image is formed by scanning the light beam deflected by said rotational polygon mirror;

developing means for visualizing the latent image formed on said photosensitive member; and transfer means for transferring a visual image on said photosensitive member onto a recording sheet, wherein said apparatus controls at least one of said developing means and said transfer means so that the latent image is not visualized and the visualized image is not transferred.

37. The image forming apparatus according to claim 35, wherein when the power of said apparatus is turned on, said rotational polygon mirror is caused to rotate and said memory means stores a result detected by said rotation detecting means.

38. The image forming apparatus according to claim 35, wherein said rotational polygon mirror is caused to rotate at predetermined intervals at least in a standby state and the detected result by said rotation detecting means is stored into said memory means.

39. The image forming apparatus according to claim 35, further comprising:

an image signal generating source, wherein said rotational polygon mirror starts to rotate in response to a print request signal output from said image signal generating source.

40. The image forming apparatus according to claim 39, further comprising:

stock means for stocking a plurality of recording sheets; and feed means for feeding said recording sheets stocked in said stock means one sheet at a time, wherein said feed means starts a feed operation prior to said print request signal when the detected result stored in said memory means is positive.

41. The image forming apparatus according to claim 35, wherein said apparatus stores a detected result of said detecting means into said memory means when said rotational polygon mirror is rotated in response to a print request signal.

42. The image forming apparatus according to claim 35, wherein said memory means comprises nonvolatile memory means.

43. The image forming apparatus according to claim 34, further comprising determining means for determining that the rotation number of said rotational polygon mirror has become stable.

44. The image forming apparatus according to claim 43, wherein said determining means determines that the rotation number of said rotational polygon mirror has become stable based on a detected result of said detecting means for a predetermined monitor time after the rotation number of said rotational polygon mirror reaches the predetermined rotation number.

45. The image forming apparatus according to claim 43, wherein the rotation of said rotational polygon mirror is controlled by a phase locked loop method, and said rotation detecting means detects whether or not the phase is locked.

46. The image forming apparatus according to claim 43, wherein said rotation detecting means detects that the rotation number of said rotational polygon mirror lies within the predetermined range, based on a supply power for the rotation of said rotational polygon mirror.

47. The image forming apparatus according to claim 43, wherein said determining means determines that the rotation number of said rotational polygon mirror has become stable, in case where the rotation number of said rotational polygon mirror lies within the predetermined range for a predetermined period.

* * * * *

UNITED STATES PATENT AND TRADEMARK OFFICE
CERTIFICATE OF CORRECTION

PATENT NO. : 5,550,573
DATED : August 27, 1996
INVENTOR(S) : Serizawa et al.

Figure 3:
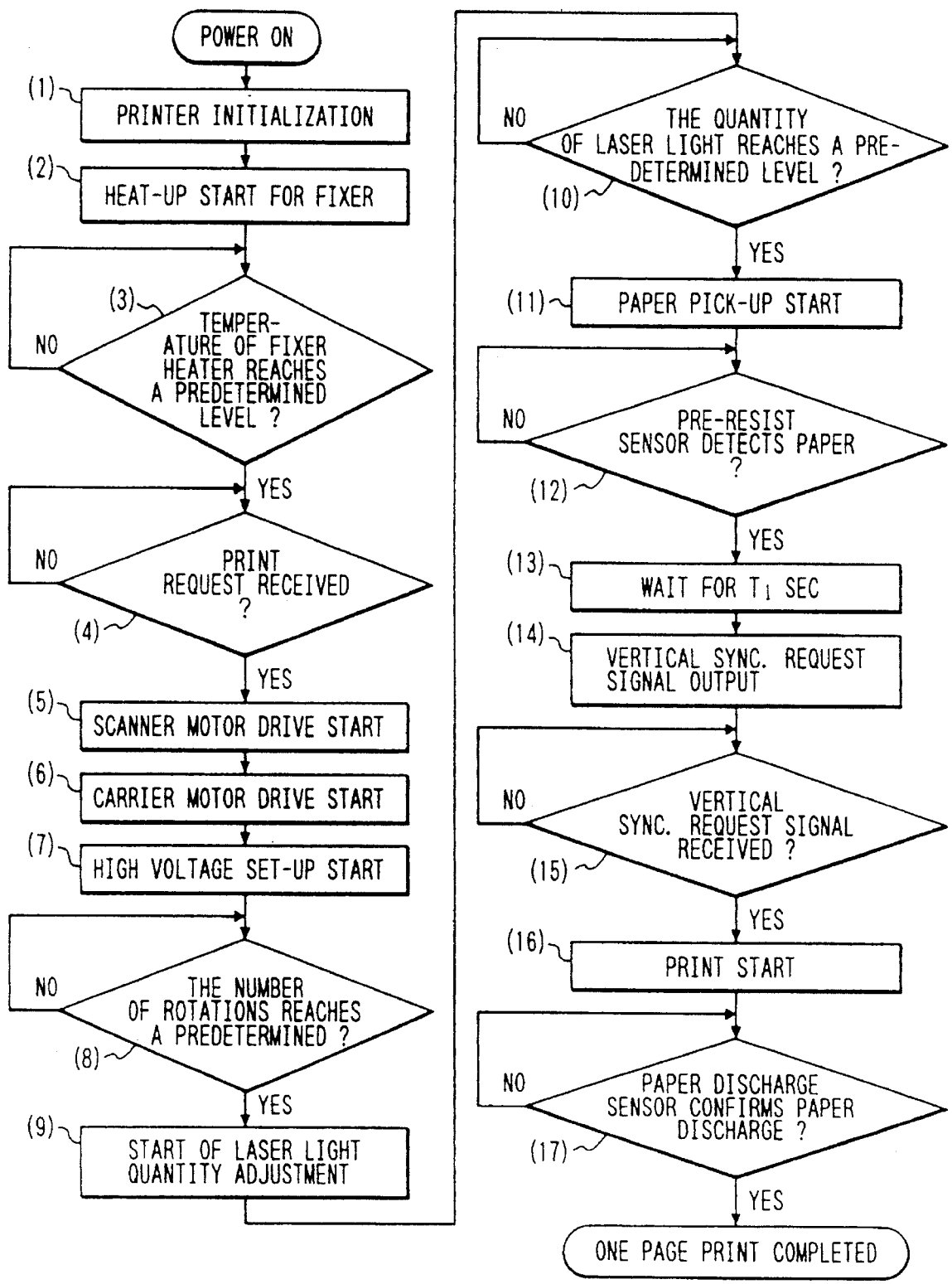
FIG. 3 is a flowchart showing one example of a print processing procedure in the image forming apparatus.

It is certified that error appears in the above-indentified patent and that said Letters Patent is hereby corrected as shown below:

In the Drawings:

SHEET 3 OF THE DRAWINGS:

In Fig. 3, Step (9), "PREDETERMINED" should read --PREDETERMINED NUMBER--.

SHEET 19 OF THE DRAWINGS:

In Fig. 15, Step (5), "PREDETERMIINED" should read --PREDETERMINED--.

COLUMN 1:

Line 66, "De" should read --be--.

COLUMN 2:

Line 11, "of" (second occurrence) should read --of the--;
Line 12, "of" should read --of the--; and
Line 16, "10" should be deleted.

Figure 5A:
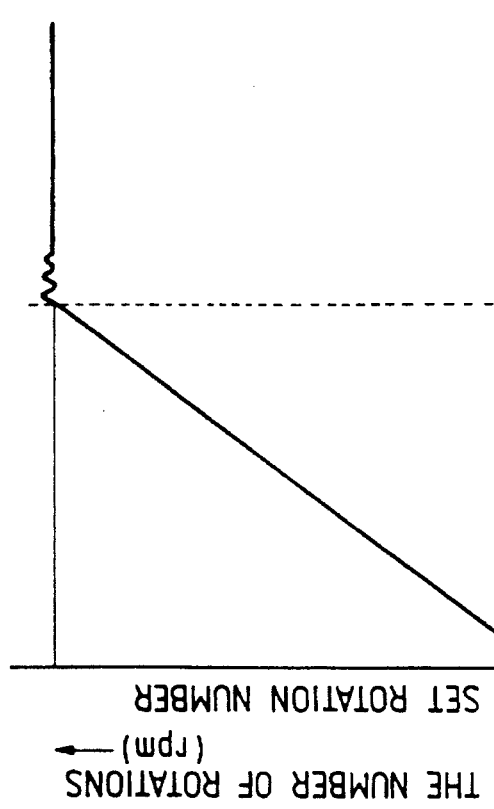
FIGS. 5A and 5B, are timing charts for explaining a conventional sequence control at the start of printing.
Figure 5B:
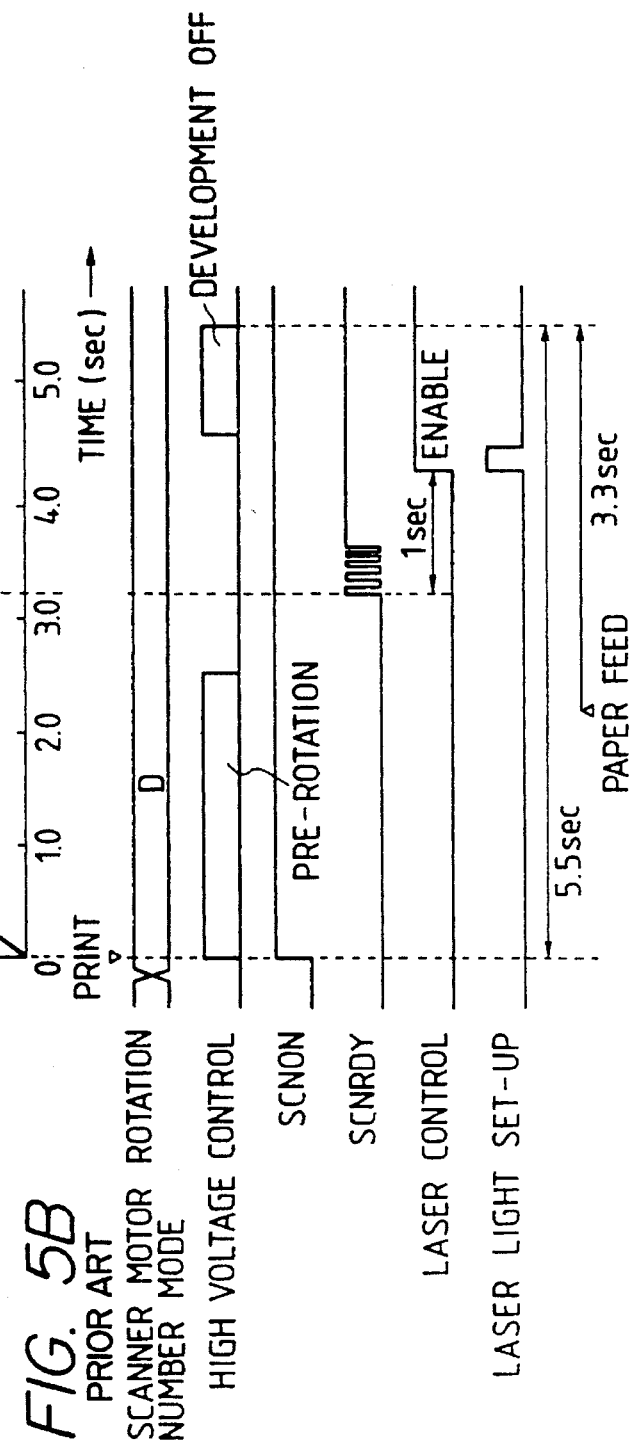

COLUMN 5:

Line 4, A new paragraph should begin after "apparatus." and "FIGS. 5A and 5B," should read --Fig. 5, which is comprised of Figs. 5A and 5B,--.

UNITED STATES PATENT AND TRADEMARK OFFICE
CERTIFICATE OF CORRECTION

PATENT NO. : 5,550,573
DATED : August 27, 1996
INVENTOR(S) : Serizawa et al.

It is certified that error appears in the above-indentified patent and that said Letters Patent is hereby corrected as shown below:

COLUMN 5:

Line 5, "are timing charts" should read --is a timing chart--;
Line 10, "FIGS. 7 7A," should read --FIG. 7, which is comprised of FIGS. 7A--, and "are control flowcharts" should read --is a control flowchart--;
Line 17, "FIGS. 10 &" should read --FIG. 10, which is comprised of FIGS.--, and "are control flowcharts" should read --is a control flowchart--;
Line 21, "FIGS. 12, 12A," should read --FIG. 12, which is comprised of FIGS. 12A--, and "are flowcharts" should read --is a flowchart--; and
Line 61, "FIGS." should read --FIG. 24, which is comprised of FIGS.--, and "are timing charts" should read --is a timing chart--.

COLUMN 8:

Line 9, "tens" should read --tens of--; and
Line 38, "(12)" should read --12--.

COLUMN 9:

Line 9, "that" should read --in which--.

UNITED STATES PATENT AND TRADEMARK OFFICE
CERTIFICATE OF CORRECTION

PATENT NO. : 5,550,573
DATED : August 27, 1996
INVENTOR(S) : Serizawa et al.

It is certified that error appears in the above-indentified patent and that said Letters Patent is hereby corrected as shown below:

COLUMN 12:

Line 59, "SCN RDY," should read --SCNRDY,--.

COLUMN 13:

Line 11, "corresponds" should read --correspond--;
Line 19, "corresponds" should read --correspond--; and
Line 26, "corresponds" should read --correspond--.

COLUMN 19:

Line 22, "shown" should read --shown in--.
Line 29, "In FIG. 22A," should read --FIG. 22A--;
Line 30, "and" (first occurrence) should be deleted, and "and in" should be deleted; and
Line 58, "is" (second occurrence) should be deleted.

COLUMN 20:

Line 67, "(dot" should read --(dots--.

COLUMN 21:

Line 34, "no" should read --not--.

UNITED STATES PATENT AND TRADEMARK OFFICE
CERTIFICATE OF CORRECTION

PATENT NO. : 5,550,573
DATED : August 27, 1996
INVENTOR(S) : Serizawa et al.

It is certified that error appears in the above-indentified patent and that said Letters Patent is hereby corrected as shown below:

COLUMN 22:

Line 52, "27B" should read --27A is--.

COLUMN 24:

Line 3, "In" and "and" should be deleted; and
Line 4, "and in" should be deleted.

COLUMN 27:

Line 40, "scopes" should read --scope--.

COLUMN 28:

Line 1, "detects" should read --detects that--.

COLUMN 31:

Line 13, "at" should read --at at--; and
Line 41, "comprising" should read --comprising:--.

UNITED STATES PATENT AND TRADEMARK OFFICE
CERTIFICATE OF CORRECTION

PATENT NO. : 5,550,573
DATED : August 27, 1996
INVENTOR(S) : Serizawa et al.

It is certified that error appears in the above-indentified patent and that said Letters Patent is hereby corrected as shown below:

<u>COLUMN 32</u>:

Line 32, "comprising" should read --comprising:--; and
    Line 56, "in" should read --in the--.

Signed and Sealed this

First Day of April, 1997

BRUCE LEHMAN

Attest:

Attesting Officer

Commissioner of Patents and Trademarks